US012136707B2

(12) United States Patent
Lim et al.

(10) Patent No.: US 12,136,707 B2
(45) Date of Patent: Nov. 5, 2024

(54) BATTERY AND CURRENT COLLECTOR APPLIED THERETO, AND BATTERY PACK AND VEHICLE INCLUDING THE BATTERY

(71) Applicant: LG ENERGY SOLUTION, LTD., Seoul (KR)

(72) Inventors: Jae-Won Lim, Daejeon (KR); Hak-Kyun Kim, Daejeon (KR); Je-Jun Lee, Daejeon (KR); Ji-Min Jung, Daejeon (KR); Su-Ji Choi, Daejeon (KR); Kwang-Su Hwangbo, Daejeon (KR); Do-Gyun Kim, Daejeon (KR); Geon-Woo Min, Daejeon (KR); Hae-Jin Lim, Daejeon (KR); Min-Ki Jo, Daejeon (KR); Jae-Woong Kim, Daejeon (KR); Jong-Sik Park, Daejeon (KR); Yu-Sung Choe, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Bo-Hyun Kang, Daejeon (KR); Jin-Hak Kong, Daejeon (KR); Soon-O Lee, Daejeon (KR); Kyu-Hyun Choi, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/132,166

(22) Filed: Apr. 7, 2023

(65) Prior Publication Data

US 2023/0246245 A1 Aug. 3, 2023

Related U.S. Application Data

(63) Continuation of application No. 17/592,594, filed on Feb. 4, 2022.

(30) Foreign Application Priority Data

Feb. 19, 2021 (KR) .................. 10-2021-0022881
Feb. 19, 2021 (KR) .................. 10-2021-0022891
(Continued)

(51) Int. Cl.
*H01M 10/0587* (2010.01)
*H01M 4/64* (2006.01)
(Continued)

(52) U.S. Cl.
CPC ........ *H01M 10/0587* (2013.01); *H01M 4/64* (2013.01); *H01M 4/70* (2013.01);
(Continued)

(58) Field of Classification Search
CPC .............. H01M 10/0587; H01M 4/64; H01M 50/107; H01M 50/152; H01M 50/242;
(Continued)

(56) References Cited

U.S. PATENT DOCUMENTS 3,761,314 A 9/1973 Cailley
5,576,113 A 11/1996 Hirofumi et al.
(Continued)

FOREIGN PATENT DOCUMENTS

CN 1170782 A 1/1998
CN 1407642 A 4/2003
(Continued)

OTHER PUBLICATIONS

U.S. Office Action for U.S. Appl. No. 18/132,085, dated Jun. 14, 2023.
(Continued)

*Primary Examiner* — Matthew T Martin
*Assistant Examiner* — Grace Ann Kenlaw
(74) *Attorney, Agent, or Firm* — Birch, Stewart, Kolasch & Birch, LLP

(57) ABSTRACT

A battery can include an electrode assembly including a first electrode, a second electrode, and a separator between the first electrode and the second electrode. The first electrode
(Continued)

can have a pair of first sides and a pair of second sides extending between the pair of first sides, a first portion including an active material extending between the pair of first sides, and a second portion extending between the pair of first sides and exposed beyond the separator along a winding direction. The battery can further include a battery housing having a first opening at a first end and a second end with a second opening opposite the first end, a first current collector including a support portion positioned on the electrode assembly, and a housing cover which seals the first opening.

24 Claims, 23 Drawing Sheets

(30) Foreign Application Priority Data

| Feb. 19, 2021 | (KR) | 10-2021-0022894 |
|---|---|---|
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.

| H01M 4/70 | (2006.01) |
|---|---|
| H01M 50/107 | (2021.01) |
| H01M 50/152 | (2021.01) |
| H01M 50/179 | (2021.01) |
| H01M 50/183 | (2021.01) |
| H01M 50/213 | (2021.01) |
| H01M 50/242 | (2021.01) |
| H01M 50/507 | (2021.01) |
| H01M 50/509 | (2021.01) |
| H01M 50/531 | (2021.01) |
| H01M 50/533 | (2021.01) |
| H01M 50/536 | (2021.01) |
| H01M 50/559 | (2021.01) |
| H01M 50/567 | (2021.01) |

(52) U.S. Cl.
CPC ....... *H01M 50/107* (2021.01); *H01M 50/152* (2021.01); *H01M 50/179* (2021.01); *H01M 50/183* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/559* (2021.01); *H01M 50/567* (2021.01); *H01M 2220/20* (2013.01)

(58) Field of Classification Search
CPC ............. H01M 50/507; H01M 50/533; H01M 50/536
See application file for complete search history.

(56) References Cited

U.S. PATENT DOCUMENTS

| 5,665,483 | A | 9/1997 | Saito et al. |
|---|---|---|---|
| 5,849,431 | A | 12/1998 | Kita et al. |
| 6,399,237 | B1 | 6/2002 | Souliac et al. |
| 6,451,473 | B1 | 9/2002 | Saito et al. |
| 6,653,017 | B2 | 11/2003 | Satoh et al. |
| 6,677,082 | B2 | 1/2004 | Thackeray et al. |
| 6,680,143 | B2 | 1/2004 | Thackeray et al. |
| 7,273,678 | B2 | 9/2007 | Akita et al. |
| 8,007,549 | B2 | 8/2011 | Ligeois et al. |
| 9,496,539 | B2 | 11/2016 | Tyler et al. |
| 9,496,557 | B2 | 11/2016 | Fuhr et al. |
| 10,840,555 | B2 | 11/2020 | Iwama et al. |
| 2001/0004505 | A1 | 6/2001 | Kim et al. |
| 2001/0051297 | A1 | 12/2001 | Nemoto et al. |
| 2001/0053477 | A1 | 12/2001 | Kitoh et al. |
| 2002/0061435 | A1 | 5/2002 | Hisai |
| 2002/0110729 | A1 | 8/2002 | Hozumi et al. |
| 2003/0035993 | A1 | 2/2003 | Enomoto et al. |
| 2003/0049536 | A1 | 3/2003 | Wiepen |
| 2003/0064285 | A1 | 4/2003 | Kawamura et al. |
| 2004/0023108 | A1 | 2/2004 | Nakanishi et al. |
| 2005/0048365 | A1 | 3/2005 | Miyahisa et al. |
| 2005/0058184 | A1 | 3/2005 | Paul et al. |
| 2005/0118499 | A1 | 6/2005 | Kim |
| 2005/0158620 | A1* | 7/2005 | Kim ............... H01M 50/533 |
| | | | 429/185 |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0260489 | A1 | 11/2005 | Kim |
| 2005/0287428 | A1 | 12/2005 | Cheon et al. |
| 2005/0287432 | A1 | 12/2005 | Cheon et al. |
| 2006/0024574 | A1 | 2/2006 | Yim et al. |
| 2006/0063063 | A1* | 3/2006 | Mori ................ H01M 10/0585 |
| | | | 429/61 |
| 2006/0204841 | A1 | 9/2006 | Satoh et al. |
| 2008/0026293 | A1 | 1/2008 | Marple et al. |
| 2008/0038629 | A1 | 2/2008 | Okabe et al. |
| 2008/0057394 | A1 | 3/2008 | Rigobert et al. |
| 2008/0145756 | A1 | 6/2008 | Taniguichi |
| 2008/0182159 | A1 | 7/2008 | Mitani et al. |
| 2009/0104520 | A1 | 4/2009 | Marple |
| 2009/0208830 | A1 | 8/2009 | Okabe et al. |
| 2009/0208836 | A1 | 8/2009 | Fuhr et al. |
| 2009/0239133 | A1 | 9/2009 | Kosugi |
| 2009/0280406 | A1 | 11/2009 | Kozuki |
| 2009/0311583 | A1 | 12/2009 | Wu |
| 2010/0081052 | A1 | 4/2010 | Morishima et al. |
| 2010/0129716 | A1 | 5/2010 | Kato et al. |
| 2010/0151317 | A1 | 6/2010 | Kim et al. |
| 2010/0216001 | A1 | 8/2010 | Byun et al. |
| 2010/0266893 | A1 | 10/2010 | Martin et al. |
| 2010/0316897 | A1 | 12/2010 | Kozuki et al. |
| 2010/0330414 | A1 | 12/2010 | Mori |
| 2011/0027644 | A1 | 2/2011 | Kiyama |
| 2011/0067227 | A1 | 3/2011 | Sohn |

(56) References Cited

U.S. PATENT DOCUMENTS

| | | |
|---|---|---|
| 2011/0086252 A1* | 4/2011 | Phillips ............... H01M 50/325 29/623.2 |
| 2011/0171508 A1 | 7/2011 | Kim |
| 2011/0256433 A1 | 10/2011 | Fuhr et al. |
| 2012/0058375 A1 | 3/2012 | Tanaka et al. |
| 2012/0094169 A1 | 4/2012 | Kim et al. |
| 2012/0231641 A1 | 9/2012 | Sugai et al. |
| 2012/0297611 A1 | 11/2012 | Ma |
| 2013/0136977 A1 | 5/2013 | Masuda |
| 2013/0183556 A1 | 7/2013 | Kim |
| 2013/0273401 A1 | 10/2013 | Lee et al. |
| 2013/0323574 A1 | 12/2013 | Tsunaki et al. |
| 2014/0079971 A1 | 3/2014 | Huang |
| 2014/0113185 A1 | 4/2014 | Mori et al. |
| 2014/0162097 A1 | 6/2014 | Fuhr et al. |
| 2014/0205868 A1 | 7/2014 | Phillips |
| 2014/0212695 A1 | 7/2014 | Lane et al. |
| 2014/0234676 A1 | 8/2014 | Tyler et al. |
| 2014/0255748 A1 | 9/2014 | Jan et al. |
| 2015/0104694 A1 | 4/2015 | Okuda et al. |
| 2015/0140379 A1 | 5/2015 | Yau |
| 2015/0155532 A1 | 6/2015 | Harayama et al. |
| 2016/0043373 A1 | 2/2016 | Arishima et al. |
| 2016/0099451 A1 | 4/2016 | Murai et al. |
| 2016/0141589 A1 | 5/2016 | Kang et al. |
| 2016/0155998 A1 | 6/2016 | Wakimoto et al. |
| 2016/0181577 A1 | 6/2016 | Kajiwara et al. |
| 2016/0226056 A1 | 8/2016 | Masson et al. |
| 2016/0329542 A1 | 11/2016 | Tyler et al. |
| 2017/0018750 A1 | 1/2017 | Wininer |
| 2017/0047575 A1 | 2/2017 | Tsuji et al. |
| 2017/0062789 A1 | 3/2017 | Sim et al. |
| 2017/0149042 A1 | 5/2017 | Koo et al. |
| 2017/0200935 A1 | 7/2017 | Hong et al. |
| 2017/0187068 A1 | 8/2017 | Morisawa et al. |
| 2017/0256769 A1 | 9/2017 | Wynn et al. |
| 2017/0372848 A1 | 12/2017 | Yoon et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0148683 A1 | 5/2019 | Kwon et al. |
| 2019/0221791 A1 | 6/2019 | Wakimoto |
| 2019/0296283 A1 | 9/2019 | Chen et al. |
| 2019/0379019 A1 | 12/2019 | Fukuda et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1 | 5/2020 | Tsuruta et al. |
| 2020/0203773 A1 | 6/2020 | Fujita et al. |
| 2020/0212374 A1 | 7/2020 | Gaugler |
| 2020/0235369 A1 | 7/2020 | Jeong et al. |
| 2020/0295341 A1* | 9/2020 | Kim .................... H01M 50/538 |
| 2020/0388856 A1 | 12/2020 | Hayashi |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1 | 7/2021 | Mukai et al. |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1 | 2/2022 | Kritzer et al. |
| 2022/0069335 A1 | 3/2022 | Kim |
| 2022/0123444 A1 | 4/2022 | Liu et al. |
| 2023/0123195 A1 | 4/2023 | Fang et al. |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2881384 Y | 2/2005 |
| CN | 1700495 A | 11/2005 |
| CN | 1832228 A | 9/2006 |
| CN | 1309105 C | 4/2007 |
| CN | 101010818 A | 7/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101288572 A | 10/2008 |
| CN | 100468827 C | 3/2009 |
| CN | 101404338 A | 4/2009 |
| CN | 101501884 A | 8/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103280543 A | 9/2013 |
| CN | 103427063 A | 12/2013 |
| CN | 203553261 U | 4/2014 |
| CN | 103797611 A | 5/2014 |
| CN | 203967145 U | 11/2014 |
| CN | 104396044 A | 3/2015 |
| CN | 204230370 U | 3/2015 |
| CN | 204596910 U | 8/2015 |
| CN | 204885287 U | 12/2015 |
| CN | 105449291 A | 3/2016 |
| CN | 105655623 A | 6/2016 |
| CN | 106159350 A | 11/2016 |
| CN | 205863251 U | 1/2017 |
| CN | 106463654 A | 2/2017 |
| CN | 107112597 A | 8/2017 |
| CN | 206461019 U | 9/2017 |
| CN | 206471426 U | 9/2017 |
| CN | 208481044 U | 9/2017 |
| CN | 104488113 B | 10/2017 |
| CN | 107275524 A | 10/2017 |
| CN | 208819838 U | 11/2017 |
| CN | 107431215 A | 12/2017 |
| CN | 107482156 A | 12/2017 |
| CN | 107851769 A | 3/2018 |
| CN | 207217854 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209328958 U | 8/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | ON111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 214378637 U | 10/2021 |
| CN | 215342666 U | 12/2021 |

(56) References Cited

FOREIGN PATENT DOCUMENTS

| | | |
|---|---|---|
| CN | 114865242 A | 8/2022 |
| EP | 2677592 A1 | 12/2013 |
| EP | 2 728 647 A1 | 5/2014 |
| EP | 2 876 338 A1 | 5/2015 |
| EP | 2 160 777 B1 | 3/2019 |
| EP | 4087034 A1 | 11/2022 |
| EP | 4336649 A1 | 3/2024 |
| GB | 1191105 A | 5/1970 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-176447 A | 7/1999 |
| JP | 11-297301 A | 10/1999 |
| JP | 2955135 B2 | 10/1999 |
| JP | 11-329398 A | 11/1999 |
| JP | 2000-243433 A | 9/2000 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115285 A | 4/2003 |
| JP | 2004-14173 A | 1/2004 |
| JP | 2004-95487 A | 3/2004 |
| JP | 2004-253253 A | 9/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 2006-120606 A | 5/2006 |
| JP | 3906519 B2 | 1/2007 |
| JP | 2007-234486 A | 9/2007 |
| JP | 2008-66302 A | 3/2008 |
| JP | 3751782 B2 | 3/2008 |
| JP | 2008-123848 A | 5/2008 |
| JP | 2006-278016 A | 10/2008 |
| JP | 2008-243811 A | 10/2008 |
| JP | 2009-10492 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 4401634 B2 | 1/2010 |
| JP | 2010-33940 A | 2/2010 |
| JP | 4430587 B2 | 3/2010 |
| JP | 2010-529624 A | 8/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 5651536 B2 | 1/2015 |
| JP | 2015-106613 A | 6/2015 |
| JP | 2015-222685 A | 12/2015 |
| JP | 2016-100323 A | 5/2016 |
| JP | 5935878 B2 | 6/2016 |
| JP | 2016-225014 A | 12/2016 |
| JP | 2017-143004 A | 8/2017 |
| JP | 5877724 B2 | 3/2018 |
| JP | 20850754 A | 3/2018 |
| JP | 2018-092776 A | 6/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202036 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612238 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2016-0043725 A | 4/2016 |
| KR | 10-2018-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0118156 A | 10/2018 |
| KR | 20180116156 A * | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | WO 01/59856 A1 | 8/2001 |
| WO | WO2006/035980 A1 | 4/2006 |
| WO | WO 2006/085437 A1 | 8/2006 |
| WO | WO 2010/0146154 A2 | 12/2010 |
| WO | WO 2012/090599 A1 | 7/2012 |
| WO | WO 2013/024774 A1 | 2/2013 |
| WO | 2013-246966 A | 12/2013 |
| WO | WO 2015/025388 A1 | 2/2015 |
| WO | WO 2018/117457 A1 | 6/2018 |
| WO | WO 2020/060069 A1 | 3/2020 |
| WO | WO 2020/149350 A1 | 7/2020 |
| WO | WO 2020/159071 A1 | 8/2020 |
| WO | WO 2020/171426 A1 | 8/2020 |
| WO | WO 2021/020119 A1 | 2/2021 |
| WO | WO 2021/020237 A1 | 2/2021 |

OTHER PUBLICATIONS

U.S. Office Action for U.S. Appl. No. 17/592,597, dated Jun. 21, 2023.

(56) References Cited

OTHER PUBLICATIONS

U.S. Advisory Action for U.S. Appl. No. 18/086,485, dated Nov. 3, 2023.
"Laser Welding vs. Arc (Tig) Welding of Medical Instruments," Accumet, Oct. 22, 2014, 2 pages total.
Ma et al., "Electro-Thermal Modeling of a Lithium-ion Battery System," Sae International, vol. 3, Issue 2, Oct. 25, 2010, p. 306.
U.S. Office Action for U.S. Appl. No. 17/579,380, dated Jul. 20, 2023.
U.S. Office Action for U.S. Appl. No. 18/086,410, dated Jul. 24, 2023.
U.S. Office Action for U.S. Appl. No. 18/086,485, dated Aug. 15, 2023.
European Search Report mailed in EP 22 15 2207 on Jul. 22, 2022 (9 pages).
European Search Report mailed in EP 22152223 on Jul. 29, 2022 (10 pages).
European Search Report mailed in EP 22152237 on Aug. 2, 2022 (11 pages).
European Search Report mailed in EP 22152245 on Jul. 28, 2022 (11 pages).
European Search Report mailed in EP 22152250 on Aug. 5, 2022 (12 pages).
U.S. Office Action for U.S. Appl. No. 17/592,594, dated Nov. 24, 2023.
U.S. Office Action for U.S. Appl. No. 18/132,140, dated Nov. 28, 2023.
Nigel, "Tesla 4680 Cell," Battery Design, Nov. 18, 2022, URL: <https://www.batterydesign.net/tesla-4680-cell/>.
U.S. Notice of Allowance for U.S. Appl. No. 18/131,751, dated Jan. 16, 2024.
European Communication pursuant to Rule 114(2) EPC for European Application No. 22742840.6, dated Feb. 5, 2024.
ASM Aerospace Specification Metals Inc., "Aluminum 5052-H19 Foil", 2001, https://asm.matweb.com/search/SpecificMaterial.asp?bassnum=ma5052h19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=l6T9xleZTds, 2 pages.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
Full English Translation of Japanese Publication No. 2002-289170-A dated Oct. 4, 2002.
Third Party Observation dated Apr. 9, 2024 for European Application No. 22742833.1.
European Communication pursuant to Rule 114(2) EPC for European Application No. 22756569.4, dated Jun. 6, 2024.
European Communication pursuant to Rule 114(2) EPC for European Application No. 22756569.4, dated May 27, 2024.
European Communication pursuant to Rule 114(2) EPC for European Application No. 22756574.4, dated May 3, 2024.
European Communication pursuant to Rule 114(2) EPC for European Application No. 22756576.9, dated Apr. 16, 2024.
European Communication pursuant to Rule 114(2) EPC for European Application No. 22856151.0, dated Apr. 30, 2024.
European Communication pursuant to Rule 114(2) EPC for European Application No. 22881171.7, dated May 3, 2024.
European Communication pursuant to Rule 114(2) EPC for European Application No. 22883724.1, dated May 8, 2024.
European Communication pursuant to Rule 114(2) EPC for European Application No. 22895785.8, dated Apr. 16, 2024.
Partial Supplementary European Search Report dated Jul. 15, 2024, for European Application No. 22742840.6.
Third Party Observation dated Jul. 22, 2024 for European Application No. 22881172.5.
U.S. Office Action for U.S. Appl. No. 18/086,402 dated Jun. 12, 2024.

\* cited by examiner

BATTERY AND CURRENT COLLECTOR APPLIED THERETO, AND BATTERY PACK AND VEHICLE INCLUDING THE BATTERY

CROSS-REFERENCE TO RELATED APPLICATIONS

This application is a Continuation of U.S. application Ser. No. 17/592,594, filed on Feb. 4, 2022, which claims priority under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, where all of these applications are hereby expressly incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to a battery, a current collector applied thereto, and a battery pack and a vehicle including the battery. More particularly, the present disclosure relates to a current collector having a structure for preventing damage in a welded portion with an electrode assembly when external impacts are applied, a battery including the same, and a battery pack and a vehicle including the battery.

BACKGROUND ART

In general, conventional cylindrical batteries have a structure in which a tab connecting a jelly-roll to an external terminal is connected to a foil of the jelly-roll by welding. The cylindrical batteries of this structure have a limited path of current and very high resistance of the jelly-roll itself.

Accordingly, attempts have been made to reduce the resistance by increasing the number of tabs connecting the jelly-roll to the external terminal, but increasing the number of tabs is insufficient to reduce the resistance to a desired level and ensure sufficient path of current.

Accordingly, to reduce the resistance of the jelly-roll itself, it is necessary to develop a new jelly-roll structure and a current collector structure suitable for the jelly-roll structure. In particular, for example, devices requiring high output/high capacity battery packs, such as electric vehicles, have greater need for the use of the new structure of jelly-roll and current collector.

In addition, it is necessary to develop cylindrical batteries having a structure with improved coupling strength between a current collector and a battery housing and a current collector structure applied to the cylindrical batteries.

Moreover, it is necessary to develop cylindrical batteries with improved energy density by minimizing the dead space in the battery housing when the current collector and the battery housing are coupled.

Recently, as the cylindrical batteries are applied to electric vehicles, the form factor of the cylindrical batteries increases. That is, the cylindrical batteries are increasing in diameter and height compared to the conventional cylindrical batteries with 1865, 2170 form factor. The increase in form factor leads to the increased energy density, increased safety from thermal runaway and improved cooling efficiency.

The energy density of the cylindrical battery may further increase when the unnecessary space in the battery housing is minimal together with the increasing form factor. Accordingly, it is necessary to design the current collector with a low resistance structure over the entire structure of the battery to increase the capacity of the battery and minimize the amount of heat generated during rapid charging.

In addition, the battery packs applied to electric vehicles are often exposed to vibrations and impacts due to the environment in which the battery packs are used. Accordingly, there is a need for development of cylindrical batteries having a structure for reducing the likelihood that damage may occur in a welded portion when vibrations and external impacts are applied and a current collector structure applied to the cylindrical batteries.

DISCLOSURE

Technical Problem

The present disclosure is designed to solve the above-described problem, and therefore the present disclosure is directed to providing a current collector having a suitable structure for an electrode assembly having a low resistance structure and a battery including the same.

In another aspect, the present disclosure is directed to providing a current collector having a structure for improving the coupling strength of a coupled portion between the current collector and the battery housing and a battery including the same.

In another aspect, the present disclosure is directed to providing a current collector having a structure for improving the energy density of a battery and a battery including the same.

In another aspect, the present disclosure is directed to providing a current collector having a structure for increasing the convenience of the welding process for electrical connection between the battery housing and the current collector in the manufacture of the battery, thereby improving the productivity, and a battery including the same.

In another aspect, the present disclosure is directed to providing a current collector having a structure for significantly reducing the likelihood that damage may occur in the welded portion with the electrode assembly and/or the welded portion with the battery housing when vibrations and impacts are applied and a battery including the same.

In another aspect, the present disclosure is directed to providing a current collector having a structure for increasing the convenience in the welding process for electrical connection between the battery housing and the current collector in the manufacture of the battery, thereby improving the productivity, and a battery including the same.

However, the technical problem of the present disclosure is not limited to the above-described problem, and other problems not mentioned herein will be clearly understood by those skilled in the art from the following description.

Technical Solution

To solve the above-described problem, a battery according to an embodiment of the present disclosure includes an electrode assembly including a first electrode, a second electrode, and a separator between the first electrode and the second electrode, wherein the first electrode, the second electrode, and the separator are wound about an axis defining a core and an outer circumferential surface, wherein the first electrode has a pair of first sides and a pair of second sides extending between the pair of first sides, a first portion including an active material extending between the pair of first sides, and a second portion extending between the pair of first sides and exposed beyond the separator along a winding direction, and at least part of the second portion includes an electrode tab; a battery housing having a first opening at a first end and a second end with a second opening opposite the first end, the battery housing accommodating the electrode assembly through the first opening at the first end; a first current collector including a support portion positioned on the electrode assembly, a first tab coupling portion extending from the support portion and coupled with the second portion of the first electrode and a first housing coupling portion extending from the support portion and electrically coupled onto an inner surface of the battery housing; and a housing cover which seals the first opening.

The first tab coupling portion and the first housing coupling portion may not be directly connected to each other, and may be indirectly connected by the support portion.

The battery housing may include a beading portion which is formed at an end portion adjacent to the first opening and is press-fit inward.

The first tab coupling portion has at least one injection hole.

The first housing coupling portion may include a first contact portion coupled onto the beading portion of the battery housing; and a first connecting portion connecting the support portion to the first contact portion.

The first connecting portion may have an upwardly convex structure with respect to an imaginary straight line connecting two ends of the first connecting portion in a longitudinal direction.

The first connecting portion may be more upwardly raised than the beading portion.

The beading portion may include an upper beading portion at an upper part with respect to an innermost point; and a lower beading portion at a lower part with respect to the innermost point.

The upper beading portion and the lower beading portion may be asymmetrical with respect to an imaginary reference plane passing through the innermost point of the beading portion in parallel to a bottom surface of the battery housing.

The first tab coupling portion of the first current collector may disposed at a lower position than the lower beading portion.

At least one of the upper beading portion or the lower beading portion may be inclined at a predetermined angle to a lower surface of the battery housing.

The first contact portion may be seated on an inclined upper surface of the beading portion.

At least one of the upper beading portion or the lower beading portion, at least in part, may be parallel to a lower surface of the battery housing.

The first contact portion may be seated on a flat upper surface of the beading portion.

The first contact portion may be coupled to an upper surface of the beading portion by welding.

The first contact portion may be coupled within a flat area formed on the upper beading portion by welding.

At least a part of the first contact portion may have a shape of an arc which extends in a circumferential direction along the beading portion of the battery housing.

The first contact portion may have a shape of an arc which extends from an intersection between the first connecting portion and the first contact portion in opposite directions along a circumferential direction on the beading portion.

A press-fit depth of the beading portion PD may satisfy the following formula:

$$PD \geq R1_{,min} + R2_{,min} + W_{bead,min}$$

wherein $R1_{,min}$ is a minimum value of a radius of curvature of the beading portion, $W_{bead,min}$ is a minimum value of a welding bead width, and $R2_{,min}$ is a minimum value of a radius of curvature at a boundary area between the beading portion and the inner surface of the battery housing.

A press-fit depth of the beading portion may be 0.2 mm to 10 mm.

A press-fit depth of the beading portion PD and a maximum press-fit depth $PD_{max}$ may satisfy the following formula:

$$(R1_{,min} + W_{bead,min})/PD_{max} \leq OV/PD \leq (PD_{max} - R2_{,min})/PD_{max}$$

wherein OV is an overlap length, the overlap length being a shortest distance from an end of the first contact portion to a vertical line passing through an innermost point of the beading portion, $R1_{,min}$ is a minimum radius of curvature of the beading portion, $W_{bead,min}$ is a minimum welding bead width, and $R2_{,min}$ is a minimum radius of curvature at a boundary area between the beading portion and the inner surface of the battery housing.

A weld area between the first contact portion and the beading portion may be narrower than a flat upper surface of the beading portion.

A press-fit depth of the beading portion PD and a maximum value of the press-fit depth $PD_{max}$ satisfy the following formula:

$$(OV_{min}-0.5*W_{bead,min})/PD_{max} \leq W/PD \leq (OV_{max}-0.5*W_{bead,min})/PD_{max}$$

wherein W is a distance from an innermost point of the beading portion to the center point of the welding bead disposed on an outermost side in a radial direction, OV is an overlap length, the overlap length being a shortest distance from an end of the first contact portion to a vertical line passing through the innermost point of the beading portion, $OV_{min}$ is a minimum overlap length, $OV_{max}$ is a maximum overlap length, and $W_{bead,min}$ is a minimum welding bead width.

A minimum value of the distance from the innermost point of the beading portion to the center point of the welding bead disposed on the outermost side in the radial direction W1 and the distance from the innermost point of the beading portion to the center point of the welding bead disposed on the outermost side in the radial direction W may satisfy the following formula:

$$W1=R1+0.5*W_{bead,min}$$

$$W=OV-0.5*W_{bead,min} \text{ are satisfied,}$$

wherein R1 is a radius of curvature of the beading portion is R1.

The beading portion, at least in part, may have a flat region parallel to a lower surface of the battery housing, and a length of the flat region of the beading portion in contact with the first current collector may be OV−R1 where R1 is a radius of curvature of the beading portion.

A width in a radial direction of a welding pattern formed between the beading portion and the first contact portion may be $W_{bead,min}$ or more and OV−R1 or less.

A ratio of the width in a radial direction of the welding pattern to the length of the flat region may be in a range of 10 to 40%.

The first connecting portion may include at least one first bending portion which changes in extension direction at least once.

The first bending portion may pass through a center of an imaginary straight line connecting one end of the first contact portion to one end of the first tab coupling portion and may be disposed at a higher position than an imaginary plane parallel to a bottom surface of the battery housing.

The at least one first bending portion may be bent at an obtuse angle not to overlap with itself, when viewed along a longitudinal direction of the battery housing.

A boundary between the first contact portion and the first connecting portion may be bent at an obtuse angle.

The first connecting portion may decrease in slope stepwise or gradually toward the beading portion.

An angle between the first tab coupling portion and the first connecting portion may be between 0° and 90°.

The first connecting portion may support the housing cover.

The first tab coupling portion and the first contact portion may be disposed at a substantially equal height.

The first contact portion may have a flat surface which is coupled with an upper surface of the beading portion toward the first opening.

The first current collector may have a hole formed at a center.

The hole may be provided at a location corresponding to a winding hole formed at a center of the electrode assembly.

A diameter of the hole may be equal to or larger than a diameter of the winding hole provided in the core of the electrode assembly.

The the first current collector may further include a plurality of the first tab coupling portions; and a second housing coupling portion extending from an end of one of the plurality of the first tab coupling portions and coupled onto the inner surface of the battery housing.

The second housing coupling portion may include a second contact portion coupled onto the inner surface of the battery housing; and a second connecting portion connecting the end of one of the plurality of the first tab coupling portions to the second contact portion.

At least part of the second contact portion may extend along an inner circumferential surface of the battery housing.

The second connecting portion may include at least one second bending portion which changes in extension direction at least once.

A distance from a center of the first current collector to an end of the first tab coupling portion may be substantially equal to or shorter than a distance from a center of a winding hole of the electrode assembly to an innermost side of the beading portion.

An upper surface of the beading portion may a flat region.

At least one welding bead may formed between the beading portion and the first contact portion, and the at least one welding bead may form a straight line welding pattern extending approximately along a circumferential direction.

At least one welding bead may be formed between the beading portion and the first contact portion, and the at least one welding bead may form an arc welding pattern extending along a circumferential direction.

A welding bead may be formed between the beading portion and the first contact portion, the welding bead may form a welding pattern, and the welding pattern may have a shape of a line formed by connecting spot weldings.

A plurality of welding beads formed between the beading portion and the first contact portion may be formed within a same first contact portion.

The second electrode may have a pair of third sides and a pair of fourth sides extending between the pair of third sides, a third portion including an active material extending between the pair of third sides, and a fourth portion extending between the pair of third sides, and the fourth portion is exposed beyond the separator along a winding direction, and at least part of the fourth portion includes an electrode tab, and wherein the battery may further comprise a terminal electrically connected to the fourth portion through the second opening at the second end of the battery housing.

The battery may further include a second current collector disposed between the electrode assembly and the terminal, and the second current collector may include a second tab coupling portion coupled with the fourth portion; and a terminal coupling portion coupled with the terminal.

The terminal coupling portion may cover a winding hole of the electrode assembly.

An outer diameter of the second current collector may be larger than an outer diameter of the first current collector.

The fourth portion may be bent providing a coupling surface, and the second tab coupling portion may be coupled onto the coupling surface.

The battery housing may include a crimping portion which is formed above the beading portion, and is extended and bent around a circumferential edge of the housing cover.

The first housing coupling portion may be compressed and fixed by the crimping portion.

The battery may further include a sealing gasket positioned in the crimping portion and interposed between the battery housing and the housing cover.

The first contact portion may be positioned between the beading portion and the sealing gasket.

The first contact portion may be fixed by bending the crimping portion.

The sealing gasket may have a larger thickness at an area that does not contact the first contact portion than at a contact area with the first contact portion.

The sealing gasket may have a larger compression ratio at a contact area with the first contact portion than at an area that does not contact the first contact portion.

The sealing gasket may have a compression ratio at a contact area with the first contact portion which is substantially equal to a compression ratio at an area that does not contact the first contact portion.

The sealing gasket may change in thickness area by area along a circumferential direction on the beading portion.

The sealing gasket may repeatedly increase and decrease in thickness in an alternating manner along a circumferential direction on the beading portion.

The sealing gasket may change in compression ratio area by area along a circumferential direction on the beading portion.

The first housing coupling portion may be elastically biased on the beading portion.

A connected portion between the first contact portion and the first connecting portion may have a complementary shape corresponding to an inner surface of the beading portion.

At least part of the second portion may a plurality of segments split along the winding direction of the electrode assembly, and the plurality of segments may be bent along a radial direction of the electrode assembly forming a bent surface.

The plurality of segments may overlap in multiple layers forming the bent surface, and the bent surface may include an increasing stack number zone in which the number of overlapping layers of the segments sequentially increases to a maximum value from an outer circumference of the electrode assembly to the core and a uniform stack number zone from a radial position at which the number of overlapping layers is at a maximum to a radial position at which an innermost segment exists.

The first tab coupling portion may be coupled to the bent surface such that it overlaps with the uniform stack number zone.

The number of overlapping layers of the uniform stack number zone may be 10 or more.

The first tab coupling portion may be welded to the bent surface, and a weld area of the tab coupling portion may over at least 50% with the uniform stack number zone along the radial direction of the electrode assembly.

The second portion and the first tab coupling portion may be coupled by welding along a radial direction of the electrode assembly.

The first tab coupling portion may be coupled to the second portion by welding while being in parallel to a lower surface of the battery housing.

A welding bead formed between the second portion and the first tab coupling portion may form a straight line welding pattern which extends along the radial direction of the electrode assembly.

A welding bead formed between the first uncoated region and the first tab coupling portion may form a welding pattern, and the welding pattern may have a shape of a line formed by connecting spot weldings.

A width of a welding bead formed between the second portion and the first tab coupling portion may be 0.1 mm or more.

A plurality of the first tab coupling portions and a plurality of the first housing coupling portions may be provided, and the plurality of first tab coupling portions and the plurality of first housing coupling portions may be arranged in a radial pattern, a crisscross pattern or a combined pattern with respect to a center of the first current collector.

Each of the plurality of the first housing coupling portions may be positioned between adjacent first tab coupling portions.

A plurality of the first housing coupling portions may be provided, and the first contact portions of the plurality of the first housing coupling portions may be connected to each other and integrally formed.

An outermost point of the first connecting portion may be spaced a predetermined distance apart from an innermost point of the beading portion.

An angle between the first contact portion and the first connecting portion may be an acute angle due to the first bending portion.

A plurality of the injection holes may be provided.

The plurality of the injection holes may be symmetrically arranged on left and right sides with respect to a center of the first tab coupling portion in a width direction.

A welding bead coupling the first tab coupling portion and the second portion may be formed between the injection holes symmetrically arranged on the left and right sides.

The first tab coupling portion may have a larger width at a location a predetermined distance away from a connected portion between the first tab coupling portion and the support portion toward an end of the first tab coupling portion in a longitudinal direction than a width at the connected portion between the first tab coupling portion and the support portion.

The injection hole may be formed at the location a predetermined distance away from a connected portion toward the end of the first tab coupling portion in the longitudinal direction.

At least part of an area in which the injection hole is formed may be included in an extended area by a larger width at the location the predetermined distance away from the connected portion to the end of the first tab coupling portion than the width at the connected portion between the first tab coupling portion and the support portion.

An end of the first tab coupling portion in the longitudinal direction may have a shape of an arc corresponding to an inner circumferential surface of the battery housing. An extension direction of the welding pattern formed between the second portion and the first tab coupling portion and an extension direction of a welding pattern formed between the beading portion and the first contact portion may be perpendicular to each other.

An innermost point of the beading portion may be positioned farther inward in a radial direction than an end point of the crimping portion.

The sealing gasket may surround the housing cover, and a radial length at a region of the sealing gasket which covers a lower surface of the housing cover may be smaller than the radial length at a region of the sealing gasket which covers an upper surface of the housing cover.

A total radial length of the first tab coupling portion T satisfies the following formula:

$$JR-2*F \leq T < JR$$

wherein JR is an outer diameter of the electrode assembly, and F is a height of the segment positioned on an outermost side of the electrode assembly.

A ratio of an area where the first current collector and an upper surface of the electrode assembly do not contact to an area of a circle having an outer diameter of the electrode assembly as its diameter may be 30% or more and less than 100%.

A ratio of an area where the first current collector and the electrode assembly do not contact to an area of a circle having an outer diameter of the electrode assembly as its diameter may be 60% or more and less than 100%.

A diameter of the first current collector hole may be smaller than a diameter of a winding hole in the core of the electrode assembly.

The diameter of the first current collector hole may be 0.5*R3 or more and less than R3, where R3 is the diameter of the winding hole.

The diameter of the first current collector hole may be 0.7*R3 or more and less than R3.

A form factor ratio obtained by dividing a diameter of the battery by a height may be larger than 0.4.

A measured resistance between a positive electrode and a negative electrode may be 4 mohm or less.

A battery according to another embodiment of the present disclosure may include an electrode assembly including a first electrode, a second electrode and a separator between the first electrode and the second electrode, wherein the first electrode, the second electrode, and the separator are wound about an axis defining a core and an outer circumferential surface, wherein the first electrode has a pair of first sides and a pair of second sides extending between the pair of first sides, a first portion extending between the pair of first sides, and a second portion extending between the pair of first sides, the first portion is coated with an active material and the second portion is exposed beyond the separator along a winding direction, and at least part of the second portion includes an electrode tab; a battery housing having a first opening at a first end and a second end with a second opening opposite the first end, the battery housing accommodating the electrode assembly through the first opening; and a first current collector electrically coupled with the second portion and an inner surface of the battery housing, wherein the first current collector includes a first part which contacts the inner surface of the battery housing and a second part coupled with the second portion of the first electrode, and when a central region of the first part is projected onto a plane in which the second part exists, the central region of the first part and the second part are spaced apart from each other along a circumferential direction of the electrode assembly.

The battery may further include a sealing gasket between the first opening at the first end of the battery housing and the first current collector, and the first part may be interposed between the inner surface of the battery housing and the sealing gasket.

The first part and the second part may be disposed on different planes in a direction of the axis of the electrode assembly.

In addition, to solve the above-described problem, a current collector of a battery according to another embodiment of the present disclosure includes a support portion to be positioned on an electrode assembly of the battery; a plurality of tab coupling portions extending from the support portion and to be coupled with a portion of an electrode of the electrode assembly; and a first housing coupling portion extending from the support portion, disposed between the adjacent tab coupling portions and to be electrically coupled onto a beading portion of the battery housing.

The tab coupling portions and the first housing coupling portion may not be directly connected to each other, and may be indirectly connected by the support portion.

Each of the tab coupling portions may have at least one injection hole.

The first housing coupling portion may include a first contact portion to be coupled onto the beading portion of the battery housing; and a first connecting portion connecting the support portion to the first contact portion.

The first connecting portion may include at least one first bending portion which changes in extension direction at least once.

The current collector may include a hole formed at a center.

The current collector may further include a second housing coupling portion extending from an end of one of the plurality of tab coupling portions to be coupled onto the beading portion of the battery housing.

The second housing coupling portion may include a second contact portion to be coupled onto the beading portion of the battery housing; and a second connecting portion connecting the end of one of the plurality of tab coupling portions to the second contact portion.

A plurality of the first housing coupling portions may be provided, and the first contact portions of the plurality of the first housing coupling portions may be connected to each other and integrally formed.

An angle between the first contact portion and the first connecting portion may be an acute angle due to the first bending portion.

A plurality of injection holes may be provided.

The plurality of injection holes may be symmetrically arranged on left and right sides with respect to a center of the tab coupling portion in a width direction.

The tab coupling portion may have a larger width at a location a predetermined distance away from a connected portion toward an end of the tab coupling portion in a longitudinal direction than a width at a connected portion between the tab coupling portion and the support portion.

The injection hole may be formed at the location the predetermined distance away from the connected portion toward the end of the tab coupling portion in the longitudinal direction.

At least part of an area in which the injection hole is formed may be included in an extended area by the larger width at the location the predetermined distance away from the connected portion toward the end of the tab coupling portion than the width at the connected portion between the tab coupling portion and the support portion.

An end of the tab coupling portion in a longitudinal direction may have a shape of an arc corresponding to an inner circumferential surface of the battery housing.

In addition, a battery pack according to an embodiment of the present disclosure includes a plurality of batteries according an embodiment of the present disclosure described above.

The plurality of batteries may be arranged in a predetermined number of columns, and a terminal of each of the plurality of batteries and an outer surface of the second end of the battery housing may be positioned vertically upward.

The battery pack may include a plurality of busbars to connect the plurality of batteries in series and in parallel, each busbar may be positioned on adjacent batteries among the plurality of batteries, and each busbar may include a body portion extending between the adjacent batteries; a plurality of first busbar terminals extending to a first side direction of the body portion and electrically coupled to terminals of the adjacent batteries disposed in the first side direction; and a plurality of second busbar terminals extending in a second side direction of the body portion opposite the first side direction and electrically coupled to an outer surface of the second end of the battery housing of each of the adjacent batteries disposed in the second side direction.

Finally, a vehicle according to an embodiment of the present disclosure may include the battery pack according to an embodiment of the present disclosure as described above.

Advantageous Effects

According to the present disclosure, it is possible to significantly reduce the resistance in electrically connecting the current collector to the battery housing.

In another aspect, according to the present disclosure, it is possible to improve the coupling strength of the coupled portion between the current collector and the battery housing.

In another aspect, according to the present disclosure, it is possible to improve the energy density of the battery.

In another aspect, according to the present disclosure, it is possible to increase the convenience of the welding process for electrical connection between the battery housing and the current collector in the manufacture of the battery, thereby improving the productivity.

In another aspect, according to the present disclosure, it is possible to significantly reduce the likelihood that damage may occur in the welded portion between the current collector and the electrode assembly and/or the welded portion between the current collector and the battery housing when vibrations and impacts are applied while the battery is in use.

In another aspect, according to the present disclosure, it is possible to increase the convenience in the welding process for electrical connection between the battery housing and the current collector in the manufacture of the battery, thereby improving the productivity.

However, the effects that can be obtained through the present disclosure are not limited to the above-described effects, and these and other effects will be clearly understood by those skilled in the art from the following description.

DESCRIPTION OF DRAWINGS

The accompanying drawings illustrate embodiments of the present disclosure, and together with the detailed description of the present disclosure described below, serve to provide a further understanding of the technical aspects of the present disclosure, and thus the present disclosure should not be construed as being limited to the drawing.

DETAILED DESCRIPTION OF THE EMBODIMENTS

Figure 1:
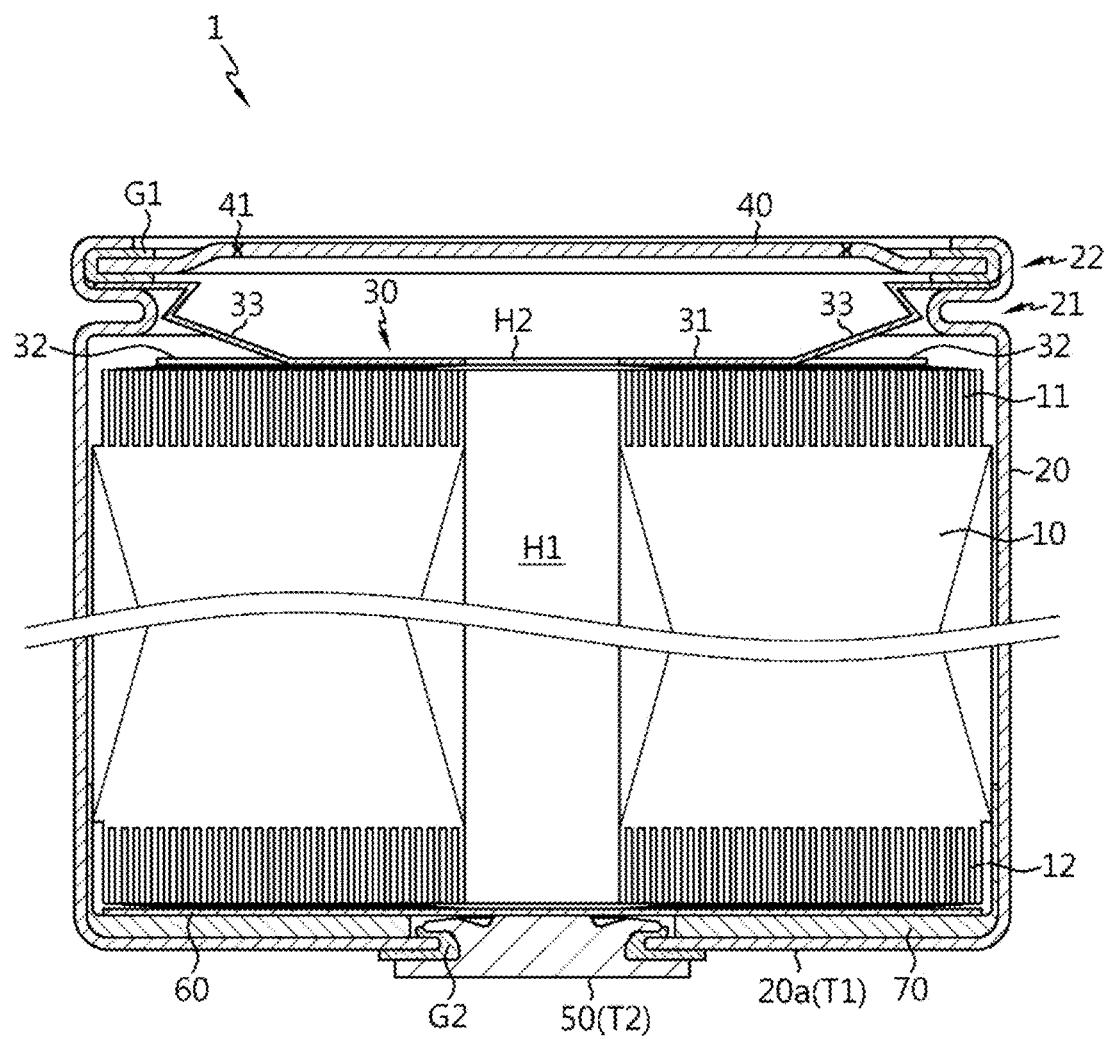
FIG. 1 is a cross-sectional view showing the internal structure of a cylindrical battery according to an embodiment of the present disclosure.

Hereinafter, the embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some of the embodiments of the present disclosure, but not intended to fully describe the technical aspects of the present disclosure, so it should be understood that a variety of other equivalents and modifications could have been made thereto at the time that the application was filed.

In addition, to help the understanding of the present disclosure, the accompanying drawings may illustrate some elements in exaggerated dimensions, not in actual scale. Furthermore, the same element in different embodiments may be given the same reference number.

When two components are referred to as being equal, it represents that they are 'substantially equal'. Accordingly, substantially equal may encompass all cases having the deviation regarded as a low level in the corresponding technical field, for example, the deviation of 5% or less. In addition, a uniform parameter in an area may refer to uniform from the average point of view.

First, referring to FIG. 1, a cylindrical battery 1 according to an embodiment of the present disclosure includes an electrode assembly 10, a battery housing 20, a current collector (a first current collector) 30, a housing cover 40 and a terminal 50. The cylindrical battery 1 may further include a sealing gasket G1 and/or an insulation gasket G2 and/or a current collector (a second current collector) 60 and/or an insulator 70.

The present invention is not limited to the shape of the battery and thus may be applicable to any battery of a different shape, for example, a prismatic battery.

The electrode assembly 10 includes a first uncoated region 11 and a second uncoated region 12. More specifically, the electrode assembly 10 has a structure in which a first electrode, a second electrode and a separator interposed between the first electrode and the second electrode are wound around a winding axis, defining a core and an outer circumferential surface. That is, the electrode assembly 10 applied to the present disclosure may be a jelly-roll type electrode assembly. In this case, an additional separator may be provided on the outer circumferential surface of the electrode assembly 10 for insulation from the battery housing 20. The electrode assembly 10 may have any well-known winding structure without limitation.

The first electrode includes a first electrode current collector and a first electrode active material coated on one or two surfaces of the first electrode current collector. An uncoated region in which the first electrode active material is not coated exists at one end of the first electrode in the widthwise direction (parallel to the heightwise direction of the cylindrical battery 1 shown in FIG. 1). That is, the first electrode includes the uncoated region which is not coated with the active material and is exposed to the outside of the separator at the end of the long side along the winding direction. The uncoated region serving as a first electrode tab is hereinafter referred to as the first uncoated region 11. The first uncoated region 11 is provided on the electrode assembly 10 received in the battery housing 20 in the heightwise direction (parallel to the heightwise direction of the cylindrical battery 1 shown in FIG. 1). That is, the first electrode includes the first uncoated region not coated with the active material layer and exposed to the outside of the separator at the end of the long side, and at least part of the first uncoated region itself is used as the electrode tab. The first uncoated region 11 may be, for example, a negative electrode tab.

Figure 30:
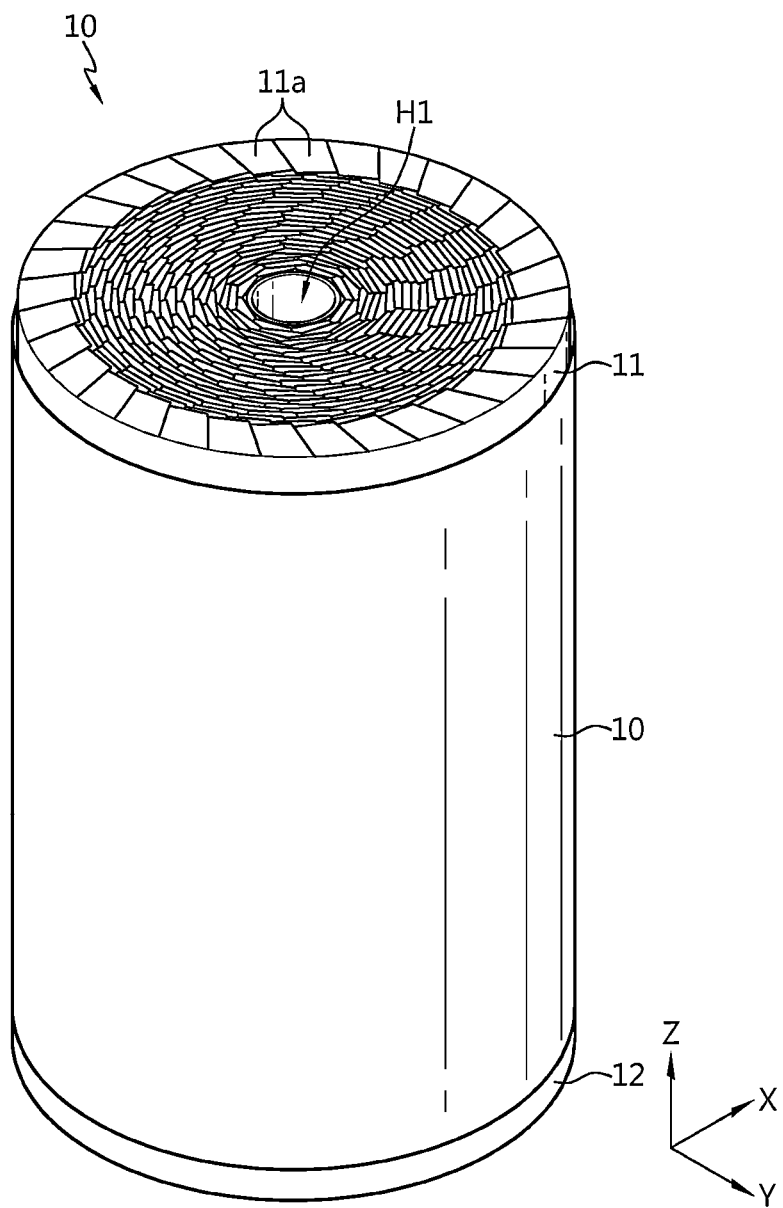
FIG. 30 is a perspective view of an electrode assembly with a bent uncoated region according to an embodiment of the present disclosure.

Meanwhile, at least part of the first uncoated region 11 may include a plurality of segments split along the winding direction of the electrode assembly 10. In this case, the plurality of segments (11a in FIG. 30) may be bent along the radial direction of the electrode assembly 10.

Figure 15:
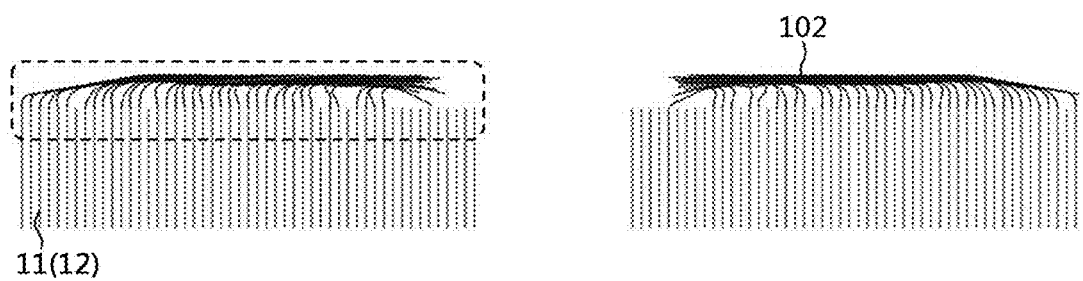
FIG. 15 is an enlarged diagram of the upper part of an electrode assembly of the present disclosure.
Figure 16:
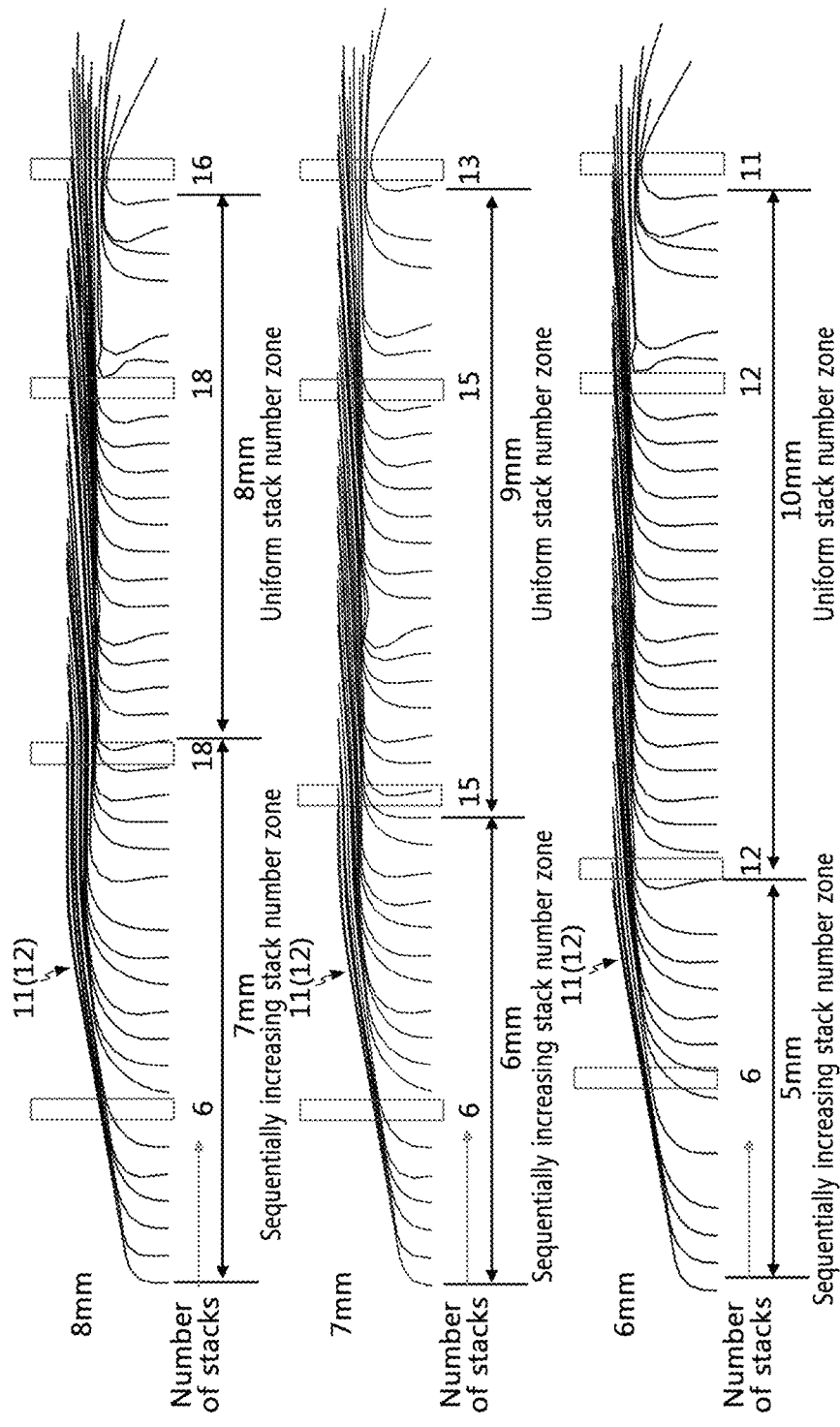
FIG. 16 is an enlarged diagram of the upper part of an uncoated region of FIG. 15.
Figure 17:
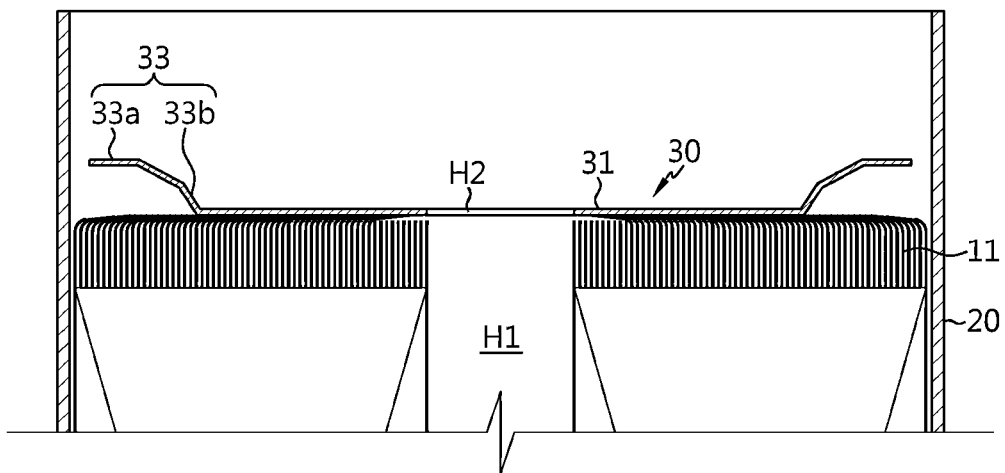
FIG. 17 is a diagram illustrating a welding process of a current collector (a first current collector).

Referring to FIGS. 15 and 16 together with FIG. 1, the plurality of bent segments of the first uncoated region 11 may overlap in multiple layers to form a bent surface (a coupling surface) 102. In this case, a tab coupling portion (a first tab coupling portion) 32 of the current collector (the first current collector) 30 as described below may be coupled onto the bent surface 102. The tab coupling portion 32 may be coupled to an area in which the plurality of segments overlaps in multiple layers. The bent surface 102 may include an increasing stack number zone in which the number of overlapping layers of the segments sequentially increases to the maximum as it goes from the outer circumference of the electrode assembly 10 to the core and a uniform stack number zone from a radial position at which the number of overlapping layers is at the maximum to a radial position at which the innermost segment exits.

In this case, when the tab coupling portion (the first tab coupling portion) 32 is seated on the bent surface 102 of the first uncoated region 11, welding may be performed on a predetermined area. That is, the tab coupling portion 32 may be coupled to the area in which the plurality of segments of the first uncoated region 11 overlaps in multiple layers. For example, the tab coupling portion 32 may be coupled to the bent surface 102 such that it overlaps with the uniform stack number zone. Referring to FIG. 16, the welding between the tab coupling portion 322 and the first uncoated region 11 may be performed in the area in which the number of overlapping layers of the first uncoated region 11 is approximately 10 or more in the bent surface 102 of the first uncoated region 11. The ratio in the radial direction for the zone in which the number of overlapping layers is ten or more may be designed as approximately 25% or more with respect to the radius of the electrode assembly 10 except the core by adjusting the length of the first uncoated region 11.

The tab coupling portion (the first tab coupling portion) 32 of the current collector (the first current collector) 30 may be coupled to the bent surface 102 such that it overlaps with the uniform stack number zone. Preferably, the tab coupling portion 32 may be welded to the bent surface 102, and the weld area of the tab coupling portion 32 may overlap at least 50% with the uniform stack number zone along the radial direction of the electrode assembly 10. The number of overlapping layers of the uniform stack number zone may be approximately 10 or more.

When welding the current collector 30 to the bent surface 102 of the first uncoated region 11, to sufficiently ensure the weld strength, it is desirable to increase the output of a laser. When the output of the laser increases, the laser penetrates into the electrode assembly 10 through the overlap area of the first uncoated region 11, causing damage to the separator and the active material layer. Accordingly, to prevent the laser from passing through, it is desirable to increase the number of overlapping layers of the first uncoated region 11 above a predetermined level. To increase the number of overlapping layers of the first uncoated region 11, it is necessary to increase the height of the segment. However, when the height of the segment increases, a swell may occur in the first uncoated region 11 in the process of manufacturing the first electrode current collector. Accordingly, it is possible to adjust the height of the segment to an appropriate level.

As described above, when the length ratio in the radial direction where the number of overlapping layers of the segments of the uncoated region is 10 or more is designed as 25% or more with respect to the radius of the electrode assembly, and the area in which the segments of the uncoated region overlap in 10 or more layers and the current collector 30 are welded using a laser, even though the output of the laser increases, the overlap region of the uncoated region sufficiently masks the laser, thereby preventing the separator and the active material layer from being damaged by the laser.

The output of the laser may be appropriately adjusted in the range of approximately 250 W to 320 W or in the range of approximately 40%-90% of the laser maximum output specification, but the present disclosure is not limited thereto. When the output of the laser satisfies the above-described numerical range, it is possible to sufficiently increase the weld strength. In an example, the weld strength may increase to 2 kgf/cm$^2$ or more, and more particularly 4 kgf/cm$^2$ or more. The weld strength may be set to 8 kgf/cm$^2$ or less, and more particularly 6 kgf/cm$^2$ or less. The weld strength is defined as the tensile force per unit area (kgf/cm$^2$) of the current collector 30 at the time when the current collector starts to be separated from the bent surface area. Specifically, after the welding of the current collector is completed, the tensile force of gradually increasing size is applied to the current collector. When the tensile force increases, the uncoated region starts to be separated from the weld interface. In this instance, a value obtained by dividing the tensile force applied to the current collector by the area of the current collector is the weld strength.

FIG. 16 is a partial cross-sectional view showing the bent surface area in which the first uncoated region 11 of the first electrode current collector split into the plurality of segments is bent from the outer circumference toward the core and overlaps in ten or more layers, in the electrode assembly included in a cylindrical battery with 4680 form factor having the radius of 22 mm and the radius of the core of 4 mm. In the drawing, the electrode assembly area and the core area having no segment is not illustrated. The height of the segment increases by 1 mm each time the radius of the electrode assembly increases by 1 mm, starting from 3 mm. In addition, after the length reaches 6 mm, 7 mm or 8 mm as shown in the drawing, the height of the segment is substantially equally maintained.

Referring to FIG. 16, it can be seen that the number of overlapping layers of the first uncoated region 11 gradually increases as it goes from the outer circumference to the core, and as the length of the first uncoated region 11 increases, the maximum value of the number of overlapping layers increases.

In an example, when the length of the first uncoated region 11 is 8 mm, the number of overlapping layers of the first uncoated region 11 split into the plurality of segments increases to 18 layers in the range of from the outer circumferential surface of the electrode assembly to 7 mm, and the number of overlapping layers of the first uncoated region 11 is maintained at a level of a maximum of 18 layers in the range of 8 mm toward the core, and reduces by 1-2 layers in the radial range adjacent to the core. The height of the segment gradually increases from 3 mm to 8 mm in the range of 7 mm to 12 mm in radius. In the present disclosure, the uniform stack number zone is defined as a radial range of from the radial position at which the number of overlapping layers reaches the maximum to the location at which the innermost segment is disposed as shown in FIG. 16. Accordingly, a ratio of the uniform stack number zone in which the segments of the first uncoated region 11 overlap in 10 or more layers to the radius of the electrode assembly except the core (4 mm) is 44.4% ($8/18$).

In another example, when the length of the first uncoated region 11 is 7 mm, the number of overlapping layers of the first uncoated region 11 split into the plurality of segments increases to 15 layers in the range of from the outer circumferential surface of the electrode assembly to 6 mm, and the number of overlapping layers of the first uncoated region 11 is uniformly maintained at a level of a maximum of 15 layers in the range of 9 mm toward the core, and reduces by 1-2 layers in the radial range adjacent to the core. The height of the segment increases stepwise from 3 mm to 7 mm in the range of 7 mm to 11 mm in radius. Accordingly, a ratio of the uniform stack number zone in which the segments of the first uncoated region 11 overlap in 10 or more layers to the radius of the electrode assembly except the core (4 mm) is 50% ($9/18$).

In still another example, when the length of the first uncoated region 11 is 6 mm, the number of overlapping layers of the first uncoated region 11 split into the plurality of segments increases to 12 layers in the range of 5 mm from the outer circumferential surface of the electrode assembly, and the number of overlapping layers of the first uncoated region 11 is uniformly maintained at a level of a maximum of 12 layers in the range of 10 mm toward the core, and reduces by 1-2 layers in the radial range adjacent to the core. The height of the segment increases from 3 mm to 6 mm in the range of 7 mm to 10 mm in radius. Accordingly, a ratio of the uniform stack number zone in which the segments of the first uncoated region 11 overlap in 10 or more layers to the radius of the electrode assembly except the core (4 mm) is 55.6% ($10/18$).

According to an embodiment, the length of the zone having the sequentially increasing number of overlapping layers increases from 5 mm to 7 mm with the increasing length of the first uncoated region 11, and in particular, it can be seen that the requirement is satisfied that the ratio of the uniform stack number zone in which the number of stacked layers is 10 or more to the radius of the electrode assembly except the core is 25% or more.

In the present disclosure, the uniform stack number zone may be increased and decreased by the radius of the core, the minimum value and the maximum value of the segment height in variable segment height zone, and the increase in height of the segment in the radial direction of the electrode assembly. Accordingly, it is extremely obvious that those skilled in the art design the corresponding ratio as 25% or more by adjusting the factors that affect the ratio of the uniform stack number zone. In an example, it is possible to increase the number of stacked layers and reduce the ratio of the uniform stack number zone down to the level of 25% by increasing both the minimum value and the maximum value of the segment height in the variable segment height zone.

The uniform stack number zone is an area in which the current collector may be welded. Accordingly, when the ratio of the uniform stack number zone is adjusted to 25% or more, it is possible to ensure the weld strength of the current collector in the preferred range, and it is advantageous in terms of the resistance of the weld interface.

The second electrode includes a second electrode current collector and a second electrode active material coated on one or two surfaces of the second electrode current collector. An uncoated region in which the second electrode active material is not coated exists at the other end of the second electrode in the widthwise direction (parallel to the heightwise direction of the cylindrical battery 1 shown in FIG. 1). That is, the second electrode includes the uncoated region which is not coated with an active material and is exposed to the outside of the separator at the end of the long side along the winding direction. The uncoated region serving as a second electrode tab is hereinafter referred to as the second uncoated region 12. The second uncoated region 12 is provided below the electrode assembly 10 received in the battery housing 20 in the heightwise direction. That is, the second electrode includes the second uncoated region which is not coated with the active material layer and is exposed to the outside of the separator at the end of the long side, and at least part of the second uncoated region itself is used as an electrode tab. The second uncoated region 12 may be, for example, a positive electrode tab.

Meanwhile, at least part of the second uncoated region 12 may include a plurality of segments split along the winding direction of the electrode assembly 10. In this case, the plurality of segments may be bent along the radial direction of the electrode assembly 10.

Referring to FIGS. 15 and 16 together with FIG. 1, the plurality of bent segments of the second uncoated region 12 may overlap in multiple layer to form the bent surface (the coupling surface) 102. In this case, a tab coupling portion (a second tab coupling portion) 62 of the current collector (the second current collector) 60 as described below may be coupled onto the bent surface 102. The tab coupling portion 62 may be coupled to the area in which the plurality of segments overlaps in multiple layers. The bent surface 102 may include an increasing stack number zone in which the number of overlapping layers of the segments sequentially increases to the maximum as it goes from the outer circumference of the electrode assembly 10 to the core and a uniform stack number zone in which a radial position at which the number of overlapping layers is at the maximum to a radial position at which the innermost segment exists.

The tab coupling portion (the second tab coupling portion) 62 of the current collector (the second current collector) 60 may be coupled to the bent surface such that it overlaps with the uniform stack number zone. Preferably, the tab coupling portion 62 may be welded onto the bent surface 102, and the welding area of the tab coupling portion 62 may overlap at least 50% with the uniform stack number zone along the radial direction of the electrode assembly 10. The number of overlapping layers of the uniform stack number zone may be approximately 10 or more.

When welding the first current collector 30 and/or the second current collector 60 onto the approximately flat coupling surface 102 formed by bending the first uncoated region 11 and/or the second uncoated region 12, it is desirable to increase the output of a laser to ensure sufficient weld strength. When the output of the laser increases, the laser penetrates into the electrode assembly 10 through the overlap area of the first uncoated region 11 and/or the second uncoated region 12, causing damage to the separator and the active material layer. Accordingly, to prevent the laser from passing through, it is desirable to increase the number of overlapping layers of the first uncoated region 11 and/or the second uncoated region 12 above a predetermined level. To increase the number of overlapping layers of the first uncoated region 11 and/or the second uncoated region 12, it is necessary to increase the height of the segment. However, when the height of the segment increases, a swell may occur in the first uncoated region 11 and/or the second uncoated region 12 in the process of manufacturing the electrode plate. Accordingly, it is desirable to adjust the height of the segment to an appropriate level.

As described above, when it is designed such that the radial direction length of the zone in which the number of overlapping layers of the segments of the first uncoated region 11 and/or the second uncoated region 12 is 10 or more is approximately 25% or more compared to the radius of the electrode assembly 10, and welding is performed in the target weld area, even though the output of the laser increases, the overlap portion of the first uncoated region 11 and/or the second uncoated region 12 sufficiently masks the laser, thereby preventing the separator and the active material layer from being damaged by the laser.

In the present disclosure, the positive electrode active material coated on the positive electrode plate and the negative electrode active material coated on the negative electrode plate may include any well-known active material without limitation.

In an example, the positive electrode active material may include an alkali metal compound represented by a general formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru and Cr; $x \geq 0$, $1 \leq x+y \leq 2$, $-0.1 \leq z \leq 2$; and the stoichiometric coefficients x, y and z are selected to keep the compound electrically neutral).

In another example, the positive electrode active material may include an alkali metal compound $xLiM^1O_2\text{-}(1\text{-}x)Li_2M^2O_3$ disclosed in U.S. Pat. Nos. 6,677,082, 6,680,143, et al. ($M^1$ includes at least one element having an average oxidation state of 3; $M^2$ includes at least one element having an average oxidation state of 4; $0 \leq x \leq 1$).

In still another example, the positive electrode active material may include lithium metal phosphate represented by a general formula $Li_aM^1{}_xFe_{1-x}M^2{}_yP_{1-y}M^3{}_zO_{4-z}$ ($M^1$ includes at least one selected from the Ti, Si, Mn, Co, Fe, V, Cr, Mo, Ni, Nd, Al, Mg and Al; $M^2$ includes at least one selected from Ti, Si, Mn, Co, Fe, V, Cr, Mo, Ni, Nd, Al, Mg, Al, As, Sb, Si, Ge, V and S; $M^3$ includes a halogen group element optionally including F; $0 < a \leq 2$, $0 \leq x \leq 1$, $0 \leq y < 1$, $0 \leq z < 1$; the stoichiometric coefficients a, x, y and z are selected to keep the compound electrically neutral), or $Li_3M_2(PO_4)_3$ (M includes at least one selected from Ti, Si, Mn, Fe, Co, V, Cr, Mo, Ni, Al, Mg and Al).

Preferably, the positive electrode active material may include primary particles and/or secondary particles formed by agglomeration of the primary particles.

In an example, the negative electrode active material may include carbon materials, lithium metal or lithium metal compounds, silicon or silicon compounds and tin or tin compounds. In addition, the negative electrode active material may include metal oxides such as $TiO_2$ and $SnO_2$ with a potential of less than 2V. The carbon material may include a low-crystalline carbon and a high-crystalline carbon.

The separator may include a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, used singly or in stack. As another example, the separator may include a commonly used porous nonwoven fabric, for example, a nonwoven fabric made of high melting point glass fibers and polyethylene terephthalate fibers.

The separator may include a coating layer of inorganic particles on at least one surface thereof. The separator itself may be a coating layer of inorganic particles. The particles in the coating layer may be bonded with a binder such that there is interstitial volume between adjacent particles.

The inorganic particles may include an inorganic material having a dielectric constant of 5 or more. A non-limiting example of the inorganic particles may include at least one selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$ and $Y_2O_3$.

An electrolyte may be a salt having a structure of $A^+B^-$. Here, $A^+$ includes an alkali metal cation such as $Li^+$, $Na^+$ and $K^+$, or a combination thereof. $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may be dissolved in an organic solvent. The organic solvent may include at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl pyrrolidone (NMP), ethyl methyl carbonate (EMC) or γ-butyrolactone.

Referring to FIG. 1, the battery housing 20 is a substantially cylindrical container having an opening on one side, and is made of a metal having conductive properties. In general, the side of the battery housing 20 and the lower surface (the lower surface in FIG. 1) disposed on the opposite side to the open portion are integrally formed. That is, in general, the battery housing 20 has an open top and a closed bottom in the heightwise direction. The lower surface of the battery housing 20 may have an approximately flat shape. The battery housing 20 receives the electrode assembly 10 through the open portion formed on one side in the heightwise direction (parallel to the Z axis). The battery housing 20 may also receive the electrolyte together through the open portion.

The battery housing 20 may include a beading portion 21 at the end adjacent to the open portion provided on top of the battery housing 20. The battery housing 20 may further include a crimping portion 22 on the beading portion 21. The beading portion 21 is configured such that the edge of the outer circumferential surface of the battery housing 20 is press-fit to a predetermined depth.

The press-fit depth of the beading portion 21 may be, for example approximately 0.2 to 10 mm. The minimum value of the press-fit depth PD of the beading portion 21 requires the consideration of the radius of curvature R1 of the beading portion 21, the width % eat of the welding bead and the radius of curvature R2 at the boundary area between the beading portion 21 and the inner surface of the battery housing 20. For example, referring to FIG. 24, in addition to the radius of curvature R1 of the beading portion 21 and the radius of curvature R2 at the boundary area between the beading portion 21 and the inner surface of the battery housing 20, welding requires an extra space. It is because when the press-fit depth PD is R1+R2, there is no flat region F on the beading portion 21. Moreover, welding requires the extra space which is greater than the minimum width $W_{bead,min}$ of the welding bead BD. Accordingly, the minimum value of the press-fit depth PD satisfies the following relation equation.

$PD \geq R1_{,min} + R2_{,min} + W_{bead,min}$

For example, the minimum value of each of $R1_{,min}$ and $R2_{,min}$ may be approximately 0.05 mm, and $W_{bead,min}$ may be approximately 0.1 mm. In this case, the minimum value of the press-fit depth PD may be approximately 0.2 mm or more.

In another aspect, the maximum value of the press-fit depth PD of the beading portion 21 may change depending on the material and thickness of the battery housing 20. In an example, when the material of the battery housing 20 is steel and the maximum thickness of the battery housing 20 is approximately 1 mm, the maximum value of the press-fit depth PD of the beading portion 21 may be approximately 10 mm. Accordingly, in an example, the press-fit depth PD of the beading portion 21 may have a value between approximately 0.2 and 10 mm.

The beading portion 21 is formed on the electrode assembly 10. The inner diameter of the battery housing 20 at the area in which the beading portion 21 is formed is smaller than the diameter of the electrode assembly 10. The beading portion 21 may include an upper beading portion disposed at the upper part with respect to the innermost inside when the battery housing 20 is press-fit, and a lower beading portion disposed at the lower part with respect to the innermost inside when press-fit. At least one tab coupling portion 32 of the current collector 30 as described below may be disposed at the lower position than the lower beading portion.

At least one of the upper beading portion or the lower beading portion may be inclined at a predetermined angle to the lower surface of the battery housing 20. In this case, a first contact portion 33a of the current collector (the first current collector) 30 as described below may be seated on the inclined upper surface of the upper beading portion of the beading portion 21.

Alternatively, at least one of the upper beading portion or the lower beading portion may be approximately parallel to the lower surface of the battery housing 20 in at least some regions. In this case, the first contact portion 33a of the current collector 30 as described below may be seated on the approximately flat upper surface of the upper beading portion. The first contact portion 33a may have the flat surface coupled with the upper surface of the beading portion 21 facing the open portion of the battery housing 20.

The beading portion 21 provides a support surface on which the housing cover 40 may be seated. In addition, the beading portion 21 may provide the support surface where at least part of the circumferential edge of the current collector 30 as described below may be seated and coupled.

That is, at least part of the circumferential edge of the current collector 30 of the present disclosure and/or the circumferential edge of the housing cover 40 may be seated on the upper surface of the upper beading portion. To stably support at least part of the circumferential edge of the current collector 30 and/or the circumferential edge of the housing cover 40, the upper surface of the upper beading portion may extend along a direction approximately parallel to the lower surface of the battery housing 20, i.e., a direction approximately perpendicular to the sidewall of the battery housing 20. The beading portion 21 may be omitted, and at least part of the circumferential edge of the current collector 30 may be directly attached to the flat sidewall of the battery housing 20.

Figure 20:
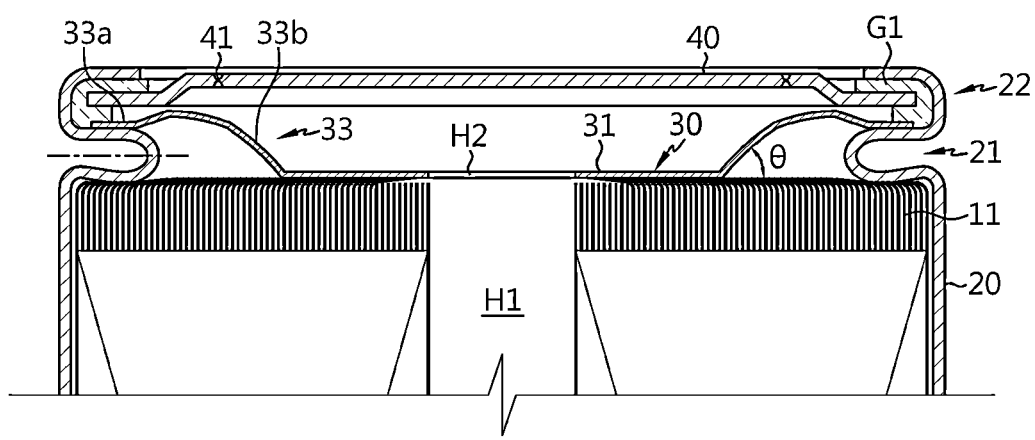
FIG. 20 is a diagram illustrating a sizing process of a battery housing.

Referring to FIG. 20 together with FIG. 1, the beading portion 21 may include the upper beading portion and the lower beading portion disposed at upper and lower positions, respectively, with respect to the innermost side along the press-fit direction. The upper beading portion and the lower beading portion may have an asymmetrical shape. Specifically, the upper beading portion and the lower beading portion may have an asymmetrical shape with respect to an imaginary reference plane passing through the innermost point of the beading portion in parallel to the bottom surface of the battery housing 20. The asymmetrical shape may be formed in the process of compressing the battery housing 20 along the heightwise direction (parallel to the Z axis) of the battery housing 20 through a sizing process. The sizing process is a process of conforming the height of the cylindrical battery 1 to the design form factor by pressing the battery housing 20 along the winding axis direction of the electrode assembly 10.

The upper beading portion may include a flat portion approximately parallel to the closed portion of the battery housing 20. In contrast, due to the asymmetrical shape, the lower beading portion may be inclined downward, at least in part, along a direction toward the innermost side. Accordingly, the lower beading portion may fix the electrode assembly 10 by pressing down the electrode assembly 10. The beading portion 21 prevents the electrode assembly 10 having the size approximately corresponding to the inner diameter of the battery housing 20 from slipping through the open portion formed on top of the battery housing 20, and act as a support portion on which the housing cover 40 is seated. The upper beading portion may act as the support portion for fixing not only the housing cover 40 but also the first contact portion 33a of the current collector (the first current collector) 30 and the sealing gasket G1.

The crimping portion 22 is formed on the beading portion 21. The crimping portion 22 may be extended and bent along the circumferential edge of the housing cover 40 positioned on the beading portion 21. By this shape of the crimping portion 22, the housing cover 40 is fixed on the beading portion 21. The crimping portion 22 may be omitted and the housing cover 40 may be fixed to cover the open portion of the battery housing 20 through other fixing structure. The innermost point of the beading portion 21 may be disposed at the inner position along the radial direction of the electrode assembly 10 than the end of the crimping portion 22. For example, referring to FIG. 1, the end of the crimping portion 22 may be disposed at the outer position in the radial direction than the innermost point of the beading portion 21. By this structure, it is possible to maintain the relatively flat beading portion 21 after the sizing process. For example, when the innermost point of the beading portion 21 is disposed at the outer position in the radial direction than the end of the crimping portion 22, the radial direction length of the upper surface of the crimping portion 22 is longer than the radial direction length of the beading portion 21. As a consequence, the upper surface of the crimping portion 22 subjected to pressure in the sizing process becomes wider, and the beading portion 21 may not be flattened after the sizing process.

Subsequently, the current collector (the first current collector) 30 according to an embodiment of the present disclosure will be described in detail with reference to FIGS. 1 to 5.

Figure 2:
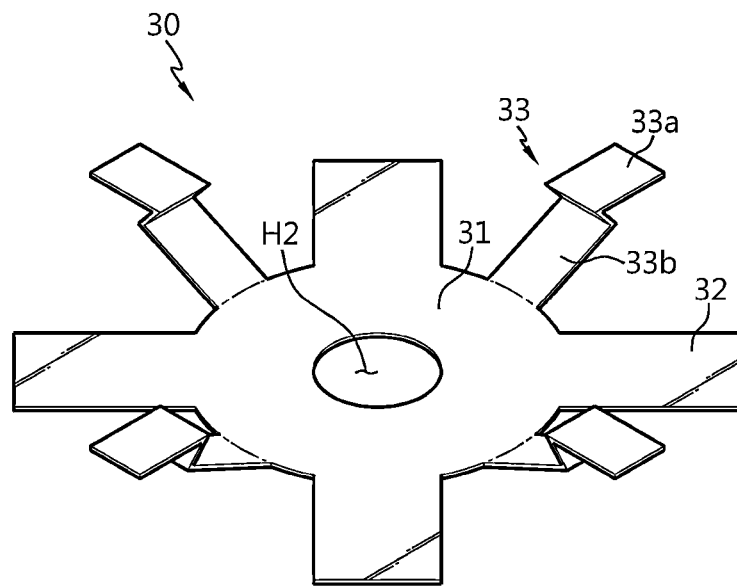
FIG. 2 is a diagram showing a current collector (a first current collector) according to an embodiment of the present disclosure.

First, referring to FIGS. 1 and 2, the current collector 30 according to an embodiment of the present disclosure is received in the battery housing 20, and is electrically connected to the electrode assembly 10 and also electrically connected to the battery housing 20. That is, the current collector 30 electrically connects the electrode assembly 10 to the battery housing 20.

The current collector 30 includes a support portion 31 disposed on one surface of the electrode assembly 10, a plurality of tab coupling portions (the plurality of first tab coupling portions) 32 coupled with the first uncoated region 11 and a plurality of first housing coupling portions 33 extending from the support portion 31 and coupled onto the inner surface of the battery housing 20. The tab coupling portion 32 and the first housing coupling portion 33 are indirectly connected through the support portion 31, and they are not directly connected to each other. Accordingly, when external impacts are applied to the cylindrical battery 1 of the present disclosure, it is possible to minimize the likelihood that damage occurs in the coupled portion between the current collector 30 and the electrode assembly 10 and the coupled portion between the current collector 30 and the battery housing 20. At least one tab coupling portion 32 and/or at least one first housing coupling portion 33 may be provided. The at least one tab coupling portion 32 and the at least one first housing coupling portion 33 may be arranged, for example, in an approximately radial pattern, an approximately crisscross pattern or a combined pattern with respect to the center of the current collector 30. In another aspect, each of the plurality of first housing coupling portions 33 may be interposed between the adjacent tab coupling portions 32.

The support portion 31 and the plurality of tab coupling portions 32 are positioned on the electrode assembly 10. The tab coupling portion 32 is coupled with the first uncoated region 11 of the electrode assembly 10. For example, the tab coupling portion 32 may be coupled with the first uncoated region 11 by welding along the radial direction of the electrode assembly 10. For example, the tab coupling portion 32 may be coupled to the first uncoated region 11 by welding in approximately parallel to the lower surface of the battery housing 20. For example, the welding bead formed between the first uncoated region 11 and the tab coupling portion 32 may form the welding pattern in the shape of an approximately straight line which extends along the radial direction of the electrode assembly 10. For example, the welding pattern may have a shape of a line formed by connection of spot welding. The welding pattern may include one or two or more patterns extending along the radial direction of the electrode assembly 10.

Meanwhile, not only the tab coupling portion 32 but also the support portion 31 may be coupled with the first uncoated region 11. The tab coupling portion 32 and the first uncoated region 11 may be coupled by welding. When the battery housing 20 includes the beading portion 21, the support portion 31 and the tab coupling portion 32 are disposed at the lower position than the beading portion 21.

The support portion 31 may have a current collector hole H2 formed at a location corresponding to a winding hole H1 formed at the approximately center of the electrode assembly 10. The winding hole H1 and the current collector hole H2 in communication with each other may serve as a passage for inserting a welding rod for welding between the terminal 50 and the current collector (the second current collector) 60 or welding between the terminal 50 and a lead tab or laser beam irradiation as described below. The current collector hole H2 may have the diameter that is substantially equal to or larger than the winding hole H1 of the electrode assembly 10 not to cover the winding hole H1 formed at the core of the electrode assembly 10. In case that the diameter of the current collector hole H2 is too much smaller than the diameter of the winding hole H1, the hole formed at the winding hole H1 is covered, resulting in poor liquid injection, and in addition, it may be difficult to have a sufficient space for inserting the device for welding or laser irradiation.

As opposed to the above-described embodiment, according to another embodiment of the present disclosure, the diameter of the current collector hole H2 may be smaller than the winding hole H1. In this case, for example, when the diameter of the winding hole H1 is R3, the diameter of the current collector hole H2 may be approximately 0.5*R3 or more and less than R3, and more particularly approximately 0.7*R3 or more and less than R3. In general, when vented, the separator or the uncoated region at the winding center may slip from the upper surface of the electrode assembly 10 by strong pressure of gas coming out at the winding center of the electrode assembly 10. In this instance, when the diameter of the current collector hole H2 is smaller than the diameter of the hole provided at the core of the electrode assembly 10, it is possible to prevent the separator or the uncoated region at the winding center from slipping from the electrode assembly 10. However, when the diameter of the current collector hole H2 is too small, it may be difficult to inject the electrolyte solution, and since a space for welding between the second current collector 60 and the terminal 50 is necessary, the diameter of the current collector hole H2 may be 0.5*R3 or more, and more particularly 0.7*R3 or more.

The plurality of tab coupling portions 32 may extend to the sidewall of the battery housing 20 approximately radially from the support portion 31 of the current collector 30. Each of the plurality of tab coupling portions 32 may be spaced apart from each other along the circumference of the support portion 31. Meanwhile, to ensure the coupling strength and reduce the electrical resistance through the increased coupling area between the current collector 30 and the electrode assembly 10, not only the tab coupling portion 32 but also the support portion 31 may be coupled with the first uncoated region 11. At least part of the first uncoated region 11 may be formed such that the end is bent approximately parallel to the tab coupling portion 32. In this case, the bending may be done, for example, toward the winding center C of the electrode assembly 10. When the first uncoated region 11 is coupled with the tab coupling portion 32 in parallel to the tab coupling portion 32 by the end forming, it is possible to increase the coupling area, thereby improving the coupling strength and reduce the electrical resistance, and it is possible to minimize a height of the electrode assembly 10, thereby improving the energy density. Meanwhile, the bent end of the first uncoated region 11 may overlap in multiple layers. When the first uncoated region 11 overlaps in multiple layers, the tab coupling portion 32 of the current collector 30 may be coupled onto the coupling surface 102 (see FIGS. 15 and 16) formed by bending the first uncoated region 11 such that it overlaps in multiple layers as described above.

The plurality of first housing coupling portions 33 may extend to the sidewall of the battery housing 20 approximately radially from the support portion 31 of the current collector 30. Each of the plurality of first housing coupling portions 33 may be spaced apart from each other along the circumference of the support portion 31. At least one first housing coupling portion 33 may be disposed between the adjacent tab coupling portions 32. The plurality of first housing coupling portions 33 may be, for example, coupled to the beading portion 21 in the inner surface of the battery housing 20. The first housing coupling portions 33 may be coupled, especially to the upper surface of the beading portion 21. In the cylindrical battery 1 of the present disclosure, in case that this structure is applied, the first housing coupling portion 33 may be spontaneously seated on the beading portion 21 through the process of receiving the electrode assembly 10 having the current collector 30 in the battery housing 20. Accordingly, the welding process of the battery housing 20 and the current collector 30 can be easily performed. The welding for coupling between the battery housing 20 and the current collector 30 may use, for example, laser welding, ultrasonic welding or spot welding. When a multi-current path is formed by coupling the first housing coupling portion 33 onto the beading portion 21 by welding, the resistance level may be limited to approximately 4 mOhm or less suitable for rapid charging. In addition, when the upper surface of the beading portion 21 extends along the direction approximately parallel to the lower surface of the battery housing 20, i.e., the direction approximately perpendicular to the sidewall of the battery housing 20, and the first housing coupling portion 33 also extends along the same direction, i.e., the radial direction and the circumferential direction, the first housing coupling portion 33 may stably contact the beading portion 21. In addition, as the first housing coupling portion 33 stably contacts the beading portion 21, it is possible to smoothly weld the two components, thereby improving the coupling strength between the two components and minimizing the resistance rise at the coupled portion.

Subsequently, referring to FIGS. 3 to 7, the first housing coupling portion 33 includes a first contact portion 33a coupled onto the inner surface of the battery housing 20 and a first connecting portion 33b connecting the support portion 31 to the first contact portion 33a.

The first contact portion 33a is coupled onto the inner surface of the battery housing 20. When the battery housing 20 includes the beading portion 21, the first contact portion 33a may be coupled onto the beading portion 21 as described above. In this case, as described above, for stable contact and coupling, both the beading portion 21 and the first contact portion 33a may extend along the direction approximately parallel to the lower surface of the battery housing 20, i.e., the direction approximately perpendicular to the sidewall of the battery housing 20. In addition, the connected portion between the first contact portion 33a and the first connecting portion 33b may match the inner surface of the beading portion 21. That is, the shape of the connected portion between the first contact portion 33a and the first connecting portion 33b and the shape of the beading portion 21 at the corresponding location may match each other. In this case, when coupling the first housing coupling portion 33 to the beading portion 21, it is possible to increase the coupling strength between the first housing coupling portion 33 and the beading portion 21, and increase the resistance reduction effect with the increasing contact area. Meanwhile, the outermost point of the first connecting portion 33b may be spaced a predetermined distance apart from the innermost point of the beading portion 21.

The first connecting portion 33b may include at least one first bending portion B1 which changes in extension direction at least once between the support portion 31 and the first contact portion 33a. The first connecting portion 33b may have, for example, a spring-like structure or a bellows-like structure capable of contracting and stretching within a predetermined range. The structure of the first connecting portion 33b allows the first contact portion 33a to come into close contact on the beading portion 21 in the process of receiving the electrode assembly 10 having the current collector 30 coupled thereto in the battery housing 20 even though there is a predetermined range of height dispersion of the electrode assembly 10.

For example, the vertical distance D between the first contact portion 33a and the support portion 31 in undeformed condition in the absence of an external force applied to the current collector 30 may be substantially equal to the vertical distance between the upper surface of the beading portion 21 and the support portion 31 when the electrode assembly 10 having the current collector 30 coupled thereto is seated in the battery housing 20, or smaller within the stretchable range of the first connecting portion 33b. That is, the first housing coupling portion 33 may be elastically biased on the beading portion 21. More specifically, the first housing coupling portion 33 may be coupled onto the beading portion 21 with the stored elastic energy causing deformation to reduce the straight line distance from one end of the first connecting portion 33b in the lengthwise direction to the other end. In case that the first connecting portion 33b is configured to meet this requirement, when the electrode assembly 10 having the current collector 30 coupled thereto is seated in the battery housing 20, the first contact portion 33a may spontaneously come into close contact with the beading portion 21.

In addition, the contractable and stretchable structure of the first connecting portion 33b mitigates impacts caused by the movement of the electrode assembly 10 in a predetermined range when the electrode assembly 10 moves up and down due to vibrations and/or impacts while the cylindrical battery 1 (see FIG. 1) is in use. That is, the contractable and stretchable structure of the first connecting portion 33b may serve as a buffer to prevent the transfer of impacts to the coupled portion between the first contact portion 33a and the battery housing 20 and the coupled portion between the tab coupling portion 32 and the first uncoated region 11 (see FIGS. 1 to 5).

Meanwhile, the first contact portion 33a may be coupled to the upper surface of the beading portion 21 (the upper surface of the upper beading portion) by welding. In addition, the first contact portion 33a may be coupled to the flat area on the upper surface of the beading portion 21 by welding. The weld area between the first contact portion 33a and the beading portion 21 may be narrower than the flat upper surface of the beading portion 21. When the first bending portion B1 is provided, an angle between the first contact portion 33a and the first connecting portion 33b may be an acute angle due to the first bending portion B1.

Subsequently, referring to FIG. 8, the current collector 30 according to another embodiment of the present disclosure is shown. The current collector 30 according to another embodiment of the present disclosure is only different in the shape of the first contact portion 33a from the current collector 30 (the current collector described with reference to FIG. 2 for illustrative purposes) described above, and the structure of the current collector 30 described above may be applied substantially equally to the others.

Figure 8:
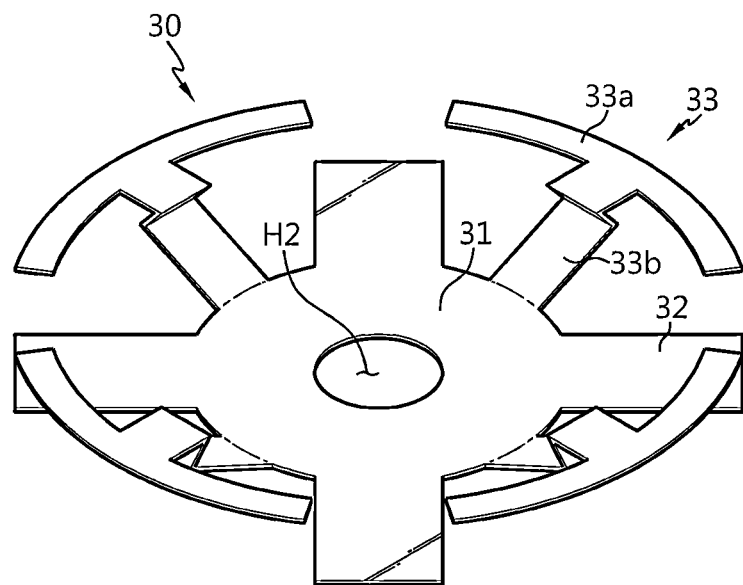
FIG. 8 is a diagram showing a current collector (a first current collector) according to another embodiment of the present disclosure.

Referring to FIGS. 1 and 8, at least part of the first contact portion 33a may have a shape of an arc that extends in the circumferential direction along the beading portion 21 of the battery housing 20. In this case, to maximize the contact area, the current collector 30 may be configured such that the sum of the circumferential extended lengths of the first contact portions 33a of the plurality of first housing coupling portions 33 may be substantially equal to or shorter than the inner circumference of the battery housing 20. In another aspect, the first contact portion 33a may have a shape of an arc which extends in the opposite directions along the circumferential direction on the beading portion 21 from the intersection between the connecting portion 33b and the contact portion 33a.

Figure 9:
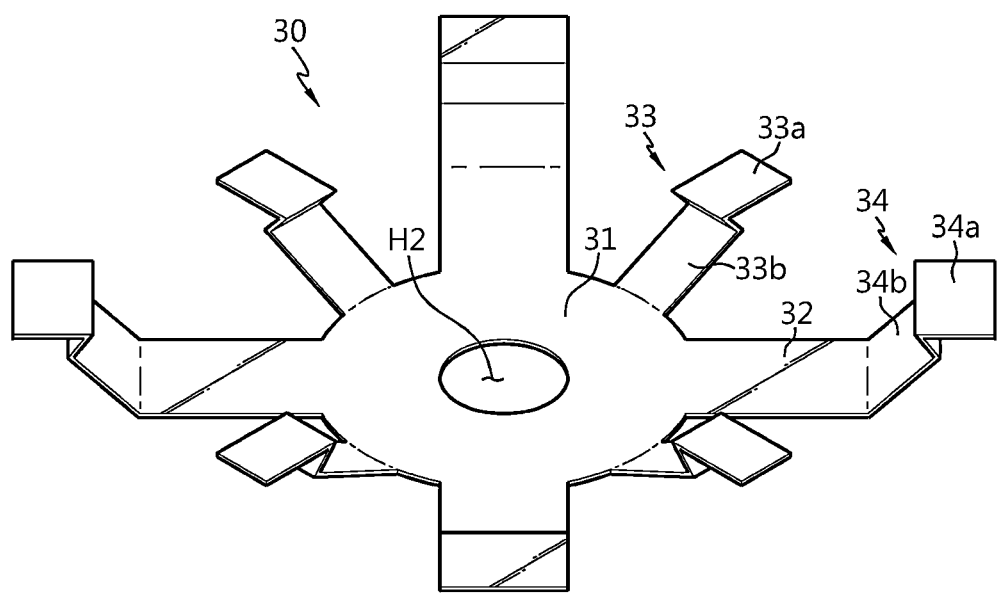
FIG. 9 is a diagram showing a current collector (a first current collector) according to still another embodiment of the present disclosure.

Subsequently, referring to FIGS. 9 and 10 together with FIG. 1, the current collector 30 according to still another embodiment of the present disclosure is shown. Compared with the current collectors 30 (the current collectors described with reference to FIGS. 2 and 8 for illustrative purposes) according to the previous embodiments, the current collector 30 according to still another embodiment of the present disclosure is only different in that it further includes a second housing coupling portion 34, and the structure of the current collectors 30 (see FIG. 9) described above may be substantially equally applied to the others.

The second housing coupling portion 34 extends from the end of the tab coupling portion 32 and is coupled onto the inner surface of the battery housing 20. The second housing coupling portion 34 is provided at the end of at least one of the plurality of tab coupling portions 32. The second housing coupling portion 34 includes a second contact portion 34a coupled onto the inner surface of the battery housing 20, and a second connecting portion 34b connecting the end of the tab coupling portion 32 of the support portion 31 to the second contact portion 34a.

The second contact portion 34a is coupled onto the inner surface of the battery housing 20. When the battery housing 20 includes the beading portion 21, in the same way as the first contact portion 33a described above, the second contact portion 34a may be coupled onto the beading portion 21. In this case, as described above, for stable contact and coupling, the beading portion 21 and the second contact portion 34a may extend along the direction approximately parallel to the lower surface of the battery housing 20, i.e., the direction approximately perpendicular to the sidewall of the battery housing 20.

In the same way as the shape of the first contact portion 33a shown in FIG. 8, at least part of the second contact portion 34a may extend in the circumferential direction along the beading portion 21 of the battery housing 20. In this case, to maximize the contact area between the current collector 30 and the battery housing 20, the current collector 30 may be configured such that the length obtained by adding the sum of the circumferential extended lengths of the first contact portions 33a of the plurality of first housing coupling portions 33 to the sum of the circumferential extended lengths of the second contact portions 34a of the plurality of second housing coupling portions 34 is substantially equal to or slightly shorter than the inner circumference of the battery housing 20.

In the same way as the first connecting portion 33b described previously, the second connecting portion 34b may include at least one second bending portion B2 which changes in extension direction at least once between the tab coupling portion 32 and the second contact portion 34a. By the formation of the second bending portion B2, the second connecting portion 34b has a contractable and stretchable structure, and accordingly has the assembly procedural advantage of the cylindrical battery 1 and the buffering effect as described above.

Figure 4:
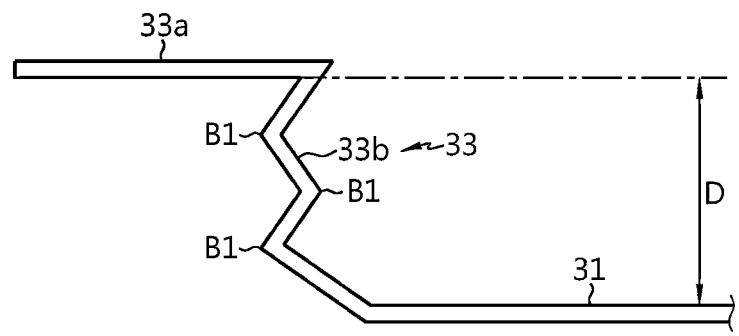
Figure 5:
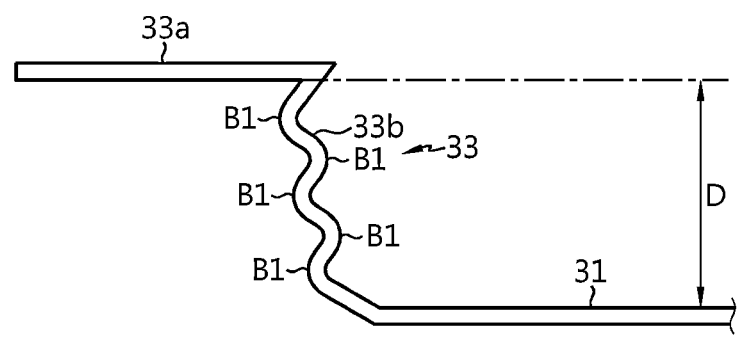
Figure 6:
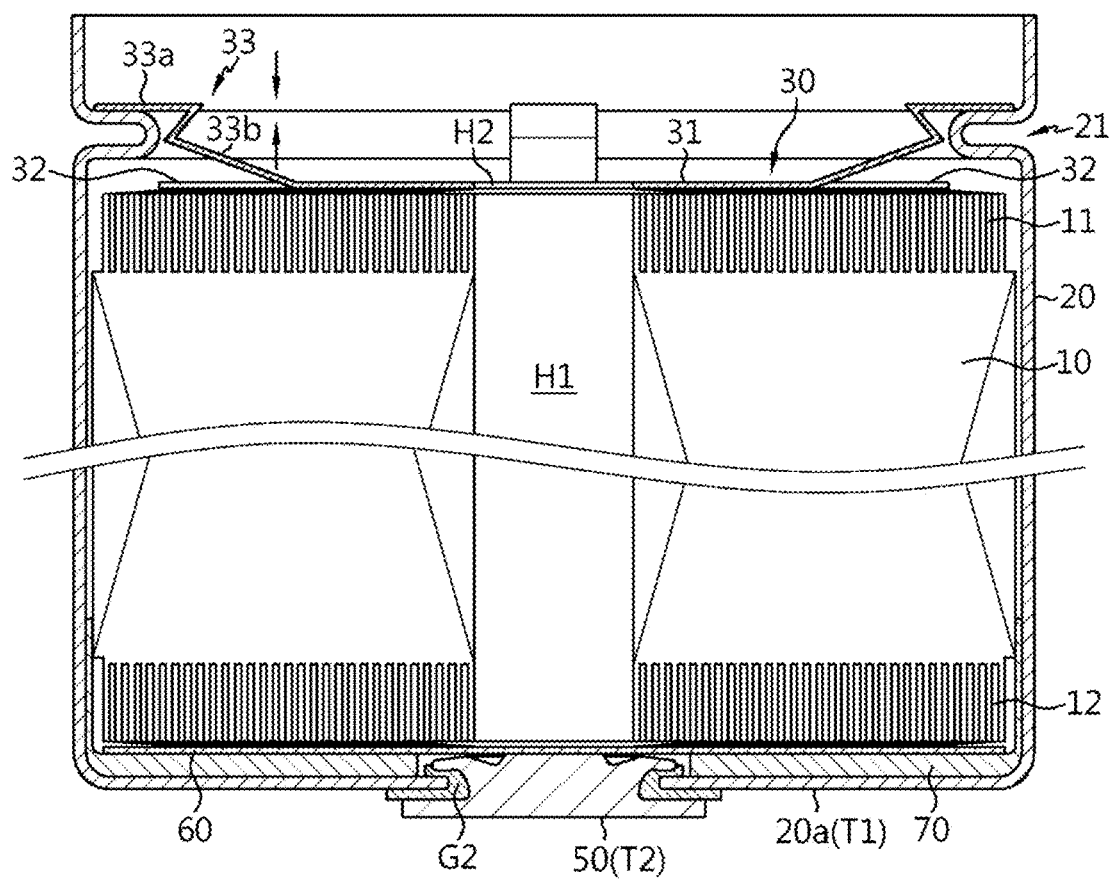
FIGS. 6 and 7 each are diagrams showing the shape of a first connecting portion depending on the height of an electrode assembly.
Figure 7:
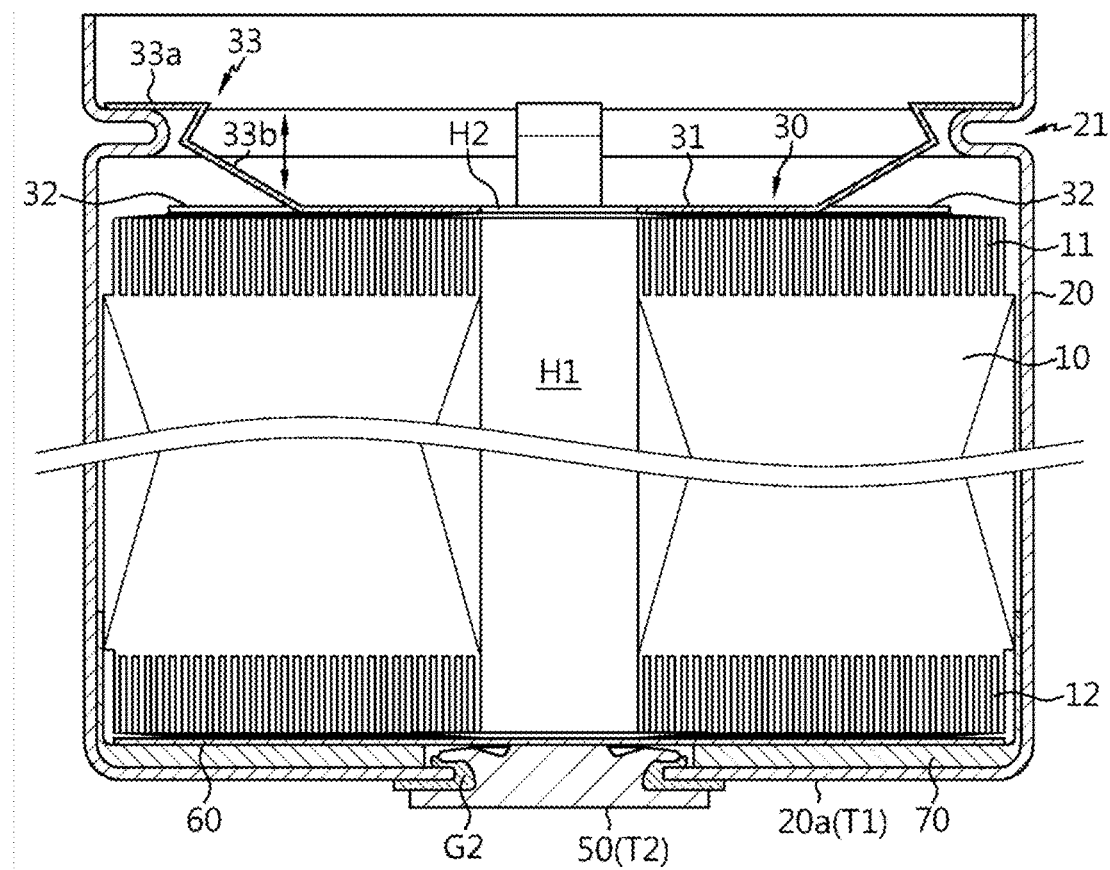

Although the drawings of the present disclosure show only one second bending portion B2, the present disclosure is not limited thereto, and in the same way as the first connecting portion 33b described with reference to FIGS. 4 and 5 for illustrative purposes, a plurality of second bending portions B2 may be provided.

Figure 11:
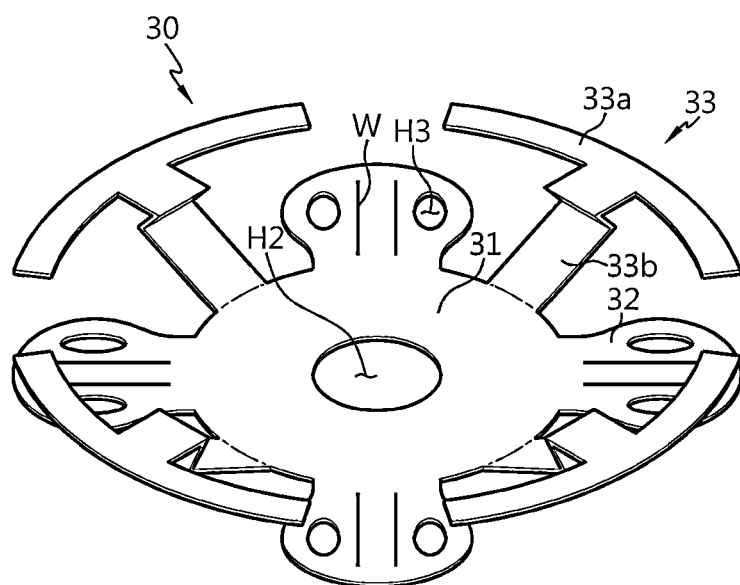
FIGS. 11 and 12 are diagrams showing a current collector (a first current collector) of the present disclosure having a different shape from those described and shown in the previous embodiments.

Referring to FIG. 11, the current collector 30 having a different shape from those described above is shown. Referring to FIG. 11 together with FIG. 1, the current collector (the first current collector) 30 of the present disclosure may have at least one injection hole H3. The injection hole H3 may be provided, for example, in the tab coupling portion 32. When the plurality of tab coupling portions 32 is provided, the injection hole H3 may be provided in the at least one tab coupling portion 32. The injection hole H3 may be provided, for example, on one side or each of two sides of the at least one welding bead W formed on the tab coupling portion 32. Referring to FIGS. 1 and 11, in the manufacture of the cylindrical battery 1 according to an embodiment of the present disclosure, after receiving the assembly including the electrode assembly 10 and the current collector (the first current collector) 30 in the battery housing 20, the electrolyte solution may be injected. In this instance, the injection performance may be improved by the injection hole H3.

One tab coupling portion 32 may have a plurality of injection holes H3. The plurality of injection holes H3 may be arranged approximately symmetrically on the left and right sides with respect to the center of the tab coupling portion 32 in the widthwise direction. The welding bead W for coupling between the tab coupling portion 32 and the first uncoated region 11 may be formed between the injection holes H3 arranged approximately symmetrically on the left and right sides.

The tab coupling portion 32 may be formed such that the width at a location a predetermined distance away from the connected portion toward the end of the tab coupling portion in the lengthwise direction is larger than the width at the connected portion between the tab coupling portion 32 and the support portion 31. At least part of the area in which the injection hole H3 is formed may be included in an extended area by a larger width at the location the predetermined distance away from the connected portion toward the end of the tab coupling portion 32 than the width at the connected portion between the tab coupling portion 32 and the support portion 31. Meanwhile, the end of the tab coupling portion 32 in the lengthwise direction may have a shape of an approximately arc corresponding to the inner circumferential surface of the battery housing 20.

Figure 3:
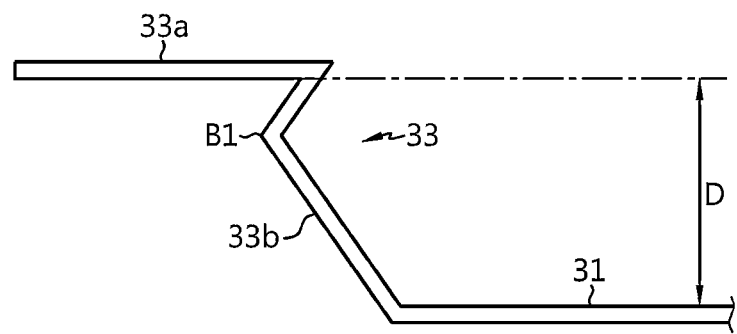
FIGS. 3 to 5 are diagrams showing exemplary shapes of a first connecting portion of a current collector (a first current collector) according to an embodiment of the present disclosure.
Figure 10:
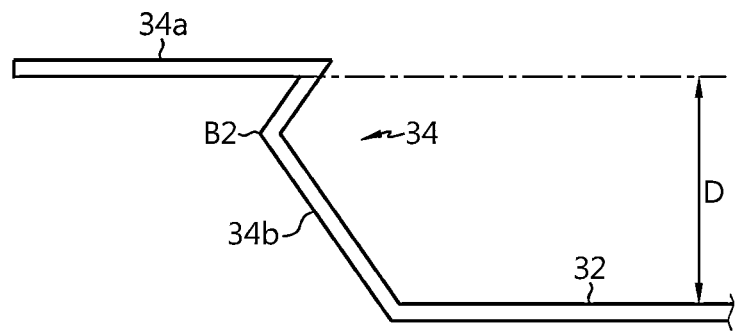
FIG. 10 is a diagram showing the exemplary shape of a second connecting portion of the current collector (a first current collector) shown in FIG. 9.
Figure 12:
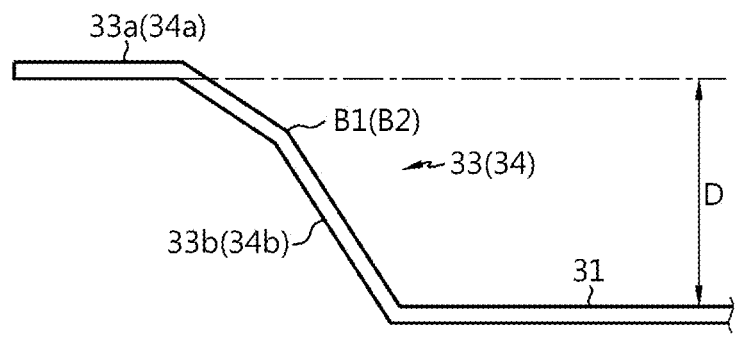
Figure 13:
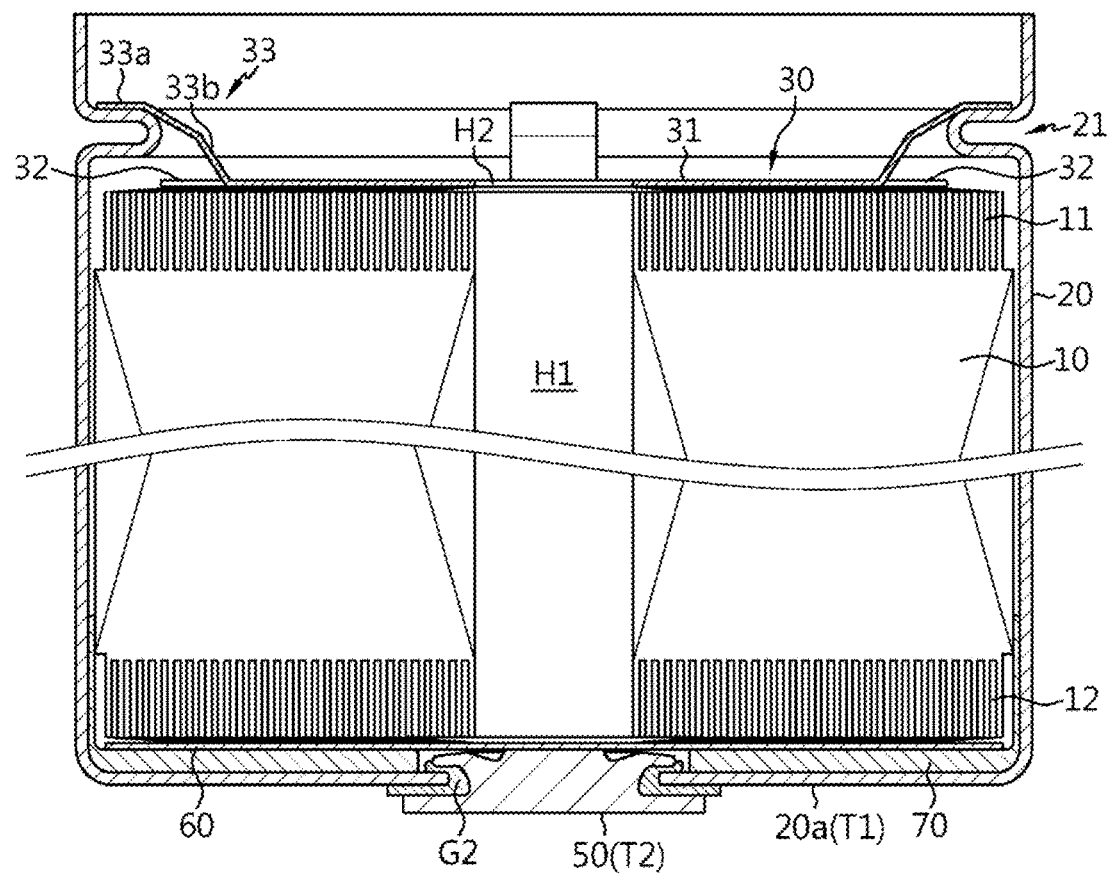
FIG. 13 is a diagram showing the internal structure of a cylindrical battery with the current collector (a first current collector) shown in FIG. 12.

Referring to FIGS. 12 and 13, the first connecting portion 33b of the first housing coupling portion 33 and/or the second connecting portion 34b of the second housing coupling portion 34 of the present disclosure may be bent once, and may be bent in a different direction from those shown in FIGS. 3 and 10. That is, the first bending portion B1 formed on the first connecting portion 33b and/or the second bending portion B2 formed on the second connecting portion 34b may protrude in the direction toward the center of the cylindrical battery 1 (see FIG. 1). The bending direction of the first connecting portion 33b and/or the second connecting portion 34b is to prevent damage from occurring at the coupled portion between the current collector (the first current collector) 30 and the electrode assembly 10 and/or the coupled portion between the current collector (the first current collector) 30 and the battery housing 20 during the sizing process. The sizing process is a compression process for reducing the height occupied by the beading portion 21 area of the battery housing 20 to reduce a height of the cylindrical battery 1 in the manufacture of the cylindrical battery 1. As a result of experiment on how much the welded portion is damaged after the sizing process depending on the presence or absence of the bending portions B1, B2 and the protruding direction of the bending portions B1, B2, it is found that damage does not occur in the cylindrical battery 1 having a structure in which the bending portions B1, B2 protrude in the direction toward the center of the cylindrical battery 1.

Referring to FIGS. 17 to 20, some steps of the process of manufacturing the cylindrical battery 1 of the present disclosure are shown. First, referring to FIG. 17, the current collector 30 is placed on the electrode assembly 10 received in the battery housing 20, and the first uncoated region 11 protruding above the electrode assembly 10 and the current collector 30 are welded. In this case, the tab coupling portion 32 of the current collector 30 is welded to the bent surface 102 (see FIG. 15) where the plurality of segments 11a (see FIG. 20) provided in the first uncoated region 11 is bent. In a variation, the current collector 30 may be welded to the bent surface 102 in advance before the electrode assembly 10 is received in the battery housing 20.

Figure 18:
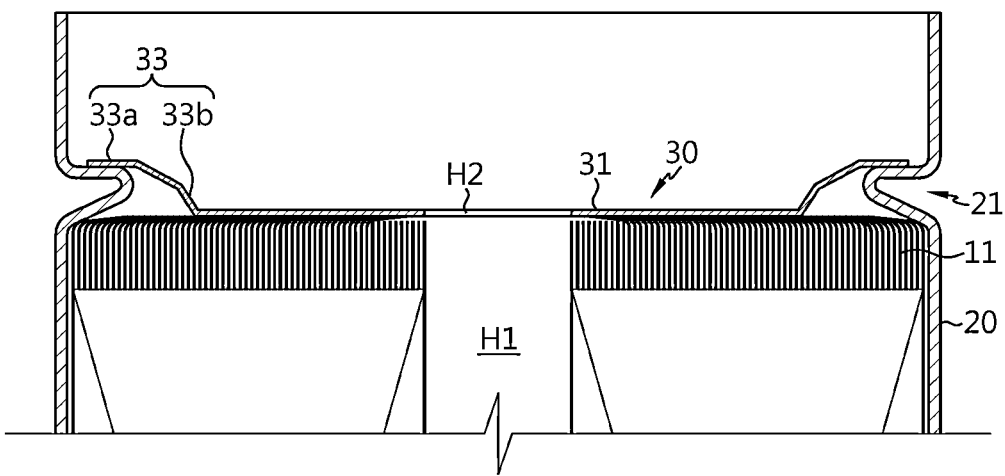
FIG. 18 is a diagram illustrating a beading process of a battery housing.

Subsequently, referring to FIG. 18, when the current collector 30 is welded onto the electrode assembly 10, a beading knife may move forward into the battery housing 20. Accordingly, the beading portion 21 press-fit inward of the battery housing 20 is formed on the sidewall of the battery housing 20, and the beading portion 21 is disposed below the contact portion 33a of the current collector 30. Accordingly, afterwards, the contact portion 33a and the beading portion 21 are placed at a weldable location.

Subsequently, referring to FIG. 19 together with FIG. 18, the contact portion 33a of the current collector 30 may be placed on the upper surface of the beading portion 21. In a state that the current collector 30 is placed on the upper surface of the beading portion 21, the current collector 30 and the beading portion 21 may be welded. The housing cover 40 having the end surrounded by the sealing gasket G1 may be placed on the upper surface of the contact portion 33a. Subsequently, the battery housing 20 is bent around the edge of the housing cover 40 to fix the housing cover 40 and the current collector 30. The area disposed on top of the beading portion 21 of the battery housing 20 is bent to form the crimping portion 22, and by the extended and bent shape of the crimping portion 22, the housing cover 40 and the contact portion 33a of the current collector 30 are fixed on the beading portion 21. The housing coupling portion 33 may be compressed and fixed by the crimping portion 22.

Meanwhile, in the present disclosure, the extension direction of the welding pattern formed between the first uncoated region 11 and the tab coupling portion 32 and the extension direction of the welding pattern formed between the beading portion 21 and the first contact portion 33a may approximately be perpendicular to each other. For example, the extension direction of the welding pattern formed between the first uncoated region 11 and the tab coupling portion 32 may be the radial direction of the electrode assembly 10, and the extension direction of the welding pattern formed between the beading portion 21 and the first contact portion 33a may be the circumferential direction of the electrode assembly 10 (or the battery housing 20). In this case, a tangent line formed at a point in the circumferential direction is perpendicular to the radial direction. This structure may increase the coupling strength between the current collector 30 and the electrode assembly 10 and the coupling strength between the current collector 30 and the battery housing 20. That is, according to this structure, even though vibrations and/or impacts are applied to the cylindrical battery 1 in any direction, the current collector 30 may be kept in firmly fixed state with each of the electrode assembly 10 and the battery housing 20.

Subsequently, referring to FIG. 20 together with FIG. 19, the cylindrical battery with a height adjusted by the sizing process is shown. The sizing process is a compression process for reducing the height occupied by the beading portion 21 area of the battery housing 20 to reduce the height in the manufacture of the cylindrical battery. Since the battery housing 20 is compressed in the heightwise direction (parallel to the Z axis) by the sizing process, the beading portion 21 of the electrode assembly 10 is pressed so its part may be compressed. In another aspect, since the battery housing 20 is compressed in the lengthwise direction (vertical direction) by the sizing process, the current collector 30 may be bent when subjected to the vertical pressure. That is, as the sizing process is performed, the tab coupling portion 32 is bent upward, causing damage to the weld between the tab coupling portion 32 and the first uncoated region 11. Accordingly, the current collector 30 needs to have a structure for preventing damage of the welded portion between the tab coupling portion 32 and the first uncoated region 11 after the sizing process.

Figure 22:
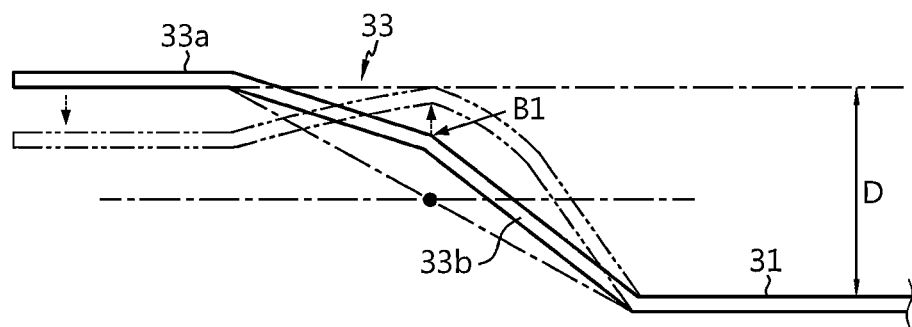
FIGS. 22 and 23 are diagrams illustrating the shape of a current collector (a first current collector) configured to maintain a weld area after a sizing process.

For example, when the connecting portion (the first connecting portion) 33b has an upwardly convex shape as shown in FIG. 22, it is possible to maximize the suppression effect of a phenomenon in which the tab coupling portion 32 is raised up as shown in FIG. 20. That is, when the battery housing 20 of FIG. 19 is compressed vertically, the connecting portion 33b bends and upward stress acts on the tab coupling portion 32 of the present disclosure. However, when the connecting portion 33b has the approximately upwardly convex shape like the current collector 30 of the present disclosure, it is possible to minimize the stress applied to the tab coupling portion 32. Accordingly, the tab coupling portion 32 is not bent upward, and the welded portion with the first uncoated region 11 may be kept in good welded state.

Figure 23:
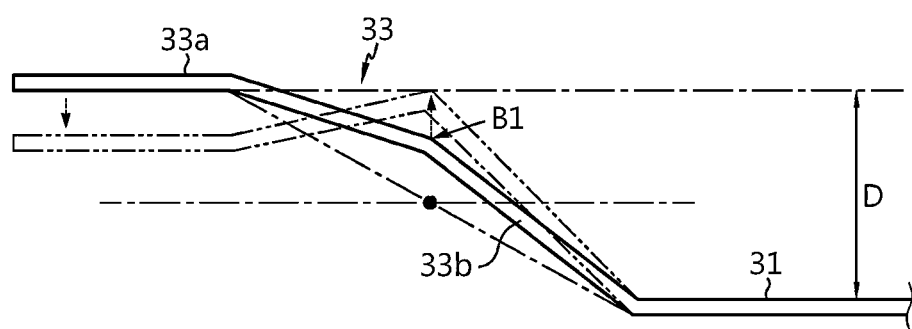

More specifically, referring to FIGS. 22 and 23, the connecting portion 33b before the sizing process may have the upwardly convex structure with respect to an imaginary straight line connecting the connection point between the contact portion 33a and the connecting portion 33b to the connection point between the connecting portion 33b and the tab coupling portion 32, i.e., an imaginary straight line connecting two ends of the connecting portion 33b in the lengthwise direction. For example, at least one bending portion B1 that forms an obtuse angle may be provided on the connecting portion 33b. Meanwhile, the bending portion B1 may pass through the approximately center of the imaginary straight line connecting the two ends of the connecting portion 33b, and may be disposed at an upper position than an imaginary plane parallel to the bottom surface of the battery housing 20. The length of the connecting portion 33b from the bending portion B1 to the tab coupling portion 32 may be longer than the length of the connecting portion 33b from the bending portion B1 to the contact portion 33a.

According to this structure, in the sizing process during which the vertical pressure is applied, the contact portion 33a moves down in the direction of arrow, and the connecting portion 33b is raised up in the direction of arrow (see the dashed line). More specifically, the connecting portion 33b is raised higher than the beading portion 21. That is, the profile of the housing coupling portion 33 changes before and after the sizing process as shown in FIGS. 22 and 23. The extent of protrusion of the connecting portion 33b may change depending on the height change of the battery housing 20 made by the sizing process. Meanwhile, as opposed to those shown in the drawing, the position of the bending portion B1 may only move up to the height level of the contact portion 33a. By the phenomenon in which the connecting portion 33b is raised up, the connecting portion 33b may absorb most of the stress, so the stress applied to the weld area of the tab coupling portion 32 and the first uncoated region 11 reduces. Accordingly, according to the present disclosure, the phenomenon in which the tab coupling portion 32 is raised up does not occur. In addition, by the above-described structure, the length of the connecting portion 33b from the bending portion B1 to the tab coupling portion 32 is longer than length of the connecting portion 33b from the bending portion B1 to the contact portion 33a, and thus it is easy to insert the current collector 30 into the battery housing 20, and it is possible to effectively dissipate the stress.

Meanwhile, the shape change by the protrusion of the connecting portion 33b may be made in the shape of an approximately curved line which is upwardly convex as shown in FIG. 22, or may be made in the shape of a bent straight line with respect to the bending portion B1 as shown in FIG. 23. When bending occurs in the shape of a straight line as shown in FIG. 23, each of the area from the bending portion B1 to the contact portion 33a and the area from the bending portion B1 to the tab coupling portion 32 in the connecting portion 33b may have a shape of a straight line.

As a result of studying the structure of the current collector 30 for preventing phenomena in which the current collector 30 is twisted and/or raised, the inventors found that when the connecting portion 33b has an upwardly convex structure, it is possible to significantly reduce damage that occurs in the welded portion between the tab coupling portion 32 and the first uncoated region 11 in the sizing process.

Figure 21:
FIG. 21 is a diagram illustrating a change in shape of a current collector (a first current collector) after a sizing process depending on the shape of the current collector before the sizing process.

FIG. 21 is a diagram illustrating a difference in the extent of damage depending on the shape of the current collector 30 before the sizing process. Referring to FIG. 21, experimental example 1 is an experimental example in which the connecting portion 33b before sizing is in the shape of a straight line, experimental example 2 is an experimental example in which the connecting portion 33b before sizing is downwardly convex, and experimental example 3 is an experimental example in which the connecting portion 33b before sizing is upwardly convex. As a result of 1 mm sizing in experimental examples 1 to 3, in experimental example 1 in which the connecting portion 33b is in the shape of a straight line, the weld area with the tab coupling portion 32 is raised up by approximately 0.72 mm. In experimental example 2 in which the connecting portion 33b is in a downwardly convex shape, the weld area with the tab coupling portion is raised up by approximately 0.99 mm. That is, it is found that when the connecting portion 33b is downwardly convex, the raised phenomenon is severer than the straight line shaped connecting portion 33b. Meanwhile, in experimental example 3 in which the connecting portion 33b has the upwardly convex shape, the weld area with the tab coupling portion 32 is raised up by approximately 0.02 mm. This represents that the raised phenomenon is significantly reduced compared to experimental examples 1 and 2. That is, in experimental example 3 in which the connecting portion 33b has the upwardly convex shape, it can be seen that it is possible to minimize damage of the weld area between the tab coupling portion and the first uncoated region. It is because the extent of protrusion of the current collector 30 may change depending on stress applied to the electrode assembly 10 by the current collector 30. That is, in experimental example 1 in which the connecting portion 33b has the straight line shape and experimental example 2 in which the connecting portion 33b has the downwardly convex shape, very large stress of approximately 4.5 MPa and 3.7 MPa is applied to the welded portion of the current collector 30 and the electrode assembly 10 in the sizing process, respectively, and thus it can be seen that the protrusion phenomenon of the current collector 30 is severer. In contrast, in experimental example 3 in which the connecting portion 33b has the upwardly convex shape, stress applied to the welded portion of the current collector 30 and the electrode assembly 10 in the sizing process is at the level of approximately 2.0 MPa, which is lower than experimental examples 1 and 2, and thus it can be seen that the raised phenomenon of the current collector 30 is reduced.

Accordingly, as shown in FIG. 22, the slope of the connecting portion 33b is not uniform, and the slope at the upper area may be smaller than the slope at the lower area with respect to a predetermined location (for example, the bending portion B1). The predetermined location may be disposed at the upper position than the middle of the connecting portion 33b. Alternatively, the connecting portion 33b may have an upwardly convex shape with respect to an imaginary straight line connecting the tab coupling portion 32 to the contact portion 33a. The convex shape may be a shape of connected straight lines, a curved shape, or a combined shape. In an example, as shown in FIG. 22 or 23, the connecting portion 33b may include at least one bending portion B1 with respect to the predetermined location. Preferably, the at least one bending portion B1 may be bent at an obtuse angle not to overlap when viewed along the lengthwise axis of the battery housing 20. Meanwhile, the boundary between the contact portion 33a and the connecting portion 33b may be bent at an obtuse angle. Accordingly, the connecting portion 33b may reduce in slope stepwise or gradually as the connecting portion 33b goes toward the beading portion 21.

In another aspect of the present disclosure, referring to FIG. 20, an angle θ between the tab coupling portion 32 and the connecting portion 33b may be, for example, 0 to 90°. For example, when the upper end of the electrode assembly 10 is raised to the height corresponding to the beading portion 21 in the sizing process, the tab coupling portion 32 and the contact portion 33a may be disposed at the same height. In this case, the angle θ between the tab coupling portion 32 and the connecting portion 33b is approximately 0°. Even though the sizing process is performed, it is undesirable that the contact portion 33a is disposed at the lower position than the tab coupling portion 32. In this case, the first uncoated region 11 may be too much pressed by the beading portion 21, causing damage. Accordingly, the angle θ between the tab coupling portion 32 and the connecting portion 33b may be equal to or higher than 0°. In another aspect, the angle θ between the tab coupling portion 32 and the connecting portion 33b may increase to approximately 90° with the stepwise or gradual changes in length, thickness or slope of the connecting portion 33b. However, to avoid contact with the housing cover 40, preferably, the angle θ does not exceed 90°.

In another aspect of the present disclosure, the connecting portion 33b may support the housing cover 40. For example, the connecting portion 33b may be bent upward by the sizing process. In this instance, the connecting portion 33b bent upward may contact the housing cover 40. In this case, the connecting portion 33b may support the housing cover 40 upward. Accordingly, the current collector 30 may be firmly fixed in the vertical direction by the sizing process. Accordingly, it is possible to prevent the electrode assembly 10 from unnecessarily moving up and down in the battery housing 20 when vibrations and/or impacts occur during the use of the cylindrical battery 1.

In another aspect of the present disclosure, the upper surface of the beading portion 21 and the lower surface of the beading portion 21 may be asymmetrical with respect to an imaginary reference plane passing through the innermost point of the beading portion 21 in parallel to the bottom surface of the battery housing. For example, referring to FIG. 20, when the battery housing 20 is vertically compressed by the sizing process, the beading portion 21 is also vertically compressed. In this instance, the upper surface of the beading portion 21 and the lower surface of the beading portion 21 may be asymmetrical with respect to an imaginary reference plane (see the dashed line) passing through the innermost point of the beading portion 21.

In another aspect of the present disclosure, the press-fit depth of the beading portion 21 may be defined as PD. For example, referring to FIG. 24, the vertical distance from the inner surface of the battery housing 20 to the innermost point of the beading portion 21 may be defined as the press-fit depth PD. Meanwhile, the shortest distance from the end of the contact portion 33a to a vertical line passing through the innermost point of the beading portion 21 may be defined as an overlap length OV. That is, referring to FIG. 24, the overlap length OV refers to the radial length of the overlap area of the beading portion 21 and the current collector 30 when the beading portion 21 is viewed from the top. In this instance, the cylindrical battery 1 of the present disclosure may satisfy the following relation equation.

$$(R1,_{min}+W_{bead,min})/PD_{max} \leq OV/PD \leq (PD_{max}-R2,_{min})/PD_{max}$$

Figure 24:
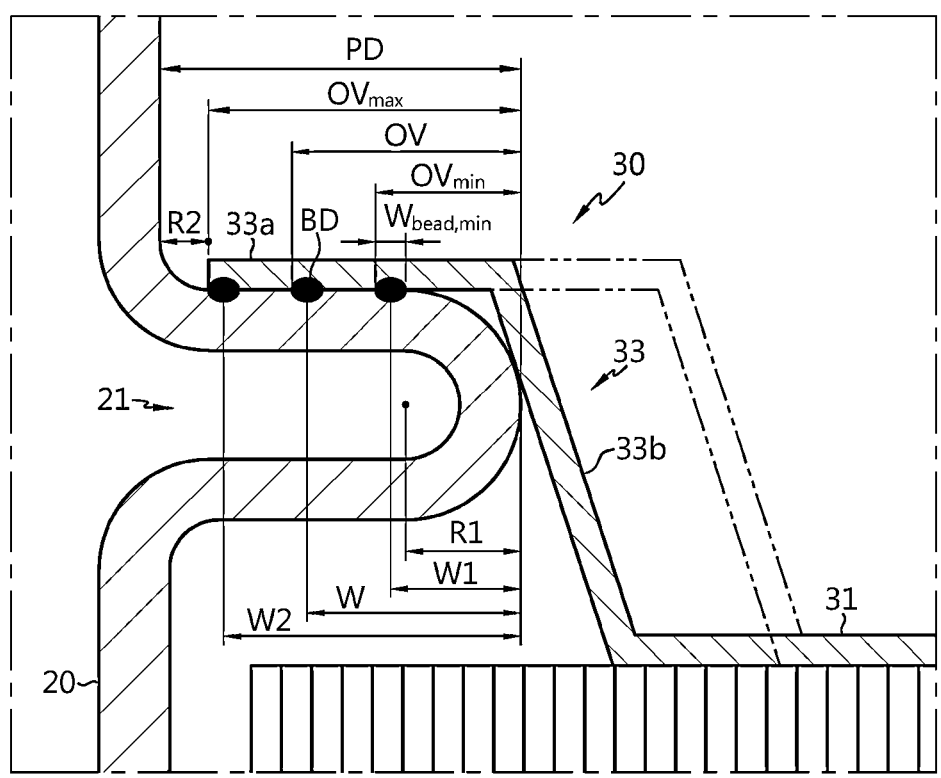
FIG. 24 is a diagram illustrating the position, length and width of a welding bead formed at a weld area between a contact portion and a beading portion of a current collector (a first current collector) of the present disclosure.

To weldably place the contact portion 33a of the current collector 30 on the beading portion 21, the ratio may be equal to or larger than $(R1,_{min}+W_{bead,min})/PD_{max}$. Referring to FIG. 24, to weldably place the contact portion 33a of the current collector 30 on the beading portion 21, a more overlap area than the radius of curvature R1 of the beading portion 21 is necessary. For example, when the contact portion 33a overlaps as much as the radius of curvature R1 of the beading portion 21, there is no flat region, so the contact portion 33a may contact the beading portion 21 at only one contact point. That is, the contact portion 33a cannot be stably placed on the beading portion 21. Accordingly, in addition to the radius of curvature R1 of the beading portion 21, the contact portion 33a needs an additional overlap area, and in this instance, preferably, the length of the additional overlap area is at least equal to or larger than the welding bead width $W_{bead}$. That is, the contact portion 33a overlaps, in substance, with the beading portion 21 at the additional overlap area, and welding may be performed at this area. Accordingly, the length of the additional overlap area is at least equal to or larger than the welding bead width $W_{bead}$ for stable welding without departing from the overlap area. That is, the minimum overlap length for weldably placing the contact portion 33a on the beading portion 21 is $R1_{,min}+W_{bead,min}$.

In another aspect, to weldably place the contact portion 33a of the current collector 30 on the beading portion 21, the ratio may be equal to or less than $(PD_{max}-R2_{,min})/PD_{max}$. Referring to FIG. 24, the radius of curvature R2 exists at the boundary area between the beading portion 21 and the inner surface of the battery housing 20. Accordingly, when the contact portion 33a of the current collector 30 moves into the boundary area between the beading portion 21 having the radius of curvature R2 and the inner surface of the battery housing 20, the contact portion 33a does not come into close contact with the beading portion 21 and is raised by the radius of curvature R2. Accordingly, the maximum overlap length for placing the contact portion 33a in close contact on the beading portion 21 is $PD_{max}-R2_{,min}$.

In an example, the maximum value $PD_{max}$ of the press-fit depth PD of the beading portion 21 may be approximately 10 mm, the minimum value of each of $R1_{,min}$ and $R2_{,min}$ may be approximately 0.05 mm, and $W_{bead,min}$ may be approximately 0.1 mm. In this instance, a ratio of the overlap length OV to the press-fit depth PD of the beading portion 21 may satisfy the range of approximately 1.5~99.5%. To weldably place the contact portion 33a of the current collector 30 on the beading portion 21, the ratio may be equal to or larger than approximately 1.5%. The lower limit of OV/PD may be determined from the maximum value $PD_{max}$ of the press-fit depth of the beading portion 21, the minimum value R1,min of the radius of curvature R1 and the minimum width of the contact portion 33a requiring contact with the upper surface of the beading portion 21 for welding of the contact portion 33a, i.e., the length of the minimum width $W_{bead,min}$ of the welding bead BD. Specifically, in an example, the maximum value $PD_{max}$ of the press-fit depth may be 10 mm, the minimum contact width of the contact portion 33a required for welding of the contact portion 33a, i.e., the length of the minimum width $W_{bead,min}$ of the welding bead BD may be 0.1 mm, and the minimum value $R1_{,min}$ of the radius of curvature R1 may be 0.05 mm. In this condition, the minimum value of the overlap length OV is 0.15 mm (=0.1 mm+0.05 mm) and $PD_{max}$ is 10 mm, and thus the lower limit of OV/PD is 1.5%. Meanwhile, a location at which the contact portion 33a of the current collector 30 may contact the flat portion of the upper surface of the beading portion 21 to the maximum width is a location the radius of curvature R2 away from the inner surface of the battery housing. Accordingly, when the end of the contact portion 33a is disposed at the corresponding location, the overlap length OV is at the maximum. The upper limit of OV/PD may be determined from the maximum value of the press-fit depth and the minimum value $R2_{,min}$ of the radius of curvature R2. Specifically, the maximum value of the press-fit depth may be 10 mm, and the minimum value of the radius of curvature R2 may be 0.05 mm. In this condition, the maximum value of the overlap length OV is 9.95 mm (=10 mm−0.05 mm) and $PD_{max}$ is 10 mm, and thus the upper limit of OV/PD is 99.5%.

In another aspect of the present disclosure, the welding position at which the beading portion 21 and the contact portion 33a are welded may be defined as W. More specifically, the welding position W may refer to the distance from the innermost point of the beading portion 21 to the center point of the welding bead BD disposed on the outermost side in the radial direction. In this instance, the welding position W and the press-fit depth PD may satisfy the following relation equation.

$$(OV_{min}-0.5*W_{bead,min})/PD_{max} \leq W/PD \leq (OV_{max}-0.5*W_{bead,min})/PD_{max}$$

The welding position W of the beading portion 21 and the contact portion 33a may be determined from the overlap length of the contact portion 33a and the beading portion 21 and the minimum width $W_{bead,min}$ of the welding bead BD. The welding position W is the center point of the welding bead BD.

Describing with reference to FIG. 24, the welding position when the contact portion 33a is placed on the beading portion 21 to the minimum extent may be defined as W1. The overlap length at that time is $OV_{min}$ as described above. Meanwhile, when the welding bead BD is formed in the overlap area, stable welding is performed, and thus the welding bead BD needs to be completely included in the overlap area. Accordingly, the welding position W1 is at least $0.5*W_{bead,min}$ away from $OV_{min}$ toward the inner side of the beading portion 21. Accordingly, W1 may satisfy the following relation equation.

$$W1=OV_{min}-0.5*W_{bead,min}$$

$$=R1_{,min}+W_{bead,min}-0.5*W_{bead,min}$$

$$=R1_{,min}+0.5*W_{bead,min}$$

Meanwhile, for the minimum W1/PD, PD should be at the maximum, and thus the minimum value of W/PD is $(OV_{min}-0.5*W_{bead,min})/PD_{max}$.

In another aspect, describing with reference to FIG. 24, the welding position when the contact portion 33a moves into the beading portion 21 to the maximum extent may be defined as W2. The overlap length at that time is $OV_{max}$ as described above. Meanwhile, when the welding bead BD is formed in the overlap area, stable welding is performed, and thus the welding bead BD needs to be completely included in the overlap area. Accordingly, the welding position W2 is at least $0.5*W_{bead,min}$ away from $OV_{max}$ toward the inner side of the beading portion 21. Accordingly, W2 may satisfy the following relation equation.

$$W2=OV_{max}-0.5*W_{bead,min}$$

$$=PD_{max}-R2_{,min}-0.5*W_{bead,min}$$

Meanwhile, for the maximum W2/PD, the product of dividing $(PD_{max}-R2_{,min}-0.5*W_{bead,min})$ by PD, i.e., $\{1-(R2_{,min}+0.5*W_{bead,min})/PD\}$ should be at the maximum. That is, when the PD value is at the maximum, the W2/PD value is at the maximum. Accordingly, the maximum value of W/PD is $(OV_{min}-0.5*W_{bead,min})/PD_{max}$.

In an example, the minimum width necessary for welding the contact portion 33a to the beading portion 21 may be 0.1 mm. That is, the width of 0.1 mm corresponds to the minimum width of the welding bead BD that may be formed by laser welding. Accordingly, the welding position W1 when the contact portion 33a contacts the upper surface of the beading portion 21 to the minimum width corresponds to a location $(R1_{,min}+0.5*0.1$ mm$)$ away from the innermost point of the beading portion 21. Here, $R1_{,min}$ is the minimum value of the radius of curvature R1, and for example, is 0.05 mm. When laser is irradiated onto the corresponding location, the welding bead BD having the width of 0.1 mm is formed on the contact surface between the contact portion 33a and the beading portion 21. The width of the welding bead BD corresponds to the minimum contact width of the contact portion 33a. The welding position W1 with respect to the press-fit depth PD of the beading portion 21 is a location 0.1 mm away with respect to the innermost point of the beading portion 21.

Meanwhile, when the contact portion 33a contacts the upper surface of the beading portion 21 to the maximum width, the end of the contact portion 33a is disposed at a location the radius of curvature ($R2_{,min}$) away from the inner surface of the battery housing. Here, $R2_{,min}$ is the minimum value of the radius of curvature R2, and for example, is 0.05 mm. In this case, the welding position W2 closest to the end of the contact portion 33a is a location 0.05 mm away from the end of the contact portion 33a. When laser is irradiated onto the corresponding location, the welding bead having the minimum width of 0.1 mm may be formed in contact with the end of the contact portion 33a. The welding position W2 when the contact portion 33a contacts the upper surface of the beading portion 21 to the maximum width is a location ($PD-R2_{,min}-0.05$ mm) away with respect to the innermost point of the beading portion 21. In an example, when $R2_{,min}$ is 0.05 mm, the maximum value of the welding position W2 is a location PD-0.1 mm away with respect to the innermost point of the beading portion 21.

According to the foregoing description, when $R1_{,min}$ and $R2_{,min}$ are 0.05 mm, the welding position W of the contact portion 33a with respect to the press-fit depth PD may be set to the range of (0.1 mm) to (PD−0.1 mm) with respect to the innermost point of the beading portion 21. Since the ratio of the welding position W1 with respect to the press-fit depth PD is when the press-fit depth PD is at the maximum, the minimum value (%) of W1/PD is 1% (=100*0.1 mm/10 mm). In addition, since the maximum value of the ratio W1/PD of the welding position W2 with respect to the press-fit depth PD is when PD is at the maximum value, the maximum value (%) of W2/PD is 99% (=100*(10 mm−0.1 mm)/10 mm). In summary, the welding position area with respect to the press-fit depth PD may be an area of 1% or more and 99% or less with respect to the press-fit depth PD.

Meanwhile, describing with reference to FIG. 24, the distance of the center point of the welding bead BD disposed on the outermost side in the radial direction from the innermost point of the beading portion 21 when the overlap length is OV may be defined as W. In this instance, the cylindrical battery 1 of the present disclosure may satisfy the following relation equation.

$$W=OV-0.5*W_{bead,min}$$

In another aspect, the beading portion 21 may have the flat region F parallel to the lower surface of the battery housing 20 at least in part, and the length of the flat region F of the beading portion 21 which contacts the current collector 30 may be OV−R1. That is, describing with reference to FIG. 23, the flat region F corresponds to the length obtained by subtracting the radius of curvature R1 of the beading portion 21 from the overlap length OV.

In still another aspect of the present disclosure, when the overlap length is OV, the radial width length of the welding pattern or a set of welding beads BD formed between the beading portion 21 and the contact portion 33a may be $W_{bead,min}$ or more and OV−R1 or less.

Describing with reference to FIG. 24, the minimum width of the welding bead BD is $W_{bead,min}$, and thus the minimum value of the radial width length of the welding pattern formed between the beading portion 21 and the contact portion 33a is at least $W_{bead,min}$. Meanwhile, a plurality of welding beads BD may be formed over the entire flat region F of the beading portion 21. In this instance, the plurality of welding beads BD may form a uniform welding pattern.

Referring to FIG. 23, the maximum value of the radial width length of the welding pattern formed between the beading portion 21 and the contact portion 33a may satisfy the following relation equation.

Maximum value of the radial widthwise length of the welding pattern formed between the beading portion 21 and the contact portion 33a $$=W-W1+\text{minimum width of the welding bead } BD$$

$$=[(OV-0.5*W_{bead,min})-(R1+0.5*W_{bead,min})]+W_{bead,min}$$

$$=OV-R1$$

In another aspect of the present disclosure, the ratio of the radial widthwise length of the welding pattern to the length of the flat region F may satisfy the range of approximately 10 to 40%. The ratio may satisfy approximately 20 to 30%. When the ratio satisfies the above-described range, the weld strength may increase with the increasing weld area. Accordingly, the cylindrical battery 1 according to the present disclosure may have the outstanding shock resistant characteristics.

In another aspect of the present disclosure, a ratio of a non-contact area between the current collector 30 and the upper surface of the electrode assembly 10 to the area of a circle having the outer diameter of the electrode assembly 10 as the diameter may be defined as the open ratio of the current collector 30. The open ratio may be calculated by the following equation.

Open ratio (%)=1−(contact area between the current collector and the upper surface of the electrode assembly)/(area of circle having the outer diameter of the electrode assembly as the diameter)

=(non-contact area between the current collector and the upper surface of the electrode assembly)/ (area of circle having the outer diameter of the electrode assembly as the diameter)

The open ratio of the current collector 30 may be, for example approximately 30% or more and less than 100%, and more particularly approximately 60% or more and less than 100%. Describing that the current collector 30 shown in FIG. 8a is placed on and coupled to the electrode assembly 10 for illustrative purposes, the contact area between the current collector 30 and the electrode assembly 10 may be the support portion 31 and the tab coupling portion 32. That is, in other words, the ratio of the contact area between the current collector 30 and the electrode assembly 10 to the area of the circle having the outer diameter of the electrode assembly 10 as the diameter may be approximately 70% or less, and more particularly approximately 40% or less. When the open ratio of the current collector 30 is in the above-described range, the electrolyte solution may smoothly permeate the electrode assembly 10 through the open area of the current collector 30 including the current collector hole H2 when the electrolyte solution is injected. That is, when the open ratio of the current collector 30 is in the above-described range, the electrolyte solution permeates the electrode assembly 10 through the winding center hole H1 provided in the electrode assembly 10 and the open area of the current collector 30, and in particular, there is a small gap between the overlap surfaces of the segments 11a and between the adjacent segments 11a, and thus the electrolyte solution may smoothly permeate the electrode assembly 10 through the corresponding gap by capillarity.

Figure 14:
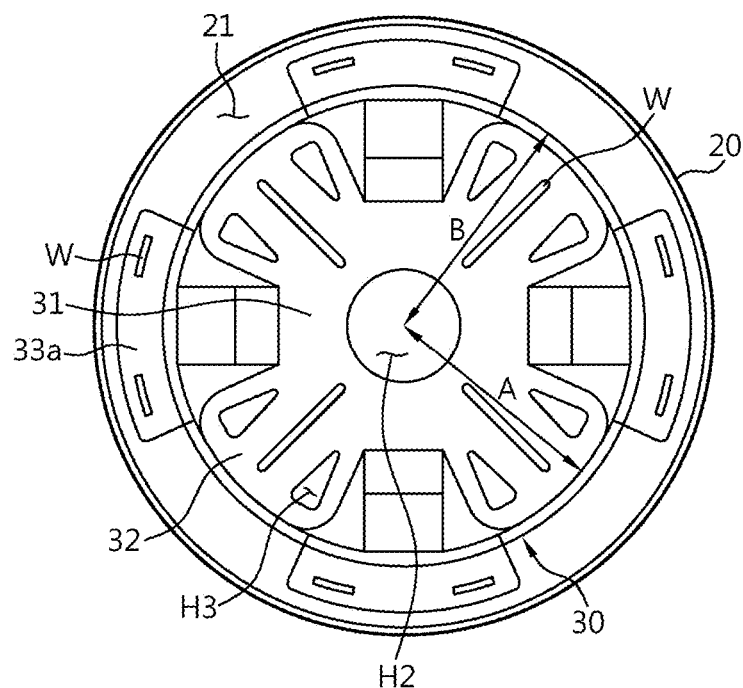
FIG. 14 is a top view showing a current collector (a first current collector) according to the present disclosure, coupled with a battery housing.

Referring to FIGS. 13 and 14, the distance A from the center of the current collector 30 to the end of the tab coupling portion 32 may be substantially equal to or shorter than the distance B from the center of the winding hole H1 of the electrode assembly 10 to the innermost side of the beading portion 21 formed in the battery housing 20. In this case, it is possible to prevent interference between the beading portion 21 and the current collector 30 in the sizing process described above, thereby preventing damage from occurring in the current collector and/or the electrode assembly 10 by the pressing of the beading portion 21 on the current collector 30.

At least one welding bead W may be provided for each tab coupling portion 32. In addition to the tab coupling portion 32, the welding bead W may be formed in the support portion 31 of the current collector 30.

The flat portion may be provided on the beading portion 21 as described above. At least one welding bead W is formed between the beading portion 21 and the first contact portion 33a. The at least one welding bead W may form a straight line shaped welding pattern extending along the approximately circumferential direction on the beading portion 21. Alternatively, at least one welding bead W formed between the beading portion 21 and the first contact portion 33a may form an arc shaped welding pattern extending along the approximately circumferential direction on the beading portion 21. The welding bead W formed on the first contact portion 33a may extend along the circumferential direction. In another aspect, the welding pattern may have a shape of a line formed by connection of spot welding. In another aspect, a plurality of welding beads formed between the beading portion 21 and the first contact portion 33a may be formed within the same contact portion 33a.

Meanwhile, when the plurality of first housing coupling portions 33 is provided, the first contact portions 33a provided in the plurality of first housing coupling portions 33 may be connected to each other and integrally formed.

Referring to FIG. 1, the housing cover 40 covers the open portion formed on one side of the battery housing 20. The housing cover 40 may be fixed by the crimping portion 22 formed on top of the battery housing 20. In this case, for the improved fixing strength and improved sealability of the battery housing 20, the sealing gasket G1 may be interposed between the battery housing 20 and the housing cover 40 and between the current collector 30 and the housing cover 40. In this case, the first contact portion 33a and/or the second contact portion 34a may be interposed between the beading portion 21 of the battery housing 20 and the sealing gasket G1. The first contact portion 33a and/or the second contact portion 34a interposed between the beading portion 21 and the sealing gasket G1 may be fixed by the bend of the crimping portion 22 extending upward from the beading portion 21.

Meanwhile, in the present disclosure, the housing cover 40 is not a component serving as the passage of current. Accordingly, so long as the battery housing 20 and the housing cover 40 are firmly fixed through fixing by welding or the application of other component and the open portion of the battery housing 20 is air-tightly closed, the use of the sealing gasket G1 is not essential.

When the sealing gasket G1 is applied, the extended length of a region interposed between the current collector 30 and the housing cover 40 in the sealing gasket G1 may be shorter than the extended length of a region interposed between the battery housing 20 and the housing cover 40. That is, the sealing gasket G1 surrounds the housing cover 40, and the radial length of the region that covers the lower surface of the housing cover 40 may be shorter than the radial length of the region that covers the upper surface of the housing cover 40. When the sealing gasket G1 is extended too long in the direction toward the center of the cylindrical battery 1 within the battery housing 20, the current collector 30 may be deformed due to the interference between the sealing gasket G1 and the current collector 30, and as a consequence, a force is applied to the welded portion between the current collector 30 and the battery housing 20 and/or the welded portion between the current collector 30 and the first uncoated region 11, causing structural defects such as cracks. Accordingly, it is possible to prevent the defects by controlling the extended length in the sealing gasket G1 as described above.

Figure 19:
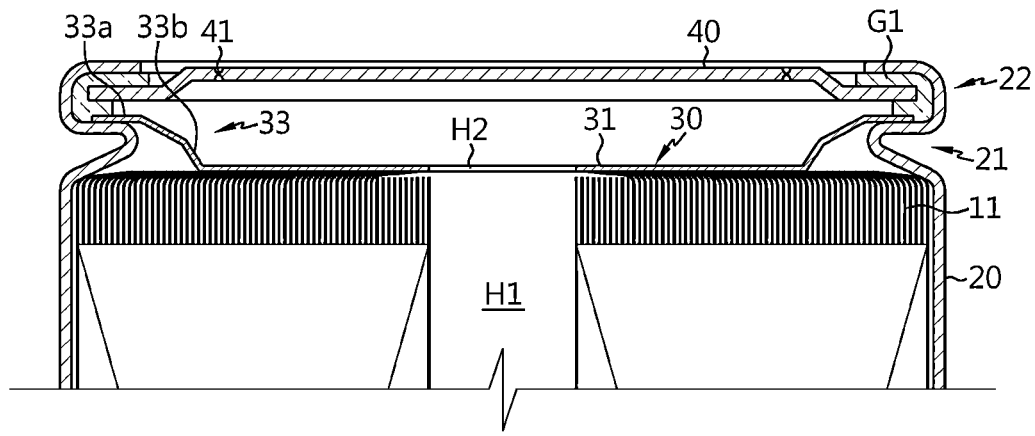
FIG. 19 is a diagram illustrating a crimping process of a battery housing.

Referring to FIGS. 19 and 20, the sealing gasket G1 may have a larger thickness at the non-contact area with the first contact portion 33a than the contact area with the first contact portion 33a. The sealing gasket G1 may have a larger compression ratio at the contact area with the first contact portion 33a than the non-contact area with the first contact portion 33a. Since the sealing gasket G1 includes both the region having the first contact portion 33a and the region without the first contact portion 33a, the thickness may change for each region along the circumferential direction on the beading portion 21. Since the sealing gasket G1 has both the region having the first contact portion 33a and the region without the first contact portion 33a, the thickness may repeatedly increase and decrease in an alternating manner along the circumferential direction on the beading portion 21. Since the sealing gasket G1 has both the region having the first contact portion 33a and the region without the first contact portion 33a, the compression ratio may change for each region along the circumferential direction on the beading portion 21. It is because there is a difference in the extent of compression of the sealing gasket G1 at the region in which the first contact portion 33a is inserted and the region in which the first contact portion 33a is not inserted, so there is a difference in thickness. Meanwhile, alternatively, when the thickness differs for each location of the sealing gasket G1, the compression ratio at the contact area between the sealing gasket G1 and the first contact portion 33a may be substantially equal to the compression ratio at the non-contact area. In an example, the thickness of the sealing gasket G1 in non-contact with the first contact portion 33a may increase. In this case, it is possible to prevent a phenomenon in which the compression ratio of the sealing gasket G1 at the region without the first contact portion 33a is lower than that of the surrounding region, and avoid the sealing performance degradation in the corresponding region.

Meanwhile, the housing cover 40 may include a venting portion 41 to prevent the increase in internal pressure caused by gas produced in the battery housing 20. The venting portion 41 corresponds to an area that is formed in a part of the housing cover 40 and is more structurally vulnerable than the other areas to easily blow when the internal pressure is applied. The venting portion 41 may be, for example, an area having a smaller thickness than the other areas.

The terminal 50 is electrically connected to the second uncoated region 12 of the electrode assembly 10 through the battery housing 20 on the opposite side to the open portion of the battery housing 20. The terminal 50 may pass through the approximately center of the lower surface of the battery housing 20. For example, the terminal 50 may be coupled with the current collector (the second current collector) 60 coupled to the second uncoated region 12 or the lead tab coupled to the second uncoated region 12 and may be electrically connected to the electrode assembly 10. Accordingly, the terminal 50 has the same polarity as the second electrode of the electrode assembly 10, and may act as a second electrode terminal T2. When the second uncoated region 12 is a positive electrode tab, the terminal 50 may serve as a positive electrode terminal.

When considering the polarity and function of the terminal 50, the terminal 50 needs to be kept insulated from the battery housing 20 having the contrary polarity. To this end, the insulation gasket G2 may be applied between the terminal 50 and the battery housing 20. Alternatively, insulation may be achieved by coating a part of the surface of the terminal 50 with an insulating material.

By the same reason, the second uncoated region 12 and/or the current collector (the second current collector) 60 need to be kept insulated from the battery housing 20. To this end, the insulator 70 may be interposed between the second uncoated region 12 and the battery housing 20 and/or between the current collector (the second current collector) 60 and the battery housing 20. When the insulator 70 is applied, the terminal 50 may pass through the insulator 70 for electrical connection with the second uncoated region 12.

Meanwhile, in the present disclosure, an outer surface 20a of the closed portion disposed opposite the open portion provided on top of the battery housing 20 may serve as a first electrode terminal T1. When the first uncoated region 11 is a negative electrode tab, the first electrode terminal T1 may be a negative electrode terminal. The cylindrical battery 1 according to the present disclosure has a structure in which the terminal 50 exposed on the lower surface disposed opposite the open portion of the battery housing 20 may be used as the second electrode terminal T2, and the remaining area except an area occupied by the terminal 50 in the lower surface of the battery housing 20 (including the exposed area of the insulation gasket G2 in case that the insulation gasket G2 is exposed to the outside of the terminal 50 on the outer surface 20a of the closed portion) may be used as the first electrode terminal T1. Accordingly, the cylindrical battery 1 according to the present disclosure may connect both the positive electrode/the negative electrode in a direction when electrically connecting the plurality of cylindrical batteries 1, thereby simplifying the electrical connection structure. In addition, since the cylindrical battery 1 according to the present disclosure has a structure in which most of the lower surface opposite the open portion of the battery housing 20 can be used as an electrode terminal, it is possible to have a sufficient area for welding the component for electrical connection.

Referring to FIG. 14 together with FIG. 1, in the cylindrical battery 1 of the present disclosure, the current collector (the first current collector) 30 is configured to be coupled with the first uncoated region 11 and the inner surface of the battery housing 20. The current collector 30 may include a first portion in contact with the inner surface of the battery housing 20, and a second portion coupled with the first uncoated region 11. In this case, when the central region of the first portion (referring to the approximately center of the first portion along the circumferential direction of the electrode assembly 10) is projected onto the plane where the second portion exists, the central region of the first portion and the second portion may be spaced apart from each other along the circumferential direction of the electrode assembly 10.

The sealing gasket G1 may be interposed between the open portion of the battery housing 20 and the current collector 30, and in this case, the first portion may be interposed between the inner surface of the battery housing 20 and the sealing gasket G1. Preferably, the first portion may be interposed between the beading portion 21 of the battery housing 20 and the sealing gasket G1.

Meanwhile, the first portion and the second portion may be disposed on different planes in the winding axial direction of the electrode assembly 10. That is, the first portion and the second portion may be spaced apart from each other along the heightwise direction (parallel to the Z axis) of the cylindrical battery 1.

Figure 25:
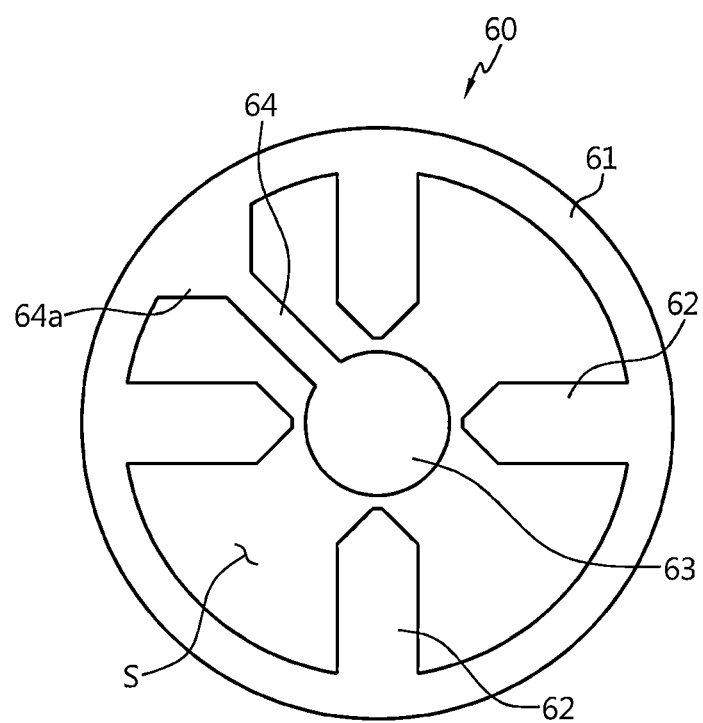
FIG. 25 is a diagram showing an embodiment of a current collector (a second current collector) applied to the present disclosure.

Referring to FIG. 25 together with FIG. 1, the current collector (the second current collector) 60 is coupled to the bottom of the electrode assembly 10. The current collector 60 is made of a metal having conductive properties, and is electrically coupled to the second uncoated region 12. The current collector 60 may be coupled onto the coupling surface (the bent surface) 102 (see FIG. 15) formed by bending the end of the second uncoated region 12 in the direction parallel to the current collector 60. The bending direction of the second uncoated region 12 may be the radial direction, and for example, the direction toward the core of the electrode assembly 10. When the second uncoated region 12 has the bent shape as described above, the space occupied by the second uncoated region 12 in the vertical direction reduces, thereby improving the energy density. In addition, when the current collector 60 is coupled onto the coupling surface 102 formed by the bend of the second uncoated region 12, the increased coupling area may lead to the improved coupling strength and the reduced contact resistance. This is the same case with the first uncoated region 11 described previously.

The current collector (the second current collector) 60 includes a tab coupling portion (a second tab coupling portion) 62 and a terminal coupling portion 63. The current collector 60 may further include an edge portion 61. The edge portion 61 is positioned below the electrode assembly 10 and has an approximately rim shape having an empty space S inside. Although the drawings of the present disclosure show the edge portion 61 having an approximately circular rim shape, the present disclosure is not limited thereto. The edge portion 61 may have an approximately square rim shape, hexagonal rim shape, octagonal rim shape, or any other rim shape as opposed to those shown in the drawings.

The tab coupling portion 62 may extend inward from the edge portion 61 and is coupled with the second uncoated region 12. As described above, the coupling between the current collector 60 and the second uncoated region 12 may have at least approximately 50% overlap with the uniform stack number zone where the number of overlapping layers of the segments is approximately at the maximum and is approximately uniformly maintained. That is, the tab coupling portion 62 of the current collector 60 may be coupled with the second uncoated region 12 at least approximately 50% overlap with the uniform stack number zone.

The terminal coupling portion 63 is spaced apart from the tab coupling portion 62. The terminal coupling portion 63 may be disposed inside the edge portion 61. The terminal coupling portion 63 may be coupled with the terminal 50 as described below by welding. To ensure the weld area for coupling with the flat portion formed on the bottom surface of the terminal 50, the terminal coupling portion 63 may have the diameter that is substantially equal or larger than the diameter of the flat portion formed on the bottom surface of the terminal 50. The terminal coupling portion 63 may be disposed, for example, at the approximately center of the internal space surrounded by the edge portion 61.

The terminal coupling portion 63 may be positioned at the location corresponding to the winding hole H1 formed in the core of the electrode assembly 10. The terminal coupling portion 63 may be configured to cover the winding hole H1 of the electrode assembly 10 to prevent the exposure of the winding hole H1 of the electrode assembly 10. When the winding hole H1 of the electrode assembly 10 is covered as described above, it is possible to prevent the separator disposed in the hole from being damaged due to the flow rate of the electrolyte solution passing through the hole and the consequential exposure of the electrode. To this end, the terminal coupling portion 63 may have a larger diameter or width than the winding hole H1 as described above. However, the present disclosure does not exclude the case where the diameter of the terminal coupling portion 63 is smaller than the diameter of the flat portion formed on the bottom surface of the terminal 50.

The tab coupling portion 62 and the terminal coupling portion 63 are not directly connected to each other, and they are spaced apart from each other and electrically connected by the edge portion 61. Since the current collector 60 of the present disclosure has a structure in which the tab coupling portion 62 and the terminal coupling portion 63 are not directly connected to each other and they are indirectly connected through the edge portion 61, it is possible to disperse impacts applied to the coupled portion between the tab coupling portion 62 and the second uncoated region 12 and the coupled portion between the terminal coupling portion 63 and the terminal 50 when impacts and/or vibrations are applied to the cylindrical battery 1. Accordingly, the current collector 60 of the present disclosure may minimize or prevent damage of the welded portion by external impacts. More specifically, the current collector 60 of the present disclosure may have a structure in which stress concentrates on the connected portion of the edge portion 61 and the terminal coupling portion 63 when external impacts are transmitted to the inside of the battery 1 through the terminal 50. However, the connected portion is not an area in which the welded portion for coupling between components is formed. Accordingly, in the present disclosure, it is possible to effectively prevent defects of products caused by the damage of the welded portion due to external impacts.

The outer diameter of the current collector (the second current collector) 60 may be longer than the outer diameter of the current collector (the first current collector) 30. The outer diameter of the second current collector 60 is twice greater than the distance from the center of the second current collector 60 to the end of the second tab coupling portion 62 (the distance to the edge portion 61 in case that the second current collector 60 includes the edge portion 61). The outer diameter of the first current collector 30 is twice greater than the distance from the center of the first current collector 30 to the outermost side of the first tab coupling portion 32. The second current collector 60 may have the outer diameter close to the inner diameter of the battery housing 20. The second current collector 60 may have the outer diameter ranging from approximately 33% to 98.5% compared to the inner diameter of the battery housing 20. The minimum value of the outer diameter of the second current collector 60 is a numerical value for preventing the resistance from increasing too much. The maximum value of the outer diameter of the second current collector 60 takes into account, for example, the tolerance of the outer diameter of the second current collector 60 that may occur in the manufacture of the current collector 60, the assembly tolerance that occurs when coupling the electrode assembly 10 and the second current collector 60, the tolerance of the inner diameter of the battery housing 20 that may occur in the manufacture of the battery housing 20 and the positional tolerance that may occur when inserting the assembly of the electrode assembly 10 and the second current collector 60 into the battery housing 20. In the present disclosure, when the insulator 70 is applied and the insulator 70 covers up to the top of the outer circumferential surface of the electrode assembly 10, it is necessary to further consider a space for insertion of the insulator 70, and thus a ratio of the outer diameter of the second current collector 60 to the inner diameter of the battery housing 20 is smaller than the maximum value. In view of the tolerance, the outer diameter of the second current collector 60 is limited at a slightly smaller level than the inner diameter of the battery housing 20, while the diameter of the first current collector 30 may be further limited to avoid interference that may occur in the sizing process. To avoid interference, the outer diameter of the first current collector 30 may be approximately equal to or shorter than the inner diameter in the area in which the beading portion 21 of the battery housing 20 is formed.

Meanwhile, when the outer diameter of the first current collector 30 and/or the second current collector 60 is T, the outer diameter of the electrode assembly 10 is JR, and the height of the segment of the first uncoated region 11 and/or the outermost segment of the second uncoated region 12 is F, the following relation equation may be satisfied. Here, the outer diameter of the first current collector 30 is twice larger than the distance from the center of the first current collector 30 to the end of the first tab coupling portion 32, and the outer diameter of the second current collector 60 is twice larger than the distance from the center of the second current collector 60 to the end of the second tab coupling portion 62 (or the outermost side of the edge portion 61).

$$JR-2*F \leq T < JR$$

The outer diameter T of the first current collector 30 and/or the second current collector 60 may be equal to or larger than the length obtained by subtracting twice the height F of the segment 11a of the first uncoated region 11 and/or the outermost segment of the second uncoated region 12 from the outer diameter JR of the electrode assembly 10. When this relation equation is satisfied, the first tab coupling portion 32 and/or the second tab coupling portion 62 covers the end of the outermost segment 11a. That is, the first current collector 30 and/or the second current collector 60 may have the outer diameter enough to cover the end of the segment at the last winding turn of the first electrode. In this case, all the segments 11a that form the bent surface 102 where the first tab coupling portion 32 and/or the second tab coupling portion 62 (or the edge portion 61) is coupled may be welded in a state that they are uniformly pressed by the current collector 30, and after the welding, the closely stacked state of the segments 11a may be maintained well. The closely stacked state refers to no gap, in substance, between the segments as shown in FIG. 15. The closely stacked state contributes to the reduction in the resistance of the cylindrical battery 1 below the suitable level (for example, 4 mohm, but greater than 0 mohm, such as 0.01 mohm) for rapid charging.

In another aspect, the outer diameter T of the first current collector 30 and/or the second current collector 60 may be smaller than the outer diameter JR of the electrode assembly 10. When the outer diameter T of the first current collector 30 and/or the second current collector 60 is larger than the outer diameter JR of the electrode assembly 10, a dead space in the battery housing 20 increases, which may adversely affect the energy density of the cylindrical battery 1. Accordingly, the outer diameter T of the first current collector 30 and/or the second current collector 60 is smaller than the outer diameter JR of the electrode assembly 10.

Meanwhile, the extended length L2 of the welded portion along the radial direction of the electrode assembly 10 in coupling the second tab coupling portion 62 of the second current collector 60 and the second uncoated region 12 may be longer than the extended length L1 of the welded portion along the radial direction of the electrode assembly 10 in coupling the first tab coupling portion 32 of the first current collector 30 and the first uncoated region 11. For example, in case that the second current collector 60 is an aluminum positive electrode current collector and the first current collector 30 is a copper negative electrode current collector, when the length L2 is longer than the length L1, the welded portion of the positive electrode current collector having lower electrical conductivity is larger in size, leading to the balanced flow of current in each of the positive electrode current collector and the negative electrode current collector. Here, the extended length of the welded portion used for coupling between the current collectors 30, 60 and the uncoated regions 11, 12 refers to the extended length of the welding bead formed by welding.

On the basis of the core of the electrode assembly 10, the distance to the start point of the welded portion used for coupling between the first tab coupling portion 32 of the first current collector 30 and the first uncoated region 11 may be substantially equal to the distance to the start point of the welded portion used for coupling between the second tab coupling portion 62 of the second current collector 60 and the second uncoated region 12. Here, substantially equal may refer to two equal distances or two distances having the deviation of, for example, approximately 5% or less.

The current collector 60 may further include a bridge portion 64 which extends inward from the edge portion 61 and is connected to the terminal coupling portion 63. The bridge portion 64 may include a taper portion 64*a* having a continuous and/or stepwise reduction in width along a direction from the inner surface of the edge portion 61 to the terminal coupling portion 63. The taper portion 64*a* may have a continuous and/or stepwise increase in width along a direction from the connected portion between the terminal coupling portion 63 and the edge portion 61 toward the edge portion 61. When the taper portion 64*a* is provided, it is possible to increase the rigidity of the component at the connected portion between the bridge portion 64 and the edge portion 61. When the taper portion 64*a* is provided, it is possible to transfer the current collector 60 and/or the assembly of the current collector 60 and the electrode assembly 10 easily and safely, for example, by a transport device and/or an operator who holds the taper portion 64*a* in the process of manufacturing the cylindrical battery 1. That is, when the taper portion 64*a* is provided, it is possible to prevent defects of products that may occur when holding a component to be welded with other component, such as the tab coupling portion 62 or the terminal coupling portion 63.

A plurality of tab coupling portions 62 and/or a plurality of bridge portions 64 may be provided. The number of tab coupling portions 62 and/or bridge portions 64 may be determined, taking into account the resistance level required for the cylindrical battery 1 and the open ratio required for the current collector 60.

Figure 26:
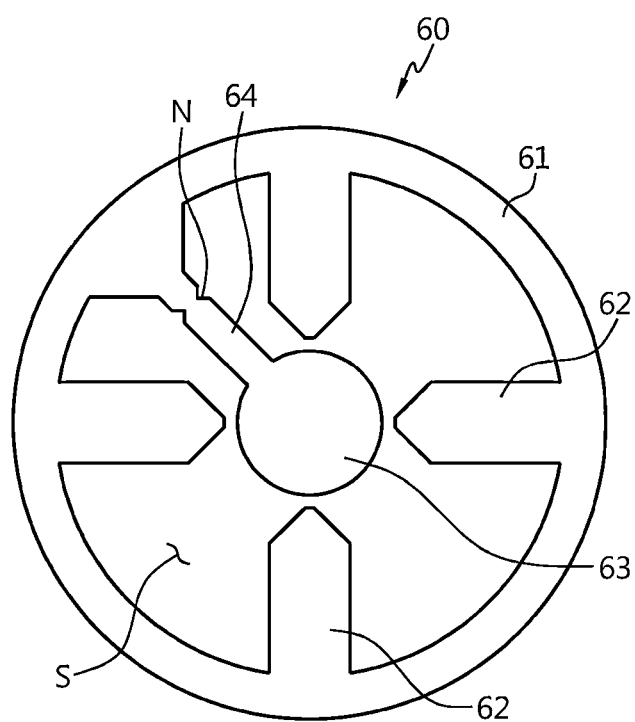
FIG. 26 is a diagram showing a current collector (a second current collector) of a different embodiment from the current collector (the second current collector) shown in FIG. 25.

Referring to FIGS. 1 and 26, the bridge portion 64 may include a current interruption portion N configured to partially reduce the cross-sectional area of the bridge portion 64. The reduction in cross-sectional area of the bridge portion 64 at the area in which the current interruption portion N is formed if formed may be accomplished, for example, through a partial reduction in width and/or thickness. When the current interruption portion N is provided, in the event of the increasing electrical resistance at the area in which the current interruption portion N is formed, causing an overcurrent, the current interruption portion N blows, thereby achieving fast current interruption. A plurality of current interruption portions N may be provided along the lengthwise direction of the bridge portion 64. A plurality of current interruption portions N may be provided along the lengthwise direction of the bridge portion 64. When the plurality of bridge portions 64 is provided, the current interruption portion may be provided in at least one of the plurality of bridge portions 64. Although the drawings of the present disclosure show the current interruption portion N in the shape of a notch, the present disclosure is not limited thereto, and the current interruption portion N may be formed, for example, in the shape of a groove and/or a through-hole. A tape surrounding the bridge portion 64 may be applied to the area in which the current interruption portion N is formed. When the tape is applied, it is possible to prevent impurities, such as molten metal, produced when the current interruption portion N blows from splattering to other components, and avoid a short circuit. In addition, heat generated from the current interruption portion N is not transferred to the outside, thereby allowing the current interruption portion N to blow faster.

Meanwhile, to prevent impurities produced at the time of blowing from entering the electrode assembly 10, the current interruption portion N is preferably provided at the area corresponding to the uniform stack number zone of the second uncoated region 12 described above. In this area, the number of overlapping layers of the segments of the second uncoated region 12 may be maintained at the maximum, and the overlapping segments may serve as a mask. The current interruption portion N may be formed, for example, approximately 40% to 90% away with respect to the radius of the electrode assembly 10 along the radial direction from the core of the electrode assembly 10. Preferably, the current interruption portion N may be disposed at the approximately center between the core and the outermost side of the electrode assembly 10.

The structure of the electrode assembly 10 will be described in more detail with reference to FIGS. 27 to 30. Among the first and second electrodes described above, the following description is based on the first electrode as an example, but the structure of the first electrode may be equally applied to the second electrode.

Referring to FIGS. 27 to 30, the first electrode 110 includes the first electrode current collector 111 of a sheet shape made from a conductive foil, the first active material layer 112 formed on at least one surface of the first electrode current collector 111, and the first uncoated region 11 not coated with an active material at the end of the long side of the first electrode current collector 111.

Preferably, the first uncoated region 11 may include the plurality of notched segments 11*a*. The plurality of segments 11*a* forms a plurality of groups, and the height (the length in the Z-axis direction) and/or the width (the length in the X-axis direction) and/or the pitch of the segments 11*a* in each group may be substantially equal to each other. The number of segments 11*a* in each group may be smaller or larger than those shown in the drawings. The segment 11*a* has a geometric shape of a combination of at least one straight line and/or at least one curve. Preferably, the segment 11*a* may have a trapezoidal shape, and modification may be made to the shape, for example, a rectangular, parallelogram, semicircular or a semi-elliptical shape.

Preferably, the height of the segment 11a may gradually increase along a direction parallel to the winding direction of the electrode assembly 10, for example, from the core toward the outer circumference. In addition, a core-side uncoated region 11-1 adjacent to the core of the electrode assembly 10 may not include the segment 11a, and the height of the core-side uncoated region 11-1 may be lower than another uncoated region. In addition, an outer circumferential uncoated region 11-2 adjacent to the outer circumference of the electrode assembly 10 may not include the segment 11a, and the height of the outer circumferential uncoated region 11-2 may be lower than another uncoated region.

Optionally, the first electrode 110 may include an insulation coating layer E that covers the boundary between the active material layer 112 and the first uncoated region 11. The insulation coating layer E includes a polymer resin having insulation properties, and may optionally further include an inorganic filler. The insulation coating layer E may function to prevent the end of the active material layer 112 from contacting the active material layer of the opposite polarity on the opposite side through the separator, and structurally support the bending of the segment 11a. To this end, when the first electrode 110 is wound to form the electrode assembly 10, at least part of the insulation coating layer E is preferably exposed from the separator to the outside.

Figure 27:
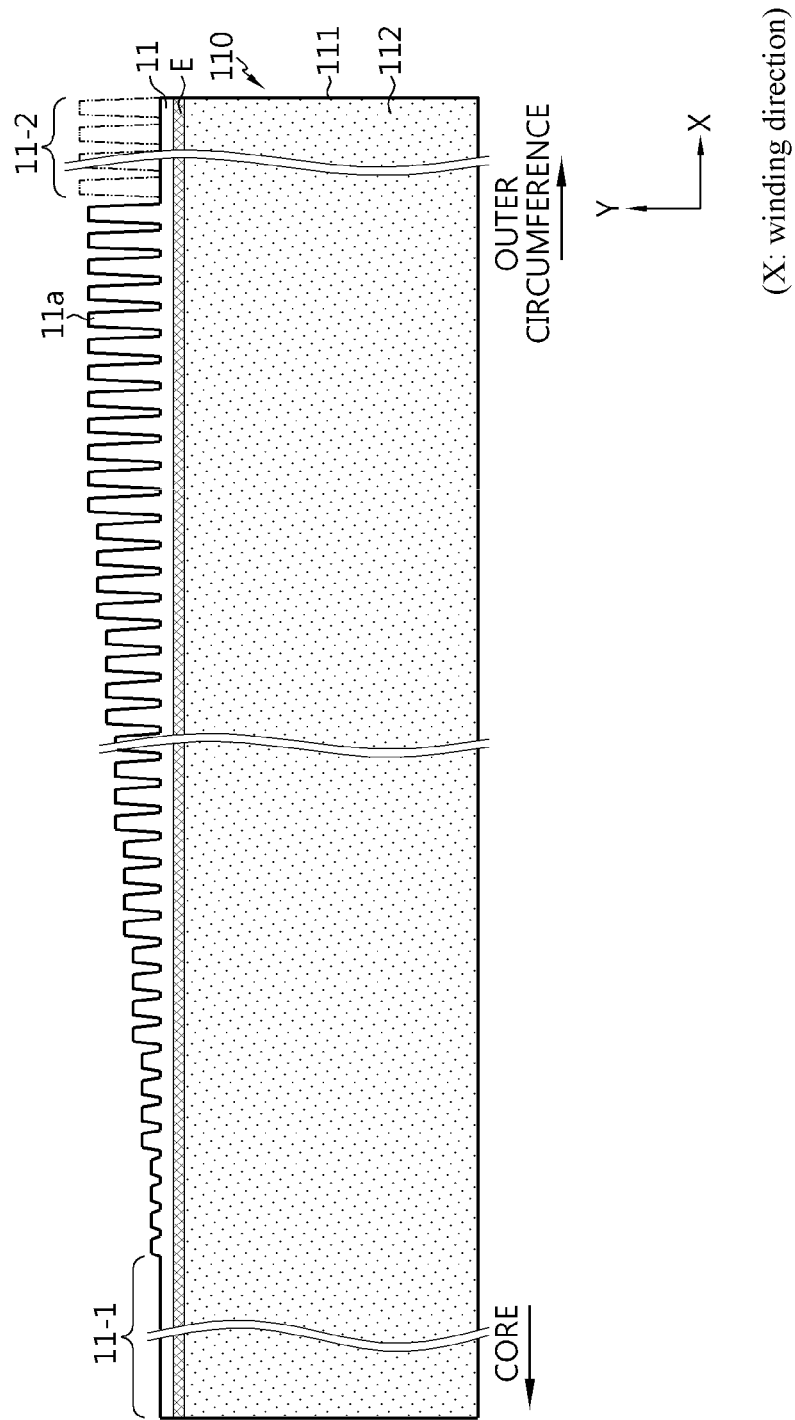
FIG. 27 is a plan view exemplarily showing an electrode structure according to an embodiment of the present disclosure.
Figure 28:
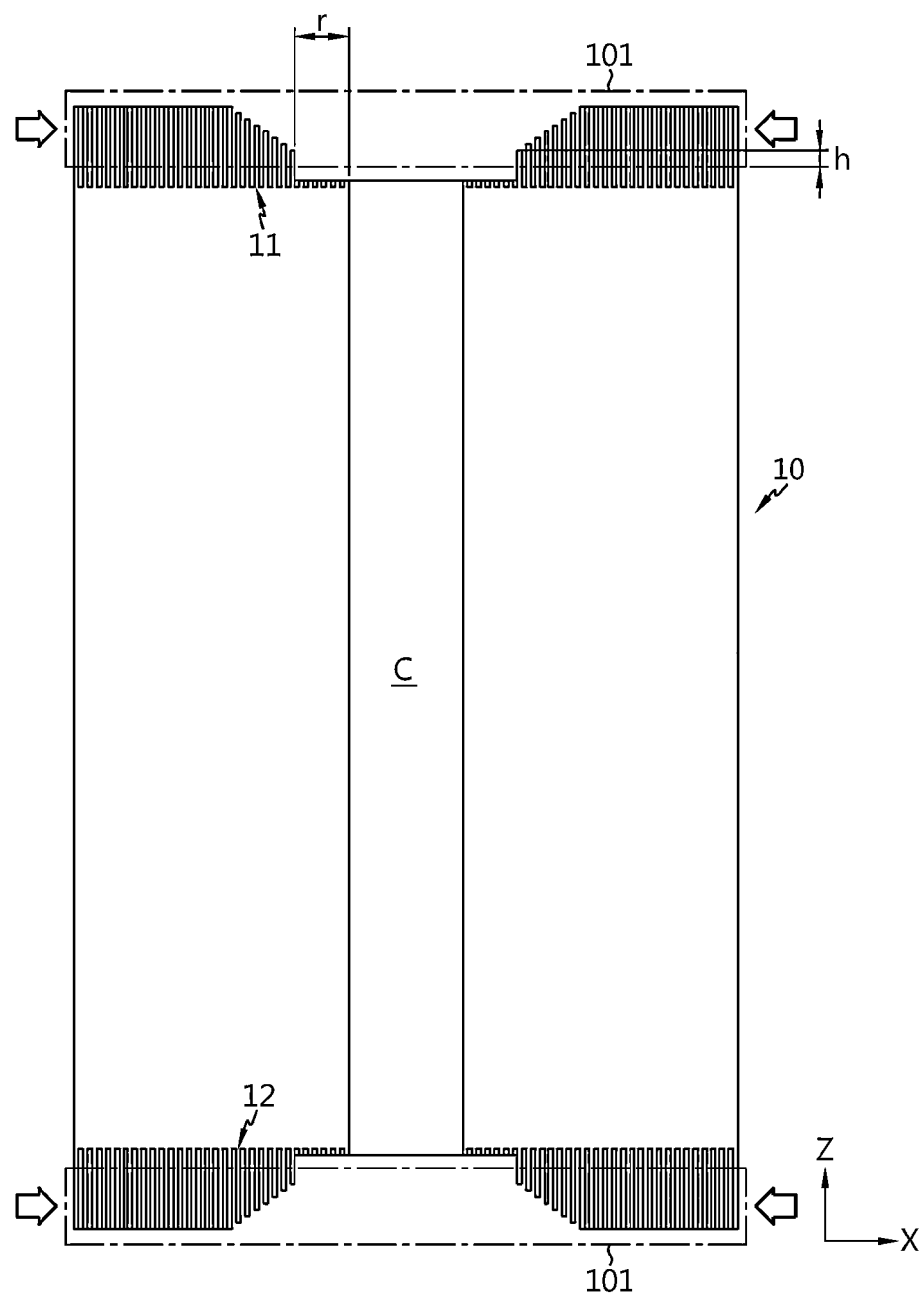
FIG. 28 is a cross-sectional view showing an electrode assembly in which an uncoated region segment structure of a first electrode is also applied to a second electrode according to an embodiment of the present disclosure, taken along a lengthwise direction Z.
Figure 29:
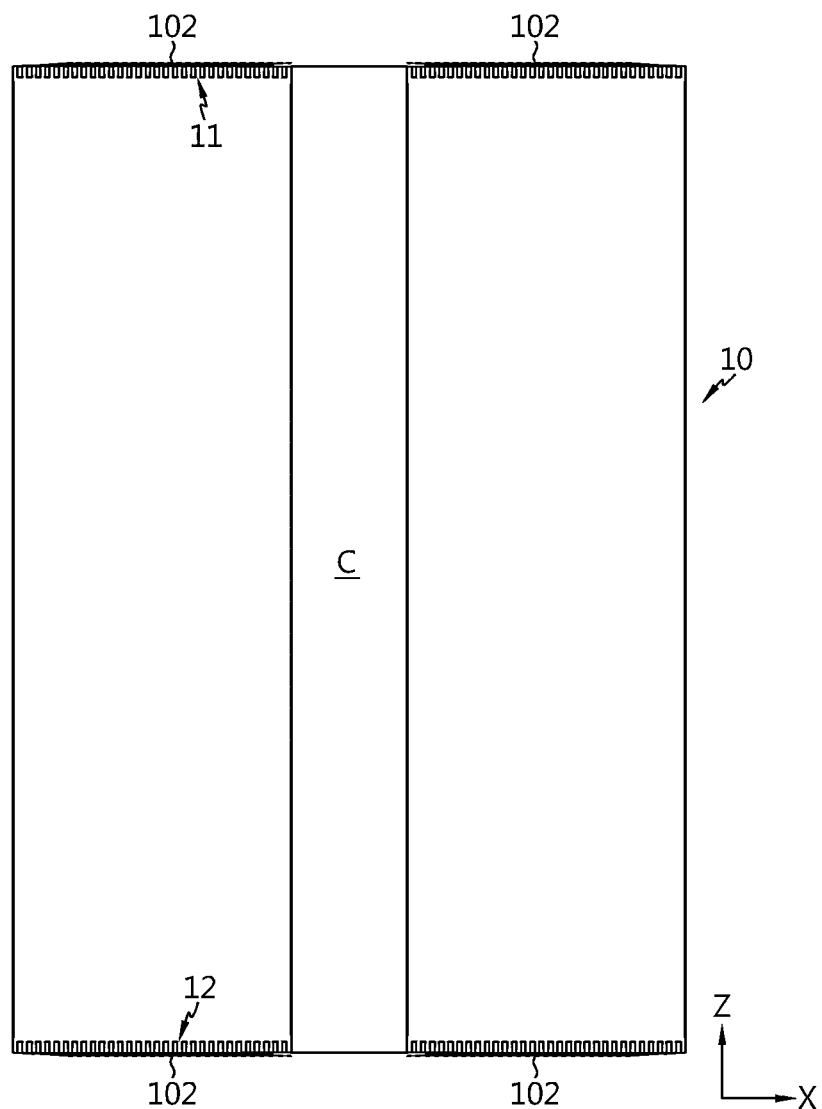
FIG. 29 is a cross-sectional view of an electrode assembly with a bent uncoated region according to an embodiment of the present disclosure, taken along a lengthwise direction Z.

Referring to FIGS. 27 and 28, the electrode assembly 10 may be manufactured by a winding method. For convenience of description, the protruding structure of the uncoated regions 11, 12 extending out of the separator are illustrated in detail, and the illustration of the winding structure of the first electrode, the second electrode and the separator is omitted. The first uncoated region 11 protruding upward extends from the first electrode, and the second uncoated region 12 protruding downward extends from the second electrode.

The height change pattern of the uncoated regions 11, 12 is schematically shown. That is, the height of the uncoated regions 11, 12 may irregularly change depending on where the cross section is taken. For example, when the side of the trapezoidal segment 11a is cut, the height of the uncoated region in cross section is lower than the height of the segment 11a. Therefore, it should be understood that the height of the uncoated regions 11, 12 shown in the cross-sectional view of the electrode assembly 10 correspond to an average height of the uncoated regions included in each winding turn.

Referring to FIGS. 27 to 30, the uncoated regions 11, 12 may be bent along the radial direction of the electrode assembly 10, for example, from the outer circumference toward the core. In the uncoated regions 11, 12, an area in which bending occurs is indicated by the dotted line box in FIG. 28. When the uncoated regions 11, 12 are bent, the segments adjacent to each other in the radial direction overlap in multiple layers to form the bend surface 102 at the upper part and the lower part of the electrode assembly 10. In this instance, the core-side uncoated region 11-1 (FIG. 27) is not bent due to its small height, and the height h of the segment 11a bent at the innermost side is approximately equal to or smaller than the sum of the radial length R of the winding area formed by the core-side uncoated region 11-1 having no segment structure and 10% of the winding hole diameter. Thus, the hole formed at the core C of the electrode assembly 10 is not closed. As the hole is not closed, it is possible to smoothly perform the electrolyte injection process, thereby improving the electrolyte injection efficiency. In addition, it is possible to easily weld the terminal 50 and the second current collector 60 by inserting the welding tool through the hole (see FIG. 13).

Figure 31:
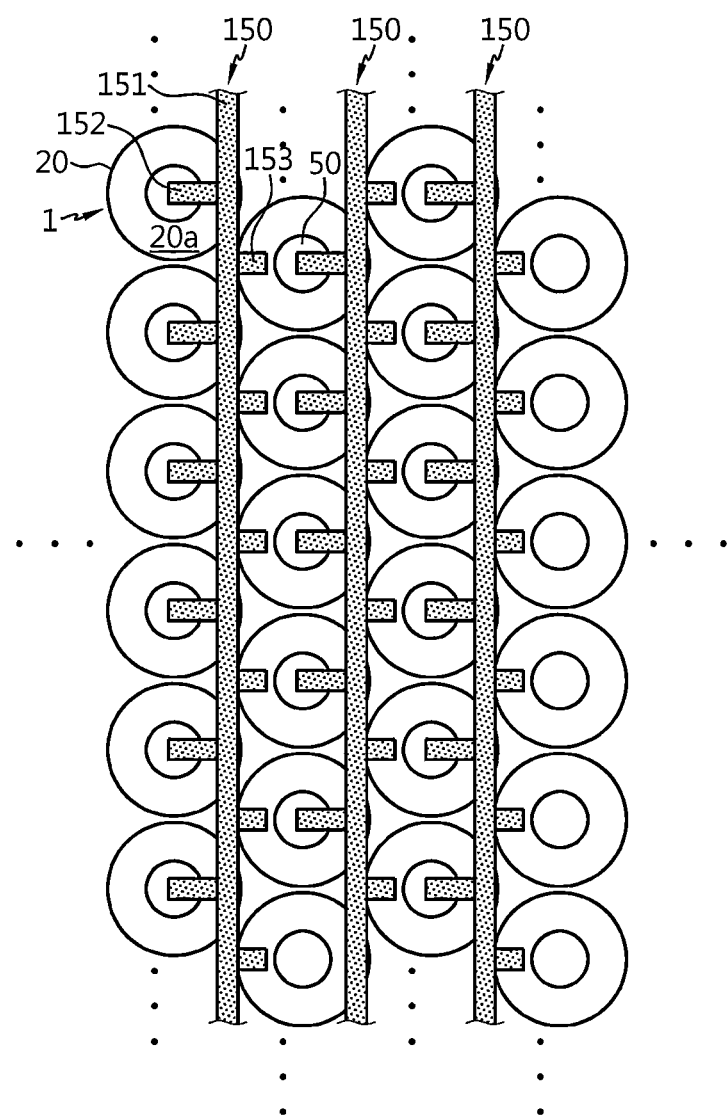
FIG. 31 is a top plan view showing a plurality of cylindrical batteries according to an embodiment of the present disclosure, connected in series and in parallel using busbars.

Meanwhile, referring to FIG. 31, the plurality of cylindrical batteries 1 may be connected in series and in parallel using a busbar 150 on the cylindrical batteries 1. The number of cylindrical battery secondaries 1 may be smaller or larger, considering the capacity of the battery pack.

In each cylindrical battery 1, for example, the terminal 50 may have the positive polarity, and the outer surface 20a of the closed portion of the battery housing 20 may have the negative polarity, and vice versa. The terminal 50 of the cylindrical battery 1 and the outer surface 20a of the closed portion disposed on the opposite side to the open portion of the battery housing 20 may be positioned upward (turned upside down, inversely to FIG. 1).

Preferably, the plurality of cylindrical batteries 1 may be arranged in a plurality of columns and rows. The column is a vertical direction with respect to the ground, and the row is a horizontal direction with respect to the ground. In addition, to maximize the space efficiency, the cylindrical batteries 1 may be arranged in a closest packing structure. The closest packing structure is formed by connecting the centers of the terminal exposure portions of the terminal 50 exposed to the outside of the battery housing 20 into a shape of a right triangle. Preferably, the busbar 150 may be positioned on the plurality of cylindrical batteries 1, more preferably between adjacent columns. Alternatively, the busbar 150 may be positioned between adjacent rows.

Preferably, the busbar 150 connects in parallel the cylindrical batteries 1 arranged in the same column, and connects in series the cylindrical batteries 1 arranged in two adjacent columns.

Preferably, the busbar 150 may include a body portion 151, a plurality of first busbar terminals 152 and a plurality of second busbar terminals 153 for serial and parallel connection.

The body portion 151 may extend between the terminals 50 of the adjacent cylindrical batteries 1, and preferably between the columns of the cylindrical batteries 1. Alternatively, the body portion 151 may extend along the columns of the cylindrical batteries 1 and may be regularly bent in a zigzag pattern.

The plurality of first busbar terminals 152 may protrude and extend from one side of the body portion 151 toward the terminal 50 of each cylindrical battery 1 and may be electrically coupled to the terminal 50. The electrical coupling between the first busbar terminal 152 and the terminal 50 may be made by laser welding and ultrasonic welding. In addition, the plurality of second busbar terminals 153 may be electrically coupled to the outer surface 20a of each cylindrical battery 1 from the other side of the body portion 151. The electrical coupling between the second busbar terminal 153 and the outer surface 20a may be made by laser welding and ultrasonic welding.

Preferably, the body portion 151, the plurality of first busbar terminals 152 and the plurality of second busbar terminals 153 may be made of a single conductive metal plate. The metal plate may be, for example, an aluminum plate or a copper plate, but the present disclosure is not limited thereto. In a variation, the body portion 151, the plurality of first busbar terminals 152 and the plurality of second busbar terminals 153 may be separately manufactured by the unit of piece and then coupled to each other, for example, through welding.

The cylindrical battery 1 according to the present disclosure includes the terminal 50 having the positive polarity and the outer surface 20a of the closed portion of the battery housing 20 having the negative polarity, disposed in the same direction, and thus it is possible to easily establish the electrical connection of the cylindrical batteries 1 using the busbar 150.

In addition, the terminal 50 of the cylindrical battery 1 and the outer surface 20a of the closed portion of the battery housing 20 have a large area, and thus it is possible to ensure sufficient coupling area of the busbar 150, thereby sufficiently reducing the resistance of the battery pack including the cylindrical battery 1.

Preferably, the cylindrical battery may be, for example, a cylindrical battery with the form factor ratio (defined as the product of dividing the diameter of the cylindrical battery by height, or a height (H)-to-diameter (Φ) ratio) of more than about 0.4.

Here, the form factor refers to a value indicating the diameter and height of the cylindrical battery. The cylindrical battery according to an embodiment of the present disclosure may include, for example, 46110 battery, 4875 battery, 48110 battery, 4880 battery and 4680 battery. In the numbers indicating the form factor, the first two numbers indicate the diameter of the battery, and the remaining numbers indicate the height of the battery.

The cylindrical battery according to an embodiment of the present disclosure may be a cylindrical battery having an approximately cylindrical shape, with the diameter of approximately 46 mm, the height of approximately 110 mm and the form factor ratio of approximately 0.418.

The cylindrical battery according to another embodiment may be a cylindrical battery having a substantially cylindrical shape, with the diameter of approximately 48 mm, the height of approximately 75 mm and the form factor ratio of approximately 0.640.

The cylindrical battery according to still another embodiment may be a cylindrical battery having an approximately cylindrical shape, with the diameter of approximately 48 mm, the height of approximately 110 mm and the form factor ratio of approximately 0.418.

The cylindrical battery according to further another embodiment may be a cylindrical battery having an approximately cylindrical shape, with the diameter of approximately 48 mm, the height of approximately 80 mm and the form factor ratio of approximately 0.600.

The cylindrical battery according to yet another embodiment may be a cylindrical battery having an approximately cylindrical shape, with the diameter of approximately 46 mm, the height of approximately 80 mm and the form factor ratio of approximately 0.575.

Conventionally, batteries having the form factor ratio of about 0.4 or less have been used. That is, conventionally, for example, 1865 battery and 2170 battery have been used. The 1865 battery has the diameter of approximately 18 mm, the height of approximately 65 mm and the form factor ratio of approximately 0.277. The 2170 battery has the diameter of approximately 21 mm, the height of approximately 70 mm and the form factor ratio of approximately 0.300.

Figure 32:
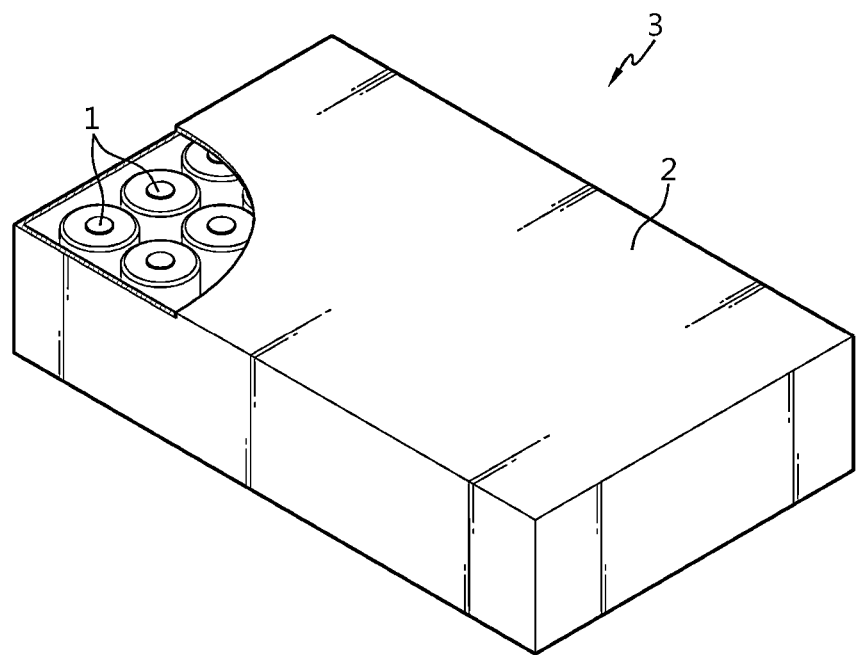
FIG. 32 is a diagram showing a schematic configuration of a battery pack including cylindrical batteries according to an embodiment of the present disclosure.

Referring to FIG. 32, the battery pack 3 according to an embodiment of the present disclosure includes a battery assembly including the plurality of cylindrical batteries 1 according to an embodiment of the present disclosure as described above, electrically connected to each other, and a pack housing 2 which accommodates the same. The illustration of the component for electrical connection such as the busbar, a cooling unit and a power terminal is omitted from the drawings of the present disclosure for convenience of illustration. The electrical connection structure of the plurality of batteries 1 for manufacturing the battery pack 3 is described above with reference to FIG. 30 for illustrative purposes.

Figure 33:
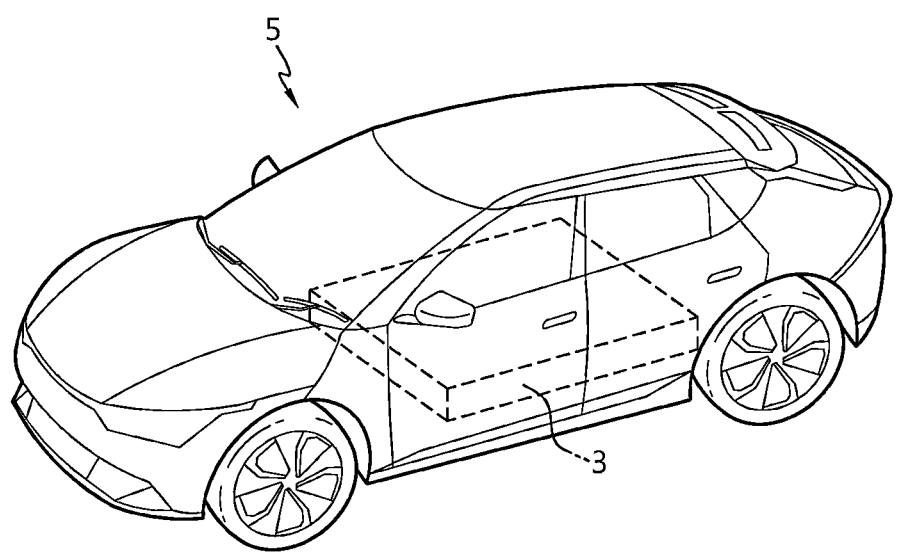
FIG. 33 is a diagram showing a schematic configuration of a vehicle including a battery pack according to an embodiment of the present disclosure.

Referring to FIG. 33, a vehicle 5 according to an embodiment of the present disclosure may be, for example, an electric vehicle, a hybrid electric vehicle or a plug-in vehicle, and includes the battery pack 3 according to an embodiment of the present disclosure. The vehicle 5 includes a four-wheeled vehicle and a two-wheeled vehicle. The vehicle 5 works using the power supplied from the battery pack 3 according to an embodiment of the present disclosure.

According to the present disclosure, it is possible to significantly reduce the resistance when electrically connecting the electrode assembly to the battery housing. In another aspect, according to the present disclosure, it is possible to improve the coupling strength of the coupled portion between the current collector and the battery housing. In another aspect, according to the present disclosure, it is possible to improve the energy density of the cylindrical battery. In another aspect, according to the present disclosure, it is possible to increase the convenience in the welding process for electrical connection between the battery housing and the current collector in the manufacture of the cylindrical battery, thereby improving the productivity. In another aspect, according to the present disclosure, it is possible to significantly reduce the likelihood that damage may occur in the welded portion between the current collector and the electrode assembly and/or the welded portion between the current collector and the battery housing when vibrations and impacts are applied while the battery is in use. In addition, according to the present disclosure, it is possible to increase the convenience in the welding process for the electrical connection between the battery housing and the current collector in the manufacture of the cylindrical battery, thereby improving the productivity.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the appended claims and their equivalent scope.

What is claimed is:

1. A battery, comprising:
an electrode assembly including a first electrode, a second electrode, and a separator between the first electrode and the second electrode,
wherein the first electrode, the second electrode, and the separator are wound about an axis to define a core and an outer circumferential surface of the electrode assembly,
wherein the first electrode has a pair of first sides and a pair of second sides extending between the pair of first sides, a first portion including an active material extending between the pair of first sides, and a second portion extending between the pair of first sides and exposed beyond the separator along a winding direction, and at least part of the second portion includes an electrode tab;
a battery housing having a first opening at a first end and a second end with a second opening opposite the first end, the battery housing accommodating the electrode assembly through the first opening at the first end, wherein the battery housing includes a beading portion formed at an end portion adjacent to the first opening and is press-fit inward;
a first current collector including:
  a support portion positioned on the electrode assembly;
  a first tab coupling portion extending from the support portion and coupled with the second portion of the first electrode; and
  a first housing coupling portion extending from the support portion and electrically coupled onto an inner surface of the battery housing,
  wherein the first housing coupling portion includes:
    a first contact portion coupled onto the beading portion of the battery housing, and
    a first connecting portion connecting the support portion to the first contact portion;
a housing cover which seals the first opening; and
a sealing gasket interposed between the battery housing and the housing cover,
wherein the battery housing includes a crimping portion which is formed above the beading portion, and is extended and bent around a circumferential edge of the housing cover, and
wherein the first contact portion is positioned between the beading portion and the sealing gasket.

2. The battery according to claim 1, wherein the sealing gasket repeatedly increases and decreases in thickness in an alternating manner along a circumferential direction on the beading portion.

3. The battery according to claim 1, wherein the sealing gasket changes in compression ratio area by area along a circumferential direction on the beading portion.

4. The battery according to claim 1, wherein the first housing coupling portion is elastically biased on the beading portion.

5. The battery according to claim 1, wherein at least part of the second portion includes a plurality of segments split along the winding direction of the electrode assembly, and
  the plurality of segments are bent along a radial direction of the electrode assembly forming a bent surface,
  wherein the plurality of segments overlap in multiple layers forming the bent surface,
  wherein the bent surface includes an increasing stack number zone in which a number of overlapping layers of the segments sequentially increases to a maximum value from an outer circumference of the electrode assembly to the core and a uniform stack number zone from a radial position at which the number of overlapping layers is at a maximum to a radial position at which an innermost segment exists, and
  wherein the first tab coupling portion is coupled to the bent surface such that it overlaps with the uniform stack number zone.

6. The battery according to claim 1, wherein a plurality of the first housing coupling portions are provided, and
  wherein the first contact portions of the plurality of the first housing coupling portions are connected to each other and integrally formed.

7. The battery according to claim 1, wherein the second portion and the first tab coupling portion are coupled by welding along a radial direction of the electrode assembly,
  wherein a welding bead formed between the second portion and the first tab coupling portion forms a straight line welding pattern which extends along the radial direction of the electrode assembly, and
  wherein an extension direction of the welding pattern formed between the second portion and the first tab coupling portion and an extension direction of a welding pattern formed between the beading portion and the first contact portion are perpendicular to each other.

8. The battery according to claim 5, wherein a total radial length of the first tab coupling portion T satisfies a formula as set forth below:

$$JR-2*F \leq T < JR$$

wherein JR is an outer diameter of the electrode assembly, and F is a height of a segment of the plurality of segments positioned on an outermost side of the electrode assembly.

9. The battery according to claim 1, wherein the first tab coupling portion has at least one injection hole.

10. The battery according to claim 1, wherein the first connecting portion has an upwardly convex structure with respect to an imaginary straight line connecting two ends of the first connecting portion in a longitudinal direction.

11. The battery according to claim 1, wherein the first connecting portion is more upwardly raised than the beading portion.

12. The battery according to claim 1, wherein the first contact portion is coupled within a flat area formed on the beading portion by welding.

13. The battery according to claim 1, wherein at least a part of the first contact portion has a shape of an arc which extends in a circumferential direction along the beading portion of the battery housing.

14. The battery according to claim 1, wherein a press-fit depth of the beading portion PD satisfies a formula as set forth below:

$$PD \geq R1,\min + R2,\min + Wbead,\min$$

wherein R1,min is a minimum value of a radius of curvature of the beading portion, Wbead, min is a minimum value of a welding bead width, and R2,min is a minimum value of a radius of curvature at a boundary area between the beading portion and the inner surface of the battery housing.

15. The battery according to claim 1, wherein a press-fit depth of the beading portion PD and a maximum press-fit depth PDmax satisfy a formula as set forth below:

$$(R1,\min + Wbead,\min)/PDmax \leq OV/PD \leq (PDmax - R2,\min)/PDmax$$

wherein OV is an overlap length, the overlap length being a shortest distance from an end of the first contact portion to a vertical line passing through an innermost point of the beading portion, R1,min is a minimum radius of curvature of the beading portion, Wbead, min is a minimum welding bead width, and R2,min is a minimum radius of curvature at a boundary area between the beading portion and the inner surface of the battery housing.

16. The battery according to claim 1, wherein a press-fit depth of the beading portion PD and a maximum value of the press-fit depth PDmax satisfy a formula as set forth below:

$$(OVmin - 0.5*Wbead,\min)/PDmax \leq W/PD \leq (OVmax - 0.5*Wbead,\min)/PDmax$$

wherein W is a distance from an innermost point of the beading portion to a center point of a welding bead disposed on an outermost side in a radial direction, OV is an overlap length, the overlap length being a shortest distance from an end of the first contact portion to a vertical line passing through the innermost point of the beading portion, OVmin is a minimum overlap length, OVmax is a maximum overlap length, and Wbead,min is a minimum welding bead width.

17. The battery according to claim 16, wherein a minimum value W1 of the distance W from the innermost point of the beading portion to the center point of the welding bead disposed on the outermost side in the radial direction and the distance from the innermost point of the beading portion to the center point of the welding bead disposed on the outermost side in the radial direction satisfy formulas as set forth below:

$$W1 = R1 + 0.5 * Wbead, min$$

$$W = OV - 0.5 * Wbead, min,$$

wherein R1 is a radius of curvature of the beading portion.

18. The battery according to claim 16, wherein the beading portion, at least in part, has a flat region parallel to a lower surface of the battery housing, and wherein a length of the flat region of the beading portion in contact with the first current collector is OV−R1 where R1 is a radius of curvature of the beading portion.

19. The battery according to claim 18, wherein a width in a radial direction of a welding pattern formed between the beading portion and the first contact portion is Wbead,min or more and OV−R1 or less.

20. The battery according to claim 1, wherein the first connecting portion includes at least one first bending portion which changes in extension direction at least once.

21. The battery according to claim 20, wherein the at least one first bending portion is bent at an obtuse angle not to overlap with itself, when viewed along a longitudinal direction of the battery housing, and wherein the first connecting portion decreases in slope stepwise or gradually toward the beading portion.

22. The battery according to claim 1, wherein the first connecting portion supports the housing cover.

23. The battery according to claim 1, wherein the first current collector has a hole formed at a center, and wherein the hole is provided at a location corresponding to a winding hole formed at a center of the electrode assembly.

24. The battery according to claim 1, wherein a distance from a center of the first current collector to an end of the first tab coupling portion is substantially equal to or shorter than a distance from a center of a winding hole of the electrode assembly to an innermost side of the beading portion.

* * * * *